(12) United States Patent
Kapczynski et al.

(10) Patent No.: US 9,443,268 B1
(45) Date of Patent: Sep. 13, 2016

(54) BILL PAYMENT AND REPORTING

(71) Applicant: ConsumerInfo.com, Inc., Costa Mesa, CA (US)

(72) Inventors: Mark Joseph Kapczynski, Santa Monica, CA (US); Michael John Dean, Torrance, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 181 days.

(21) Appl. No.: 14/164,561

(22) Filed: Jan. 27, 2014

Related U.S. Application Data

(60) Provisional application No. 61/919,618, filed on Dec. 20, 2013, provisional application No. 61/905,112, filed on Nov. 15, 2013.

(51) Int. Cl.
*G06Q 40/00* (2012.01)
*G06Q 40/02* (2012.01)
*G06Q 20/10* (2012.01)
*G06Q 20/24* (2012.01)

(52) U.S. Cl.
CPC .......... *G06Q 40/025* (2013.01); *G06Q 20/102* (2013.01); *G06Q 20/24* (2013.01)

(58) Field of Classification Search
CPC .............................. G06Q 40/02; G06Q 40/025
USPC .......................................................... 705/40
See application file for complete search history.

(56) References Cited

U.S. PATENT DOCUMENTS

| | | |
|---|---|---|
| 1,372,397 A | 3/1921 | Boschen |
| 3,405,457 A | 10/1968 | Bitzer |
| 3,762,316 A | 10/1973 | Spradlin |
| 4,346,442 A | 8/1982 | Musmanno |
| 4,718,009 A | 1/1988 | Cuervo |
| 4,734,858 A | 3/1988 | Schlafly |
| 4,755,940 A | 7/1988 | Brachtl et al. |
| 4,774,664 A | 9/1988 | Campbell et al. |
| 4,869,500 A | 9/1989 | Williams |
| 4,891,503 A | 1/1990 | Jewell |
| 4,900,903 A | 2/1990 | Wright et al. |
| 4,977,595 A | 12/1990 | Ohta et al. |

(Continued)

FOREIGN PATENT DOCUMENTS

| | | |
|---|---|---|
| EP | 0 542 298 | 5/1993 |
| EP | 1 239 378 | 1/2002 |

(Continued)

OTHER PUBLICATIONS

"Equifax: Debt Wise Credit Monitoring Service", Feb. 2010.*

(Continued)

*Primary Examiner* — Eric T Wong
(74) *Attorney, Agent, or Firm* — Knobbe, Martens, Olson & Bear, LLP

(57) ABSTRACT

A system for processing bill payments from a consumer to one or more creditors may provide the consumer with a credit report and options to make payments on tradelines present on the credit report. The system may also report the payment information to one or more credit bureaus. Additionally, the system may automatically identify the consumer's accounts, enroll the consumer in online bill payment with creditors, provide account alerts, recommend payments, provide access to electronic statements, and/or provide contextual action buttons for the consumer's accounts.

17 Claims, 20 Drawing Sheets

(56) References Cited

U.S. PATENT DOCUMENTS

| | | |
|---|---|---|
| 4,989,141 A | 1/1991 | Lyons et al. |
| 5,077,582 A | 12/1991 | Kravette et al. |
| 5,126,936 A | 6/1992 | Champion et al. |
| 5,148,365 A | 9/1992 | Dembo |
| 5,173,935 A | 12/1992 | Meschi |
| 5,197,094 A | 3/1993 | Tillery et al. |
| 5,218,632 A | 6/1993 | Cool |
| 5,220,501 A | 6/1993 | Lawlor et al. |
| 5,262,941 A | 11/1993 | Saladin |
| 5,274,547 A | 12/1993 | Zoffel et al. |
| 5,326,959 A | 7/1994 | Perazza |
| 5,336,870 A | 8/1994 | Hughes et al. |
| 5,383,113 A | 1/1995 | Kight et al. |
| 5,404,518 A | 4/1995 | Gilbertson et al. |
| 5,420,405 A | 5/1995 | Chasek |
| 5,457,305 A | 10/1995 | Akel et al. |
| 5,500,513 A | 3/1996 | Langhans et al. |
| 5,537,464 A | 7/1996 | Lewis et al. |
| 5,561,706 A | 10/1996 | Fenner |
| 5,590,038 A | 12/1996 | Pitroda |
| 5,592,560 A | 1/1997 | Deaton et al. |
| 5,616,902 A | 4/1997 | Cooley et al. |
| 5,640,577 A | 6/1997 | Scharmer |
| 5,655,008 A | 8/1997 | Futch et al. |
| 5,659,725 A | 8/1997 | Levy et al. |
| 5,659,731 A | 8/1997 | Gustafson |
| 5,684,965 A | 11/1997 | Pickering |
| 5,699,528 A | 12/1997 | Hogan |
| 5,719,941 A | 2/1998 | Swift et al. |
| 5,729,735 A | 3/1998 | Meyering |
| 5,739,512 A | 4/1998 | Tognazzini |
| 5,754,632 A | 5/1998 | Smith |
| 5,774,533 A | 6/1998 | Patel |
| 5,774,885 A | 6/1998 | Delfer, III |
| 5,794,221 A | 8/1998 | Egendorf |
| 5,802,498 A | 9/1998 | Comesanas |
| 5,809,143 A | 9/1998 | Hughes |
| 5,815,665 A | 9/1998 | Teper et al. |
| 5,819,234 A | 10/1998 | Slavin et al. |
| 5,832,068 A | 11/1998 | Smith |
| 5,832,460 A | 11/1998 | Bednar et al. |
| 5,838,314 A | 11/1998 | Neel et al. |
| 5,842,211 A | 11/1998 | Horadan et al. |
| 5,844,218 A | 12/1998 | Kawan et al. |
| 5,850,446 A | 12/1998 | Berger et al. |
| 5,870,721 A | 2/1999 | Norris |
| 5,873,072 A | 2/1999 | Kight et al. |
| 5,878,403 A | 3/1999 | DeFrancesco |
| 5,881,131 A | 3/1999 | Farris et al. |
| 5,884,288 A | 3/1999 | Chang et al. |
| 5,884,302 A | 3/1999 | Ho |
| 5,893,077 A | 4/1999 | Griffin |
| 5,903,830 A | 5/1999 | Joao et al. |
| 5,903,881 A | 5/1999 | Schrader et al. |
| 5,920,848 A | 7/1999 | Schutzer et al. |
| 5,926,754 A | 7/1999 | Cirelli et al. |
| 5,930,776 A | 7/1999 | Dykstra et al. |
| 5,956,690 A | 9/1999 | Haggerson et al. |
| 5,956,693 A | 9/1999 | Geerlings |
| 5,956,698 A | 9/1999 | Lacheze et al. |
| 5,963,939 A | 10/1999 | McCann et al. |
| 5,966,695 A | 10/1999 | Melchione et al. |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,032,132 A | 2/2000 | Nelson |
| 6,038,551 A | 3/2000 | Barlow et al. |
| 6,041,319 A | 3/2000 | Bass et al. |
| 6,044,362 A | 3/2000 | Neely |
| 6,049,786 A | 4/2000 | Smorodinsky |
| 6,052,671 A | 4/2000 | Crooks et al. |
| 6,061,668 A | 5/2000 | Sharrow |
| 6,064,990 A | 5/2000 | Goldsmith |
| 6,072,894 A | 6/2000 | Payne |
| 6,073,140 A | 6/2000 | Morgan et al. |
| 6,078,907 A | 6/2000 | Lamm |
| 6,085,242 A | 7/2000 | Chandra |
| 6,088,686 A | 7/2000 | Walker et al. |
| 6,112,190 A | 8/2000 | Fletcher et al. |
| 6,119,103 A | 9/2000 | Basch et al. |
| 6,128,602 A | 10/2000 | Northington et al. |
| 6,144,726 A | 11/2000 | Cross |
| 6,149,441 A | 11/2000 | Pellegrino et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,202,067 B1 | 3/2001 | Blood et al. |
| 6,233,566 B1 | 5/2001 | Levine et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,282,658 B2 | 8/2001 | French et al. |
| 6,289,323 B1 | 9/2001 | Gordon et al. |
| 6,292,789 B1 | 9/2001 | Schutzer |
| 6,295,541 B1 | 9/2001 | Bodnar et al. |
| 6,304,860 B1 | 10/2001 | Martin et al. |
| 6,311,169 B2 | 10/2001 | Duhon |
| 6,321,339 B1 | 11/2001 | French et al. |
| 6,324,516 B1 | 11/2001 | Shults et al. |
| 6,327,578 B1 | 12/2001 | Linehan |
| 6,330,551 B1 | 12/2001 | Burchetta et al. |
| 6,334,116 B1 | 12/2001 | Ganesan et al. |
| 6,337,901 B1 | 1/2002 | Rome et al. |
| 6,341,272 B1 | 1/2002 | Randle |
| 6,343,279 B1 | 1/2002 | Bissonette et al. |
| 6,343,284 B1 | 1/2002 | Ishikawa et al. |
| 6,353,778 B1 | 3/2002 | Brown |
| 6,356,937 B1 | 3/2002 | Montville et al. |
| 6,374,262 B1 | 4/2002 | Kodama |
| 6,384,844 B1 | 5/2002 | Stewart et al. |
| 6,385,595 B1 | 5/2002 | Kolling et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,181 B2 | 6/2002 | Lent et al. |
| 6,421,675 B1 | 7/2002 | Ryan et al. |
| 6,421,729 B1 | 7/2002 | Paltenghe et al. |
| 6,421,768 B1 | 7/2002 | Purpura |
| 6,422,462 B1 | 7/2002 | Cohen |
| 6,424,840 B1 | 7/2002 | Fitch et al. |
| 6,431,439 B1 | 8/2002 | Suer et al. |
| 6,438,527 B1 | 8/2002 | Powar |
| 6,438,601 B1 | 8/2002 | Hardy |
| 6,453,353 B1 | 9/2002 | Win et al. |
| 6,457,012 B1 | 9/2002 | Jatkowski |
| 6,496,936 B1 | 12/2002 | French et al. |
| 5,870,721 C1 | 1/2003 | Norris |
| 6,516,190 B1 | 2/2003 | Linkola |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,546,413 B1 | 4/2003 | Northrup |
| 6,549,770 B1 | 4/2003 | Marran |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,574,798 B1 | 6/2003 | Bradley et al. |
| 6,581,025 B2 | 6/2003 | Lehman |
| 6,587,841 B1 | 7/2003 | DeFrancesco |
| 6,611,816 B2 | 8/2003 | Lebda et al. |

(56) References Cited

U.S. PATENT DOCUMENTS

| | | |
|---|---|---|
| 6,615,193 B1 | 9/2003 | Kingdon et al. |
| 6,629,245 B1 | 9/2003 | Stone et al. |
| 6,647,383 B1 | 11/2003 | August et al. |
| 6,655,583 B2 | 12/2003 | Walsh et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,684,197 B1 | 1/2004 | Kolls |
| 6,703,930 B2 | 3/2004 | Skinner |
| 6,704,039 B2 | 3/2004 | Pena |
| 6,714,944 B1 | 3/2004 | Shapiro et al. |
| 6,718,313 B1 | 4/2004 | Lent et al. |
| 6,721,716 B1 | 4/2004 | Gross |
| 6,725,381 B1 | 4/2004 | Smith et al. |
| 6,745,938 B2 | 6/2004 | Sullivan |
| 6,748,367 B1 | 6/2004 | Lee et al. |
| 6,750,985 B2 | 6/2004 | Rhoads |
| 6,754,564 B2 | 6/2004 | Newport |
| 6,766,327 B2 | 7/2004 | Morgan, Jr. et al. |
| 6,775,519 B1 | 8/2004 | Wiedman et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,804,346 B1 | 10/2004 | Mewhinney |
| 6,804,720 B1 | 10/2004 | Vilander et al. |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,832,212 B1 | 12/2004 | Zenner et al. |
| 6,842,740 B1 | 1/2005 | Jeran et al. |
| 6,845,448 B1 | 1/2005 | Chaganti et al. |
| 6,856,974 B1 | 2/2005 | Ganesan et al. |
| 6,857,073 B2 | 2/2005 | French et al. |
| 6,871,287 B1 | 3/2005 | Ellingson |
| 6,880,751 B2 | 4/2005 | Okamura et al. |
| 6,882,986 B1 | 4/2005 | Heinemann et al. |
| 6,892,307 B1 | 5/2005 | Wood et al. |
| 6,898,279 B1 | 5/2005 | Baker et al. |
| 6,898,574 B1 | 5/2005 | Regan |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,932,268 B1 | 8/2005 | McCoy et al. |
| 6,934,691 B1 | 8/2005 | Simpson |
| 6,934,714 B2 | 8/2005 | Meinig |
| 6,938,821 B2 | 9/2005 | Gangi |
| 6,941,323 B1 | 9/2005 | Galperin |
| 6,947,989 B2 | 9/2005 | Gullotta et al. |
| 6,950,807 B2 | 9/2005 | Brock |
| 6,954,630 B2 | 10/2005 | Offer |
| 6,962,336 B2 | 11/2005 | Glass |
| 6,965,881 B1 | 11/2005 | Brickell et al. |
| 6,968,319 B1 | 11/2005 | Remington et al. |
| 6,973,462 B2 | 12/2005 | Dattero et al. |
| 6,985,887 B1 | 1/2006 | Sunstein et al. |
| 6,988,085 B2 | 1/2006 | Hedy |
| 6,993,572 B2 | 1/2006 | Ross, Jr. et al. |
| 6,999,941 B1 | 2/2006 | Agarwal |
| 7,013,315 B1 | 3/2006 | Boothby |
| 7,016,907 B2 | 3/2006 | Boreham et al. |
| 7,024,174 B2 | 4/2006 | Nagy et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,069,240 B2 | 6/2006 | Spero et al. |
| 7,072,856 B1 | 7/2006 | Nachom |
| 7,072,909 B2 | 7/2006 | Polk |
| 7,076,462 B1 | 7/2006 | Nelson et al. |
| 7,083,087 B1 | 8/2006 | Gangi |
| 7,085,727 B2 | 8/2006 | VanOrman |
| 7,089,594 B2 | 8/2006 | Lal et al. |
| 7,092,905 B2 | 8/2006 | Behrenbrinker et al. |
| 7,107,241 B1 | 9/2006 | Pinto |
| 7,107,243 B1 | 9/2006 | McDonald et al. |
| 7,107,244 B2 | 9/2006 | Kight et al. |
| 7,117,172 B1 | 10/2006 | Black |
| 7,124,144 B2 | 10/2006 | Christianson et al. |
| 7,131,144 B2 | 10/2006 | Rabin et al. |
| RE39,376 E | 11/2006 | Biggs, Jr. et al. |
| 7,133,852 B2 | 11/2006 | Kurokawa et al. |
| 7,139,734 B2 | 11/2006 | Nathans et al. |
| 7,143,063 B2 | 11/2006 | Lent |
| 7,155,203 B2 | 12/2006 | Brewer et al. |
| 7,155,739 B2 | 12/2006 | Bari et al. |
| 7,177,830 B2 | 2/2007 | Shields et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,551 B1 | 4/2007 | Senez |
| 7,200,602 B2 | 4/2007 | Jonas |
| 7,203,315 B1 | 4/2007 | Livesay |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,213,003 B1 | 5/2007 | Kight et al. |
| 7,216,104 B2 | 5/2007 | Mason |
| 7,218,912 B2 | 5/2007 | Erskine et al. |
| 7,219,107 B2 | 5/2007 | Beringer |
| 7,222,369 B2 | 5/2007 | Vering et al. |
| 7,227,935 B2 | 6/2007 | Creamer et al. |
| 7,234,156 B2 | 6/2007 | French et al. |
| 7,236,950 B2 | 6/2007 | Savage et al. |
| 7,240,031 B1 | 7/2007 | Kight et al. |
| 7,243,369 B2 | 7/2007 | Bhat et al. |
| 7,246,740 B2 | 7/2007 | Swift et al. |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,281,652 B2 | 10/2007 | Foss |
| 7,289,971 B1 | 10/2007 | O'Neil et al. |
| 7,292,840 B2 | 11/2007 | Kissner et al. |
| 7,296,004 B1 | 11/2007 | Garrison et al. |
| 7,296,734 B2 | 11/2007 | Pliha |
| 7,302,272 B2 | 11/2007 | Ackley |
| 7,302,411 B2 | 11/2007 | Ganesan et al. |
| 7,310,611 B2 | 12/2007 | Shibuya et al. |
| 7,310,617 B1 | 12/2007 | Cunningham |
| 7,314,167 B1 | 1/2008 | Kiliccote |
| 7,315,837 B2 | 1/2008 | Sloan et al. |
| 7,328,233 B2 | 2/2008 | Salim et al. |
| 7,330,717 B2 | 2/2008 | Gidron et al. |
| 7,330,835 B2 | 2/2008 | Deggendorf |
| 7,331,518 B2 | 2/2008 | Rable |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,349,885 B2 | 3/2008 | Gangi |
| 7,353,203 B1 | 4/2008 | Kriplani et al. |
| 7,356,503 B1 | 4/2008 | Johnson et al. |
| 7,356,516 B2 | 4/2008 | Richey et al. |
| 7,357,305 B2 | 4/2008 | Ahn et al. |
| 7,363,257 B2 | 4/2008 | Kunz et al. |
| 7,366,694 B2 | 4/2008 | Lazerson |
| 7,366,696 B1 | 4/2008 | Ganesan et al. |
| 7,370,014 B1 | 5/2008 | Vasavada et al. |
| 7,370,044 B2 | 5/2008 | Mulhern et al. |
| 7,370,794 B2 | 5/2008 | Trane |
| 7,373,324 B1 | 5/2008 | Engin et al. |
| 7,383,225 B2 | 6/2008 | Hallihan |
| 7,383,226 B2 | 6/2008 | Kight et al. |
| 7,383,988 B2 | 6/2008 | Slonecker, Jr. |
| 7,386,511 B2 | 6/2008 | Buchanan et al. |

(56) References Cited

U.S. PATENT DOCUMENTS

| | | |
|---|---|---|
| 7,386,597 B2 | 6/2008 | Takeuchi et al. |
| 7,386,786 B2 | 6/2008 | Davis et al. |
| 7,389,913 B2 | 6/2008 | Starrs |
| 7,392,223 B1 | 6/2008 | Ganesan et al. |
| 7,395,243 B1 | 7/2008 | Zielke et al. |
| 7,395,273 B2 | 7/2008 | Khan et al. |
| 7,403,602 B2 | 7/2008 | Khan |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,433,836 B1 | 10/2008 | August et al. |
| 7,433,864 B2 | 10/2008 | Malik |
| 7,437,324 B1 | 10/2008 | Goodwin, III et al. |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,486,784 B2 | 2/2009 | Creamer et al. |
| 7,490,356 B2 | 2/2009 | Lieblich et al. |
| 7,499,875 B1 | 3/2009 | May et al. |
| 7,503,489 B2 | 3/2009 | Heffez |
| 7,509,117 B2 | 3/2009 | Yum |
| 7,509,278 B2 | 3/2009 | Jones |
| 7,512,221 B2 | 3/2009 | Toms |
| 7,516,101 B2 | 4/2009 | Remington et al. |
| 7,526,448 B2 | 4/2009 | Zielke et al. |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,537,152 B2 | 5/2009 | Chakiris et al. |
| 7,537,153 B2 | 5/2009 | Hurwitz et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,555,459 B2 | 6/2009 | Dhar et al. |
| 7,556,192 B2 | 7/2009 | Wokaty, Jr. |
| 7,558,748 B2 | 7/2009 | Ehring et al. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,143 B2 | 8/2009 | Circenis et al. |
| 7,571,473 B1 | 8/2009 | Boydstun et al. |
| 7,575,152 B2 | 8/2009 | Graves et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,126 B1 | 9/2009 | White |
| 7,584,127 B2 | 9/2009 | Byrne et al. |
| 7,584,146 B1 | 9/2009 | Duhon |
| 7,587,363 B2 | 9/2009 | Cataline et al. |
| 7,587,368 B2 | 9/2009 | Felsher |
| 7,593,891 B2 | 9/2009 | Kornegay et al. |
| 7,594,019 B2 | 9/2009 | Clapper |
| 7,603,314 B2 | 10/2009 | Siksa |
| 7,606,355 B2 | 10/2009 | Hutchison et al. |
| 7,610,216 B1 | 10/2009 | May et al. |
| 7,610,229 B1 | 10/2009 | Kornegay |
| 7,613,600 B2 | 11/2009 | Krane |
| 7,613,656 B2 | 11/2009 | Stanley et al. |
| 7,620,383 B2 | 11/2009 | Taglienti et al. |
| 7,620,596 B2 | 11/2009 | Knudson et al. |
| 7,620,602 B2 | 11/2009 | Jakstadt et al. |
| 7,620,653 B1 | 11/2009 | Swartz |
| 7,623,844 B2 | 11/2009 | Herrmann et al. |
| 7,627,524 B2 | 12/2009 | Bennett et al. |
| 7,627,527 B1 | 12/2009 | Hildebrand |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,636,689 B2 | 12/2009 | Dent et al. |
| 7,640,200 B2 | 12/2009 | Gardner et al. |
| 7,644,035 B1 | 1/2010 | Biffle et al. |
| 7,644,036 B2 | 1/2010 | McCoy et al. |
| 7,647,274 B2 | 1/2010 | Peterson et al. |
| 7,647,344 B2 | 1/2010 | Skurtovich, Jr. et al. |
| 7,653,187 B2 | 1/2010 | Clark et al. |
| 7,653,591 B1 | 1/2010 | Dabney |
| 7,653,592 B1 | 1/2010 | Flaxman et al. |
| 7,653,600 B2 | 1/2010 | Gustin |
| 7,653,688 B2 | 1/2010 | Bittner |
| 7,657,484 B2 | 2/2010 | Ganesan et al. |
| 7,660,771 B2 | 2/2010 | Orcutt |
| 7,668,738 B2 | 2/2010 | Wiggins |
| 7,668,766 B1 | 2/2010 | Goodwin, III et al. |
| 7,672,833 B2 | 3/2010 | Blume et al. |
| 7,676,410 B2 | 3/2010 | Petralia |
| 7,685,209 B1 | 3/2010 | Norton et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,689,716 B2 | 3/2010 | Short et al. |
| 7,690,032 B1 | 3/2010 | Peirce |
| 7,693,787 B2 | 4/2010 | Provinse |
| 7,693,790 B2 | 4/2010 | Lawlor et al. |
| 7,698,214 B1 | 4/2010 | Lindgren |
| 7,698,217 B1 | 4/2010 | Phillips et al. |
| 7,702,579 B2 | 4/2010 | Neely |
| 7,707,109 B2 | 4/2010 | Odijk et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,708,191 B2 | 5/2010 | Vega |
| 7,711,635 B2 | 5/2010 | Steele et al. |
| 7,711,645 B2 | 5/2010 | Morello |
| 7,711,690 B1 | 5/2010 | Garrison et al. |
| 7,711,707 B2 | 5/2010 | Kelley et al. |
| 7,715,832 B2 | 5/2010 | Zhou |
| 7,716,132 B1 | 5/2010 | Spies et al. |
| 7,720,760 B1 | 5/2010 | Cook et al. |
| 7,720,846 B1 | 5/2010 | Bayliss |
| 7,725,330 B2 | 5/2010 | Rao et al. |
| 7,725,385 B2 | 5/2010 | Royer et al. |
| 7,729,959 B1 | 6/2010 | Wells et al. |
| 7,730,078 B2 | 6/2010 | Schwabe et al. |
| 7,734,522 B2 | 6/2010 | Johnson et al. |
| 7,734,543 B2 | 6/2010 | Braco |
| 7,739,707 B2 | 6/2010 | Sie et al. |
| 7,746,496 B2 | 6/2010 | Henry et al. |
| 7,747,520 B2 | 6/2010 | Livermore et al. |
| 7,747,521 B2 | 6/2010 | Serio |
| 7,752,095 B1 | 7/2010 | Laracey et al. |
| 7,752,130 B2 | 7/2010 | Byrd et al. |
| 7,752,132 B2 | 7/2010 | Stewart et al. |
| 7,756,787 B1 | 7/2010 | Hilton |
| 7,756,789 B2 | 7/2010 | Welker et al. |
| 7,761,373 B2 | 7/2010 | Metz |
| 7,761,384 B2 | 7/2010 | Madhogarhia |
| 7,765,148 B2 | 7/2010 | German et al. |
| 7,765,166 B2 | 7/2010 | Beringer et al. |
| 7,769,651 B2 | 8/2010 | Fine et al. |
| 7,769,697 B2 | 8/2010 | Fieschi et al. |
| 7,774,257 B2 | 8/2010 | Maggioncalda et al. |
| 7,774,270 B1 | 8/2010 | MacCloskey |
| 7,778,901 B2 | 8/2010 | Ganesan et al. |
| 7,780,075 B2 | 8/2010 | Cooper et al. |
| 7,783,515 B1 | 8/2010 | Kumar et al. |

(56) References Cited

U.S. PATENT DOCUMENTS

| | | |
|---|---|---|
| 7,787,869 B2 | 8/2010 | Rice et al. |
| 7,788,040 B2 | 8/2010 | Haskell et al. |
| 7,788,172 B2 | 8/2010 | Kight et al. |
| 7,792,715 B1 | 9/2010 | Kasower |
| 7,792,725 B2 | 9/2010 | Booraem et al. |
| 7,792,743 B2 | 9/2010 | Koningstein et al. |
| 7,792,749 B2 | 9/2010 | Ganesan |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,797,734 B2 | 9/2010 | Babi et al. |
| 7,801,807 B2 | 9/2010 | DeFrancesco et al. |
| 7,801,811 B1 | 9/2010 | Merrell et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,813,943 B1 | 10/2010 | Lefco et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,831,521 B1 | 11/2010 | Ball et al. |
| 7,832,006 B2 | 11/2010 | Chen et al. |
| 7,835,983 B2 | 11/2010 | Lefner et al. |
| 7,836,197 B2 | 11/2010 | Isaac et al. |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,522 B2 | 11/2010 | Fong |
| 7,844,604 B2 | 11/2010 | Baio et al. |
| 7,848,972 B1 | 12/2010 | Sharma |
| 7,848,974 B1 | 12/2010 | Sheehan |
| 7,848,978 B2 | 12/2010 | Imrey et al. |
| 7,849,014 B2 | 12/2010 | Erikson |
| 7,853,436 B2 | 12/2010 | McConnell et al. |
| 7,853,493 B2 | 12/2010 | DeBie et al. |
| 7,856,203 B2 | 12/2010 | Lipovski |
| 7,856,386 B2 | 12/2010 | Hazlehurst et al. |
| 7,861,287 B2 | 12/2010 | Pomerantz |
| 7,870,025 B2 | 1/2011 | English |
| 7,870,066 B2 | 1/2011 | Lin et al. |
| 7,870,077 B2 | 1/2011 | Woo et al. |
| 7,870,078 B2 | 1/2011 | Clark et al. |
| 7,873,441 B2 | 1/2011 | Synesiou et al. |
| 7,877,304 B1 | 1/2011 | Coulter |
| 7,877,784 B2 | 1/2011 | Chow et al. |
| RE42,154 E | 2/2011 | Walker et al. |
| 7,885,637 B2 | 2/2011 | Immonen et al. |
| 7,890,358 B2 | 2/2011 | Dutta et al. |
| 7,890,371 B2 | 2/2011 | Chao |
| 7,890,403 B1 | 2/2011 | Smith |
| 7,895,107 B2 | 2/2011 | Lapstun et al. |
| 7,899,750 B1 | 3/2011 | Klieman et al. |
| 7,904,354 B2 | 3/2011 | Pepe et al. |
| 7,908,242 B1 | 3/2011 | Achanta |
| 7,909,246 B2 | 3/2011 | Hogg et al. |
| 7,912,842 B1 | 3/2011 | Bayliss et al. |
| 7,912,865 B2 | 3/2011 | Akerman et al. |
| 7,917,410 B2 | 3/2011 | Morimoto |
| 7,917,435 B2 | 3/2011 | Hall et al. |
| 7,925,582 B1 | 4/2011 | Kornegay et al. |
| 7,925,982 B2 | 4/2011 | Parker |
| 7,937,323 B2 | 5/2011 | Wagner et al. |
| 7,945,240 B1 | 5/2011 | Klock et al. |
| 7,945,491 B2 | 5/2011 | Sharma |
| 7,949,609 B2 | 5/2011 | Colella |
| 7,953,660 B2 | 5/2011 | Ganesan et al. |
| 7,954,698 B1 | 6/2011 | Pliha |
| 7,958,046 B2 | 6/2011 | Doerner et al. |
| 7,958,049 B2 | 6/2011 | Jamison et al. |
| 7,962,410 B2 | 6/2011 | Tosswill |
| 7,966,192 B2 | 6/2011 | Pagliari et al. |
| 7,970,669 B1 | 6/2011 | Santos |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,987,501 B2 | 7/2011 | Miller et al. |
| 7,991,688 B2 | 8/2011 | Phelan et al. |
| 7,995,991 B2 | 8/2011 | Johnson et al. |
| 7,996,310 B1 | 8/2011 | Edwards et al. |
| 8,001,045 B1 | 8/2011 | McClinton |
| 8,001,153 B2 | 8/2011 | Skurtovich, Jr. et al. |
| 8,001,235 B2 | 8/2011 | Russ et al. |
| 8,005,754 B2 | 8/2011 | McCoy et al. |
| 8,006,261 B1 | 8/2011 | Haberman et al. |
| 8,032,932 B2 | 10/2011 | Speyer et al. |
| 8,036,941 B2 | 10/2011 | Bennett et al. |
| 8,036,961 B2 | 10/2011 | Ducolon et al. |
| 8,037,097 B2 | 10/2011 | Guo et al. |
| 8,037,506 B2 | 10/2011 | Cooper et al. |
| 8,055,579 B2 | 11/2011 | Davies et al. |
| 8,055,904 B1 | 11/2011 | Cato et al. |
| 8,060,424 B2 | 11/2011 | Kasower |
| 8,060,438 B2 | 11/2011 | Dhar et al. |
| 8,060,441 B2 | 11/2011 | Stewart et al. |
| 8,060,916 B2 | 11/2011 | Bajaj et al. |
| 8,065,233 B2 | 11/2011 | Lee et al. |
| 8,069,066 B2 | 11/2011 | Stevens et al. |
| 8,073,773 B2 | 12/2011 | Kozee et al. |
| 8,073,774 B2 | 12/2011 | Pousti |
| 8,073,777 B2 | 12/2011 | Barry et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,086,219 B2 | 12/2011 | O'Neil et al. |
| 8,086,524 B1 | 12/2011 | Craig et al. |
| 8,095,443 B2 | 1/2012 | DeBie |
| 8,095,458 B2 | 1/2012 | Peterson et al. |
| 8,099,298 B2 | 1/2012 | Coleman et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,104,679 B2 | 1/2012 | Brown |
| 8,108,272 B2 | 1/2012 | Sorbe et al. |
| 8,108,301 B2 | 1/2012 | Gupta et al. |
| 8,112,354 B2 | 2/2012 | Lalwani et al. |
| 8,117,077 B2 | 2/2012 | Lin |
| 8,117,100 B1 | 2/2012 | Hopkins |
| 8,121,894 B2 | 2/2012 | Mason |
| 8,121,945 B2 | 2/2012 | Rackley, III et al. |
| 8,121,947 B1 | 2/2012 | Barth et al. |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullough |
| 8,140,432 B2 | 3/2012 | Johnson |
| 8,140,649 B2 | 3/2012 | Durand et al. |
| 8,145,188 B2 | 3/2012 | Park et al. |
| 8,145,568 B2 | 3/2012 | Rackley, III et al. |
| 8,150,754 B2 | 4/2012 | Leggatt et al. |
| 8,152,061 B2 | 4/2012 | Wolfe et al. |
| 8,160,959 B2 | 4/2012 | Rackley, III et al. |
| 8,160,960 B1 | 4/2012 | Fei et al. |
| 8,170,931 B2 | 5/2012 | Ross et al. |
| 8,175,889 B1 | 5/2012 | Girulat et al. |
| 8,175,969 B2 | 5/2012 | Yang et al. |
| 8,180,686 B2 | 5/2012 | Ryu et al. |
| 8,180,691 B2 | 5/2012 | Cao et al. |
| 8,185,472 B1 | 5/2012 | Boyd et al. |
| 8,195,549 B2 | 6/2012 | Kasower |
| 8,195,566 B2 | 6/2012 | Tsui et al. |
| 8,195,567 B2 | 6/2012 | Cinelli et al. |
| 8,201,257 B1 | 6/2012 | Andres et al. |

(56) References Cited

U.S. PATENT DOCUMENTS

| | | |
|---|---|---|
| 8,204,788 B1 | 6/2012 | Ivankovich et al. |
| 8,204,812 B2 | 6/2012 | Stewart et al. |
| 8,224,723 B2 | 7/2012 | Bosch et al. |
| 8,225,395 B2 | 7/2012 | Atwood et al. |
| 8,229,762 B2 | 7/2012 | Romans |
| 8,234,498 B2 | 7/2012 | Britti et al. |
| 8,244,609 B2 | 8/2012 | Prakash et al. |
| 8,244,848 B1 | 8/2012 | Narayanan et al. |
| 8,249,961 B1 | 8/2012 | Hopkins |
| 8,249,965 B2 | 8/2012 | Tumminaro |
| 8,249,968 B1 | 8/2012 | Oldham et al. |
| 8,255,327 B2 | 8/2012 | Kemper et al. |
| 8,260,682 B2 | 9/2012 | Rigole |
| 8,260,694 B1 | 9/2012 | Lauer et al. |
| 8,261,970 B2 | 9/2012 | Suginaka |
| 8,265,591 B1 | 9/2012 | Abidogun et al. |
| 8,271,393 B2 | 9/2012 | Twining et al. |
| 8,275,636 B2 | 9/2012 | Berg et al. |
| 8,275,710 B1 | 9/2012 | Hildebrand |
| 8,280,789 B2 | 10/2012 | Menzel |
| 8,280,792 B2 | 10/2012 | Rajan et al. |
| 8,280,810 B2 | 10/2012 | Grandcolas et al. |
| 8,281,372 B1 | 10/2012 | Vidal |
| 8,285,613 B1 | 10/2012 | Coulter |
| 8,285,656 B1 | 10/2012 | Chang et al. |
| 8,290,835 B2 | 10/2012 | Homer et al. |
| 8,290,840 B2 | 10/2012 | Kasower |
| 8,290,856 B1 | 10/2012 | Kasower |
| 8,290,865 B2 | 10/2012 | Lawrence et al. |
| 8,296,229 B1 | 10/2012 | Yellin et al. |
| 8,306,861 B2 | 11/2012 | Dunsmore et al. |
| 8,311,942 B1 | 11/2012 | Mason |
| 8,312,033 B1 | 11/2012 | McMillan |
| 8,315,945 B1 | 11/2012 | Gupta |
| 8,321,339 B2 | 11/2012 | Imrey et al. |
| 8,326,747 B2 | 12/2012 | Ang et al. |
| 8,326,770 B1 | 12/2012 | Weisman |
| 8,327,429 B2 | 12/2012 | Speyer et al. |
| 8,332,241 B2 | 12/2012 | Harrell et al. |
| 8,335,739 B1 | 12/2012 | Bol et al. |
| 8,352,365 B1 | 1/2013 | Goldberg et al. |
| 8,353,448 B1 | 1/2013 | Miller et al. |
| 8,355,966 B1 | 1/2013 | Vu et al. |
| 8,355,967 B2 | 1/2013 | Debie et al. |
| 8,359,003 B1 | 1/2013 | Gailloux et al. |
| 8,359,266 B2 | 1/2013 | Seale, III et al. |
| 8,364,711 B2 | 1/2013 | Wilkins et al. |
| 8,370,229 B2 | 2/2013 | Moduga et al. |
| 8,370,256 B1 | 2/2013 | Murphy |
| 8,374,962 B2 | 2/2013 | Abelman et al. |
| 8,374,973 B2 | 2/2013 | Herbrich et al. |
| 8,385,521 B2 | 2/2013 | Rustagi et al. |
| 8,386,341 B2 | 2/2013 | Bennett et al. |
| 8,391,846 B1 | 3/2013 | Mankovich |
| 8,392,272 B2 | 3/2013 | Lin |
| 8,392,300 B1 | 3/2013 | Battula et al. |
| 8,401,941 B1 | 3/2013 | Havemose |
| 8,401,965 B2 | 3/2013 | Johnson et al. |
| 8,401,966 B2 | 3/2013 | Stewart et al. |
| 8,412,593 B1 | 4/2013 | Song et al. |
| 8,417,627 B2 | 4/2013 | Cerise et al. |
| 8,417,635 B2 | 4/2013 | Kalra et al. |
| 8,423,387 B1 | 4/2013 | Mirza |
| 8,423,452 B1 | 4/2013 | Ley et al. |
| 8,423,461 B2 | 4/2013 | Mukherjee |
| 8,423,463 B1 | 4/2013 | Matthews et al. |
| 8,423,563 B2 | 4/2013 | McPeake et al. |
| 8,423,653 B2 | 4/2013 | Chang et al. |
| 8,429,073 B2 | 4/2013 | Ferguson et al. |
| 8,433,654 B2 | 4/2013 | Subbarao et al. |
| 8,438,063 B2 | 5/2013 | Albisu |
| 8,447,667 B1 | 5/2013 | Dinamani |
| 8,452,704 B2 | 5/2013 | Barbara et al. |
| 8,452,708 B1 | 5/2013 | Birenbaum et al. |
| 8,453,940 B2 | 6/2013 | Diamond |
| 8,456,293 B1 | 6/2013 | Trundle et al. |
| 8,458,062 B2 | 6/2013 | Dutt et al. |
| 8,463,831 B2 | 6/2013 | Harris et al. |
| 8,464,939 B1 | 6/2013 | Taylor et al. |
| 8,467,766 B2 | 6/2013 | Rackley, III et al. |
| 8,473,318 B2 | 6/2013 | Nielson et al. |
| 8,473,394 B2 | 6/2013 | Marshall |
| 8,478,674 B1 | 7/2013 | Kapczynski et al. |
| 8,483,473 B2 | 7/2013 | Roach et al. |
| 8,484,104 B1 | 7/2013 | Hurlbutt et al. |
| 8,484,131 B2 | 7/2013 | Kelly et al. |
| 8,484,186 B1 | 7/2013 | Kapczynski et al. |
| 8,489,067 B2 | 7/2013 | Rackley, III et al. |
| 8,489,504 B1 | 7/2013 | Gupta |
| 8,489,513 B2 | 7/2013 | Bishop et al. |
| 8,489,720 B1 | 7/2013 | Morford et al. |
| 8,490,126 B2 | 7/2013 | Walter et al. |
| 8,490,871 B1 | 7/2013 | Miller et al. |
| 8,494,958 B2 | 7/2013 | Schoenberg et al. |
| 8,498,613 B2 | 7/2013 | Aebi |
| 8,498,900 B2 | 7/2013 | Spirin et al. |
| 8,498,914 B2 | 7/2013 | Hazelhurst |
| 8,498,932 B2 | 7/2013 | Matthews |
| 8,500,006 B2 | 8/2013 | Carlson et al. |
| 8,504,394 B2 | 8/2013 | Nutkiewicz et al. |
| 8,504,474 B2 | 8/2013 | Armes et al. |
| 8,510,220 B2 | 8/2013 | Rackley, III et al. |
| 8,510,223 B2 | 8/2013 | Blair et al. |
| 8,515,825 B1 | 8/2013 | Ross, Jr. et al. |
| 8,515,828 B1 | 8/2013 | Wolf et al. |
| 8,515,842 B2 | 8/2013 | Papadimitriou |
| 8,515,844 B2 | 8/2013 | Kasower |
| 8,521,657 B2 | 8/2013 | Kuebert et al. |
| 8,527,357 B1 | 9/2013 | Ganesan |
| 8,527,377 B2 | 9/2013 | D'Englere |
| 8,527,410 B2 | 9/2013 | Markki et al. |
| 8,527,413 B2 | 9/2013 | Heller |
| 8,528,813 B1 | 9/2013 | Blossom |
| 8,533,118 B2 | 9/2013 | Weller et al. |
| 8,538,871 B2 | 9/2013 | Portillo et al. |
| 8,538,874 B2 | 9/2013 | Thomas |
| 8,538,878 B2 | 9/2013 | Meier et al. |
| 8,548,832 B2 | 10/2013 | Ika et al. |
| 8,548,907 B1 | 10/2013 | Campbell |
| 8,560,410 B2 | 10/2013 | Narkar |
| 8,560,436 B2 | 10/2013 | Ingram et al. |
| 8,560,447 B1 * | 10/2013 | Hinghole ............... G06Q 40/02 705/35 |
| 8,560,450 B2 | 10/2013 | Kumar et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,630,938 B2 | 1/2014 | Cheng et al. |
| 8,646,051 B2 | 2/2014 | Paden et al. |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,516 B1 | 5/2014 | Dean et al. |
| 8,751,378 B2 | 6/2014 | Dornhelm et al. |
| 8,768,914 B2 | 7/2014 | Scriffignano et al. |
| 8,775,299 B2 | 7/2014 | Achanta et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,230,283 B1 | 1/2016 | Taylor et al. |
| 9,256,904 B1 | 2/2016 | Haller et al. |

(56) References Cited

U.S. PATENT DOCUMENTS

| | | |
|---|---|---|
| 2001/0005840 A1 | 6/2001 | Verkama |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034618 A1 | 10/2001 | Kessler et al. |
| 2001/0037204 A1 | 11/2001 | Horn et al. |
| 2001/0037289 A1 | 11/2001 | Mayr et al. |
| 2001/0037295 A1 | 11/2001 | Olsen |
| 2001/0037297 A1 | 11/2001 | McNair |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0047332 A1 | 11/2001 | Gonen-Friedman et al. |
| 2001/0049274 A1 | 12/2001 | Degraeve |
| 2001/0056390 A1 | 12/2001 | Varadarajan et al. |
| 2002/0010616 A1 | 1/2002 | Itzhaki |
| 2002/0013827 A1 | 1/2002 | Edstrom et al. |
| 2002/0013899 A1 | 1/2002 | Faul |
| 2002/0016767 A1 | 2/2002 | Johnston |
| 2002/0016771 A1 | 2/2002 | Carothers et al. |
| 2002/0026423 A1 | 2/2002 | Maritzen et al. |
| 2002/0029192 A1 | 3/2002 | Nakagawa et al. |
| 2002/0032611 A1 | 3/2002 | Khan |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0040355 A1 | 4/2002 | Weiner |
| 2002/0042715 A1 | 4/2002 | Kelley |
| 2002/0045154 A1 | 4/2002 | Wood et al. |
| 2002/0046185 A1 | 4/2002 | Villart et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0065772 A1 | 5/2002 | Saliba et al. |
| 2002/0069122 A1 | 6/2002 | Yun et al. |
| 2002/0069165 A1 | 6/2002 | O'Neil |
| 2002/0069168 A1 | 6/2002 | Lee et al. |
| 2002/0069182 A1 | 6/2002 | Dwyer |
| 2002/0072927 A1 | 6/2002 | Phelan et al. |
| 2002/0077964 A1 | 6/2002 | Brody et al. |
| 2002/0077978 A1 | 6/2002 | O'Leary et al. |
| 2002/0087460 A1 | 7/2002 | Hornung |
| 2002/0087488 A1 | 7/2002 | Fordahl et al. |
| 2002/0099612 A1 | 7/2002 | Seaman et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120581 A1 | 8/2002 | Schiavone et al. |
| 2002/0120757 A1 | 8/2002 | Sutherland et al. |
| 2002/0120846 A1 | 8/2002 | Stewart et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138409 A1 | 9/2002 | Bass |
| 2002/0138470 A1 | 9/2002 | Zhou |
| 2002/0143674 A1 | 10/2002 | Beckman |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0194120 A1 | 12/2002 | Russell et al. |
| 2002/0198798 A1 | 12/2002 | Ludwig et al. |
| 2002/0198800 A1 | 12/2002 | Shamrakov |
| 2002/0198806 A1 | 12/2002 | Blagg et al. |
| 2002/0198824 A1 | 12/2002 | Cook |
| 2002/0198828 A1 | 12/2002 | Ludwig et al. |
| 2002/0198829 A1 | 12/2002 | Ludwig et al. |
| 2002/0198830 A1 | 12/2002 | Randell et al. |
| 2002/0198835 A1 | 12/2002 | Watson et al. |
| 2003/0002671 A1 | 1/2003 | Inchalik et al. |
| 2003/0007283 A1 | 1/2003 | Ostwald et al. |
| 2003/0009301 A1 | 1/2003 | Anand et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0023555 A1 | 1/2003 | Rees |
| 2003/0028466 A1 | 2/2003 | Jenson et al. |
| 2003/0028477 A1 | 2/2003 | Stevenson et al. |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0130892 A1 | 7/2003 | Taono et al. |
| 2003/0154122 A1 | 8/2003 | Jackson, Jr. et al. |
| 2003/0158960 A1 | 8/2003 | Engberg |
| 2003/0163418 A1 | 8/2003 | Marks |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0167229 A1 | 9/2003 | Ludwig et al. |
| 2003/0171942 A1 | 9/2003 | Gaito |
| 2003/0177090 A1 | 9/2003 | Eden |
| 2003/0187768 A1 | 10/2003 | Ryan et al. |
| 2003/0187837 A1 | 10/2003 | Culliss |
| 2003/0191701 A1 | 10/2003 | Haseltine et al. |
| 2003/0195859 A1 | 10/2003 | Lawrence |
| 2003/0196109 A1 | 10/2003 | Raley et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0217000 A1 | 11/2003 | Wichman |
| 2003/0220858 A1 | 11/2003 | Lam et al. |
| 2003/0220871 A1 | 11/2003 | Clarke et al. |
| 2003/0225742 A1 | 12/2003 | Tenner et al. |
| 2003/0229580 A1 | 12/2003 | Gass et al. |
| 2003/0229590 A1 | 12/2003 | Byrne et al. |
| 2004/0001565 A1 | 1/2004 | Jones et al. |
| 2004/0002907 A1 | 1/2004 | Tosswill |
| 2004/0002916 A1 | 1/2004 | Timmerman et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024702 A1 | 2/2004 | Angel et al. |
| 2004/0024709 A1 | 2/2004 | Yu et al. |
| 2004/0024717 A1 | 2/2004 | Sneeringer et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0064347 A1 | 4/2004 | VanOrman |
| 2004/0078424 A1 | 4/2004 | Yairi et al. |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |

(56) References Cited

U.S. PATENT DOCUMENTS

| | | |
|---|---|---|
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0122766 A1 | 6/2004 | Brooks et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1* | 7/2004 | Zielke et al. ............ 705/40 |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0139005 A1 | 7/2004 | Ganesan |
| 2004/0141005 A1 | 7/2004 | Banatwala et al. |
| 2004/0143546 A1 | 7/2004 | Wood et al. |
| 2004/0143547 A1 | 7/2004 | Mersky |
| 2004/0143596 A1 | 7/2004 | Sirkin |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0167823 A1 | 8/2004 | Neely et al. |
| 2004/0177035 A1 | 9/2004 | Silva |
| 2004/0186807 A1 | 9/2004 | Nathans et al. |
| 2004/0190694 A1 | 9/2004 | Schelberg, Jr. et al. |
| 2004/0193538 A1 | 9/2004 | Raines |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1* | 11/2004 | Greene ..................... 705/40 |
| 2004/0225643 A1 | 11/2004 | Alpha et al. |
| 2004/0230524 A1 | 11/2004 | Meiners |
| 2004/0230527 A1 | 11/2004 | Hansen et al. |
| 2004/0236678 A1 | 11/2004 | Johns et al. |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0253988 A1 | 12/2004 | Goldman |
| 2004/0254935 A1 | 12/2004 | Chagoly et al. |
| 2004/0255127 A1 | 12/2004 | Arnouse |
| 2004/0267646 A1 | 12/2004 | Chandhok et al. |
| 2004/0267714 A1 | 12/2004 | Frid et al. |
| 2005/0010474 A1 | 1/2005 | Desai et al. |
| 2005/0010513 A1 | 1/2005 | Duckworth et al. |
| 2005/0010523 A1 | 1/2005 | Myklebust et al. |
| 2005/0015273 A1 | 1/2005 | Iyer |
| 2005/0015338 A1 | 1/2005 | Lee |
| 2005/0021353 A1 | 1/2005 | Aviles et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0033651 A1 | 2/2005 | Kogan et al. |
| 2005/0033690 A1 | 2/2005 | Antognini et al. |
| 2005/0042983 A1 | 2/2005 | Borgward |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0065893 A1 | 3/2005 | Josephson |
| 2005/0071328 A1 | 3/2005 | Lawrence |
| 2005/0080723 A1 | 4/2005 | Burchetta et al. |
| 2005/0080796 A1 | 4/2005 | Midgley |
| 2005/0085931 A1 | 4/2005 | Willeby |
| 2005/0086126 A1 | 4/2005 | Patterson |
| 2005/0091159 A1 | 4/2005 | Ichikawa et al. |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125347 A1 | 6/2005 | Akialis et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0137948 A1 | 6/2005 | Kissner et al. |
| 2005/0137978 A1 | 6/2005 | Ganesan et al. |
| 2005/0144452 A1 | 6/2005 | Lynch et al. |
| 2005/0149354 A1 | 7/2005 | Cyr et al. |
| 2005/0149355 A1 | 7/2005 | Cyr et al. |
| 2005/0149356 A1 | 7/2005 | Cyr et al. |
| 2005/0149378 A1 | 7/2005 | Cyr et al. |
| 2005/0149379 A1 | 7/2005 | Cyr et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0165638 A1 | 7/2005 | Piller |
| 2005/0165681 A1 | 7/2005 | Heinemann et al. |
| 2005/0171850 A1 | 8/2005 | Yueh |
| 2005/0171884 A1 | 8/2005 | Arnott |
| 2005/0171900 A1 | 8/2005 | Onneken |
| 2005/0177480 A1 | 8/2005 | Huang |
| 2005/0177518 A1 | 8/2005 | Brown |
| 2005/0192839 A1 | 9/2005 | St. Jacques et al. |
| 2005/0203768 A1 | 9/2005 | Florance |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0226224 A1 | 10/2005 | Lee et al. |
| 2005/0240526 A1 | 10/2005 | Hill |
| 2005/0240578 A1 | 10/2005 | Biederman et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0278250 A1 | 12/2005 | Zair |
| 2005/0283414 A1 | 12/2005 | Fernandes et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0004654 A1* | 1/2006 | Kornegay et al. ............ 705/39 |
| 2006/0010391 A1 | 1/2006 | Uemura et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0044599 A1 | 3/2006 | Lipowitz et al. |
| 2006/0059110 A1 | 3/2006 | Madhok et al. |
| 2006/0059362 A1 | 3/2006 | Paden et al. |
| 2006/0064377 A1 | 3/2006 | Ganesan et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085337 A1 | 4/2006 | Conforti et al. |
| 2006/0085361 A1 | 4/2006 | Hoerle et al. |
| 2006/0095289 A1 | 5/2006 | Bunning |

(56) References Cited

U.S. PATENT DOCUMENTS

| | | |
|---|---|---|
| 2006/0101508 A1 | 5/2006 | Taylor |
| 2006/0106670 A1 | 5/2006 | Cai et al. |
| 2006/0106685 A1 | 5/2006 | Cheng et al. |
| 2006/0121880 A1 | 6/2006 | Cowsar et al. |
| 2006/0122932 A1 | 6/2006 | Birtwell et al. |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136180 A1 | 6/2006 | Hansen et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0169766 A1 | 8/2006 | Hoch |
| 2006/0173775 A1 | 8/2006 | Cullen, III et al. |
| 2006/0173776 A1 | 8/2006 | Shalley et al. |
| 2006/0173778 A1 | 8/2006 | Lipsky et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190334 A1 | 8/2006 | Smith |
| 2006/0190394 A1 | 8/2006 | Fraser et al. |
| 2006/0195351 A1 | 8/2006 | Bayburtian |
| 2006/0195395 A1 | 8/2006 | Ganesan et al. |
| 2006/0195396 A1 | 8/2006 | Ganesan et al. |
| 2006/0195397 A1 | 8/2006 | Ganesan et al. |
| 2006/0195398 A1 | 8/2006 | Dheer et al. |
| 2006/0200583 A1 | 9/2006 | Le Lann et al. |
| 2006/0202012 A1 | 9/2006 | Grano et al. |
| 2006/0206425 A1 | 9/2006 | Sharma |
| 2006/0212407 A1 | 9/2006 | Lyon |
| 2006/0218407 A1 | 9/2006 | Toms |
| 2006/0223043 A1 | 10/2006 | Dancy-Edwards et al. |
| 2006/0224469 A1 | 10/2006 | Kunz et al. |
| 2006/0229943 A1 | 10/2006 | Mathias et al. |
| 2006/0229961 A1 | 10/2006 | Lyftogt et al. |
| 2006/0235775 A1 | 10/2006 | Pollin |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0259427 A1 | 11/2006 | Randell et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0011093 A1 | 1/2007 | Tree |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038563 A1 | 2/2007 | Ryzerski |
| 2007/0038568 A1 | 2/2007 | Greene et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0055621 A1 | 3/2007 | Tischler et al. |
| 2007/0067239 A1 | 3/2007 | Dheer et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0083465 A1 | 4/2007 | Ciurea et al. |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0100748 A1 | 5/2007 | Dheer et al. |
| 2007/0100749 A1 | 5/2007 | Bachu et al. |
| 2007/0100770 A1 | 5/2007 | Grinberg et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0150321 A1 | 6/2007 | Zhao et al. |
| 2007/0156554 A1 | 7/2007 | Nikoley et al. |
| 2007/0156576 A1 | 7/2007 | Imrey et al. |
| 2007/0156581 A1* | 7/2007 | Imrey et al. .................. 705/39 |
| 2007/0156692 A1 | 7/2007 | Rosewarne |
| 2007/0160458 A1 | 7/2007 | Yen |
| 2007/0168279 A1 | 7/2007 | D'Angelo |
| 2007/0174186 A1 | 7/2007 | Hokland |
| 2007/0174448 A1 | 7/2007 | Ahuja et al. |
| 2007/0174903 A1 | 7/2007 | Greff |
| 2007/0198336 A1 | 8/2007 | Thompson |
| 2007/0198432 A1 | 8/2007 | Pitroda et al. |
| 2007/0204338 A1 | 8/2007 | Aiello et al. |
| 2007/0205266 A1 | 9/2007 | Carr et al. |
| 2007/0208640 A1 | 9/2007 | Banasiak et al. |
| 2007/0214078 A1 | 9/2007 | Coppinger |
| 2007/0219881 A1 | 9/2007 | Peterson et al. |
| 2007/0220003 A1 | 9/2007 | Chern et al. |
| 2007/0226047 A1 | 9/2007 | Ward |
| 2007/0226122 A1 | 9/2007 | Burrell et al. |
| 2007/0228148 A1 | 10/2007 | Rable |
| 2007/0233591 A1 | 10/2007 | Newton |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0276750 A1 | 11/2007 | Stuart |
| 2007/0282743 A1 | 12/2007 | Lovelett |
| 2007/0288355 A1 | 12/2007 | Roland et al. |
| 2007/0288360 A1 | 12/2007 | Seeklus |
| 2007/0294195 A1 | 12/2007 | Curry et al. |
| 2007/0295804 A1 | 12/2007 | Garvey et al. |
| 2007/0299770 A1 | 12/2007 | Delinsky |
| 2008/0004957 A1 | 1/2008 | Hildreth et al. |
| 2008/0005760 A1 | 1/2008 | Kay et al. |
| 2008/0010191 A1 | 1/2008 | Rackley, III et al. |
| 2008/0010203 A1 | 1/2008 | Grant |
| 2008/0010204 A1 | 1/2008 | Rackley, III et al. |
| 2008/0010206 A1 | 1/2008 | Coleman |
| 2008/0010687 A1 | 1/2008 | Gonen et al. |
| 2008/0015982 A1 | 1/2008 | Sokolic et al. |
| 2008/0015985 A1 | 1/2008 | Abhari et al. |
| 2008/0021761 A1 | 1/2008 | Rable |
| 2008/0021802 A1 | 1/2008 | Pendleton |
| 2008/0027859 A1 | 1/2008 | Nathans et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040610 A1 | 2/2008 | Fergusson |
| 2008/0046363 A1 | 2/2008 | Ali et al. |
| 2008/0047017 A1 | 2/2008 | Renaud |
| 2008/0052182 A1 | 2/2008 | Marshall |

(56) References Cited

U.S. PATENT DOCUMENTS

| | | |
|---|---|---|
| 2008/0052208 A1 | 2/2008 | Neece et al. |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0091818 A1 | 4/2008 | Bailey et al. |
| 2008/0103800 A1 | 5/2008 | Domenikos et al. |
| 2008/0103836 A1 | 5/2008 | Park et al. |
| 2008/0103972 A1 | 5/2008 | Lanc |
| 2008/0109355 A1 | 5/2008 | Dutta et al. |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114657 A1 | 5/2008 | Forzley |
| 2008/0114670 A1 | 5/2008 | Friesen |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126136 A1 | 5/2008 | Nighan |
| 2008/0126233 A1 | 5/2008 | Hogan |
| 2008/0133273 A1 | 6/2008 | Marshall |
| 2008/0133278 A1 | 6/2008 | Stanfield |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177630 A1 | 7/2008 | Maghfourian et al. |
| 2008/0177655 A1 | 7/2008 | Zalik |
| 2008/0183480 A1 | 7/2008 | Carlson et al. |
| 2008/0183504 A1 | 7/2008 | Highley |
| 2008/0183585 A1 | 7/2008 | Vianello |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208735 A1 | 8/2008 | Balet et al. |
| 2008/0210752 A1 | 9/2008 | March |
| 2008/0212845 A1 | 9/2008 | Lund |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0235091 A1 | 9/2008 | Holliday |
| 2008/0243650 A1 | 10/2008 | Yoon |
| 2008/0249869 A1 | 10/2008 | Angell et al. |
| 2008/0249936 A1 | 10/2008 | Miller et al. |
| 2008/0255992 A1 | 10/2008 | Lin |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0270304 A1 | 10/2008 | Brown |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0288400 A1 | 11/2008 | Panthaki et al. |
| 2008/0291932 A1 | 11/2008 | Mukherjee |
| 2008/0294501 A1 | 11/2008 | Rennich et al. |
| 2008/0301016 A1 | 12/2008 | Durvasula et al. |
| 2008/0319889 A1 | 12/2008 | Hammad |
| 2009/0006230 A1 | 1/2009 | Lyda et al. |
| 2009/0024484 A1 | 1/2009 | Walker et al. |
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0043696 A1 | 2/2009 | Ornce et al. |
| 2009/0047992 A1 | 2/2009 | Ortiz et al. |
| 2009/0048957 A1 | 2/2009 | Celano |
| 2009/0048999 A1 | 2/2009 | Gupta et al. |
| 2009/0055322 A1 | 2/2009 | Bykov et al. |
| 2009/0055404 A1 | 2/2009 | Heiden et al. |
| 2009/0058676 A1 | 3/2009 | Orlosky |
| 2009/0063330 A1* | 3/2009 | Cerise et al. .................. 705/38 |
| 2009/0064297 A1 | 3/2009 | Selgas et al. |
| 2009/0089190 A1 | 4/2009 | Girulat |
| 2009/0089193 A1* | 4/2009 | Paintin .......................... 705/34 |
| 2009/0089205 A1 | 4/2009 | Bayne |
| 2009/0089869 A1 | 4/2009 | Varghese |
| 2009/0094156 A1 | 4/2009 | Wright et al. |
| 2009/0094237 A1 | 4/2009 | Churi et al. |
| 2009/0094675 A1 | 4/2009 | Powers |
| 2009/0098854 A1 | 4/2009 | Park et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112746 A1 | 4/2009 | Fong |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132312 A1 | 5/2009 | Reinheimer et al. |
| 2009/0132347 A1 | 5/2009 | Anderson et al. |
| 2009/0157517 A1 | 6/2009 | Davis |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164929 A1 | 6/2009 | Chen et al. |
| 2009/0171723 A1 | 7/2009 | Jenkins |
| 2009/0171817 A1 | 7/2009 | Cassis |
| 2009/0171838 A1 | 7/2009 | Liu et al. |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198572 A1 | 8/2009 | Jurgens |
| 2009/0198602 A1 | 8/2009 | Wang et al. |
| 2009/0199094 A1 | 8/2009 | Jurgens et al. |
| 2009/0199294 A1 | 8/2009 | Schneider |
| 2009/0204435 A1 | 8/2009 | Gale |
| 2009/0204514 A1 | 8/2009 | Bhogal et al. |
| 2009/0204519 A1 | 8/2009 | Randell et al. |
| 2009/0204522 A1 | 8/2009 | Meyer et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0228392 A1 | 9/2009 | Pinson, III |
| 2009/0228918 A1 | 9/2009 | Rolff et al. |
| 2009/0228966 A1 | 9/2009 | Parfene et al. |
| 2009/0234665 A1 | 9/2009 | Conkel |
| 2009/0234775 A1 | 9/2009 | Whitney et al. |

(56) References Cited

U.S. PATENT DOCUMENTS

| | | |
|---|---|---|
| 2009/0234876 A1 | 9/2009 | Schigel et al. |
| 2009/0240567 A1 | 9/2009 | Kinkead et al. |
| 2009/0240610 A1 | 9/2009 | Barsade |
| 2009/0240624 A1 | 9/2009 | James et al. |
| 2009/0244600 A1 | 10/2009 | Haycock et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0288012 A1 | 11/2009 | Hertel et al. |
| 2009/0289110 A1 | 11/2009 | Regen et al. |
| 2009/0292603 A1 | 11/2009 | Wallach |
| 2009/0292642 A1 | 11/2009 | Han |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0300668 A1 | 12/2009 | Campagna et al. |
| 2009/0307778 A1 | 12/2009 | Mardikar |
| 2009/0313562 A1 | 12/2009 | Appleyard et al. |
| 2009/0319294 A1 | 12/2009 | Phillips et al. |
| 2009/0319648 A1 | 12/2009 | Dutta et al. |
| 2009/0327054 A1 | 12/2009 | Yao et al. |
| 2009/0327108 A1 | 12/2009 | Swierz, III et al. |
| 2009/0327120 A1 | 12/2009 | Eze et al. |
| 2009/0327270 A1 | 12/2009 | Teevan et al. |
| 2010/0005024 A1 | 1/2010 | Schmitz et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0030578 A1 | 2/2010 | Siddique et al. |
| 2010/0030649 A1 | 2/2010 | Ubelhor |
| 2010/0030675 A1 | 2/2010 | Hanan et al. |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042539 A1 | 2/2010 | Dheer et al. |
| 2010/0042542 A1 | 2/2010 | Rose et al. |
| 2010/0043055 A1 | 2/2010 | Baumgart |
| 2010/0049642 A1 | 2/2010 | Agisim et al. |
| 2010/0049643 A1 | 2/2010 | Mitchell et al. |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0076880 A1 | 3/2010 | Williams et al. |
| 2010/0077483 A1 | 3/2010 | Stolfo et al. |
| 2010/0082476 A1 | 4/2010 | Bowman |
| 2010/0083371 A1 | 4/2010 | Bennetts et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100480 A1 | 4/2010 | Altman et al. |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114766 A1 | 5/2010 | Gustin et al. |
| 2010/0114768 A1 | 5/2010 | Duke et al. |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0125521 A1 | 5/2010 | Hanan et al. |
| 2010/0130172 A1 | 5/2010 | Vendrow et al. |
| 2010/0131396 A1 | 5/2010 | Roach |
| 2010/0136956 A1 | 6/2010 | Drachev et al. |
| 2010/0138314 A1 | 6/2010 | Li et al. |
| 2010/0145836 A1 | 6/2010 | Baker et al. |
| 2010/0153227 A1 | 6/2010 | Medvinsky et al. |
| 2010/0153278 A1 | 6/2010 | Farsedakis |
| 2010/0153290 A1 | 6/2010 | Duggan |
| 2010/0161466 A1 | 6/2010 | Gilder |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0217706 A1 | 8/2010 | Griffin et al. |
| 2010/0217837 A1 | 8/2010 | Ansari et al. |
| 2010/0223160 A1 | 9/2010 | Brown |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250376 A1 | 9/2010 | Nandiraju |
| 2010/0250394 A1 | 9/2010 | Lin |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0280944 A1 | 11/2010 | Low et al. |
| 2010/0281020 A1 | 11/2010 | Drubner |
| 2010/0293090 A1 | 11/2010 | Domenikos et al. |
| 2010/0299186 A1 | 11/2010 | Cameo et al. |
| 2010/0306103 A1 | 12/2010 | Hankins et al. |
| 2010/0318460 A1 | 12/2010 | Stewart et al. |
| 2010/0323446 A1 | 12/2010 | Barnett et al. |
| 2010/0325045 A1 | 12/2010 | Johnson |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0010283 A1 | 1/2011 | Williams |
| 2011/0022515 A1 | 1/2011 | Tallitsch et al. |
| 2011/0022516 A1 | 1/2011 | Gao et al. |
| 2011/0023115 A1 | 1/2011 | Wright |
| 2011/0029388 A1 | 2/2011 | Kendall et al. |
| 2011/0035305 A1 | 2/2011 | Imrey et al. |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi |
| 2011/0082733 A1 | 4/2011 | Goldman et al. |
| 2011/0082736 A1 | 4/2011 | Goldman et al. |
| 2011/0082788 A1 | 4/2011 | Itwaru |
| 2011/0083181 A1 | 4/2011 | Nazarov |
| 2011/0093387 A1 | 4/2011 | Fuerstenberg et al. |
| 2011/0112851 A1 | 5/2011 | Poley |
| 2011/0112919 A1 | 5/2011 | Gray |
| 2011/0113084 A1 | 5/2011 | Ramnani |
| 2011/0113096 A1 | 5/2011 | Long et al. |
| 2011/0119182 A1 | 5/2011 | Smolkin |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0136468 A1 | 6/2011 | McNamara et al. |
| 2011/0137760 A1 | 6/2011 | Rudie et al. |
| 2011/0137765 A1 | 6/2011 | Nonaka |

(56) References Cited

U.S. PATENT DOCUMENTS

| | | |
|---|---|---|
| 2011/0142213 A1 | 6/2011 | Baniak et al. |
| 2011/0145049 A1 | 6/2011 | Hertel et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166889 A1 | 7/2011 | Bain |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178860 A1 | 7/2011 | Imrey et al. |
| 2011/0179139 A1 | 7/2011 | Starkenburg et al. |
| 2011/0184780 A1 | 7/2011 | Alderson et al. |
| 2011/0184863 A1 | 7/2011 | Coleman et al. |
| 2011/0191196 A1 | 8/2011 | Orr et al. |
| 2011/0191209 A1 | 8/2011 | Gould et al. |
| 2011/0191241 A1 | 8/2011 | Blain et al. |
| 2011/0196791 A1 | 8/2011 | Dominguez |
| 2011/0196795 A1 | 8/2011 | Pointer |
| 2011/0208601 A1 | 8/2011 | Ferguson et al. |
| 2011/0208659 A1 | 8/2011 | Easterly et al. |
| 2011/0211445 A1 | 9/2011 | Chen |
| 2011/0218863 A1 | 9/2011 | Roh et al. |
| 2011/0246244 A1 | 10/2011 | O'Rourke |
| 2011/0246361 A1 | 10/2011 | Geering |
| 2011/0251953 A1 | 10/2011 | Trende et al. |
| 2011/0258001 A1 | 10/2011 | Green et al. |
| 2011/0264566 A1 | 10/2011 | Brown |
| 2011/0264581 A1 | 10/2011 | Clyne |
| 2011/0264582 A1 | 10/2011 | Kim et al. |
| 2011/0270618 A1 | 11/2011 | Banerjee et al. |
| 2011/0270749 A1 | 11/2011 | Bennett et al. |
| 2011/0270754 A1 | 11/2011 | Kelly et al. |
| 2011/0276396 A1 | 11/2011 | Rathod |
| 2011/0276414 A1* | 11/2011 | Subbarao ............ G06Q 20/102 705/14.73 |
| 2011/0288973 A1 | 11/2011 | Pazdziora et al. |
| 2011/0295662 A1 | 12/2011 | Harris |
| 2011/0295750 A1 | 12/2011 | Rammal |
| 2011/0302055 A1 | 12/2011 | Drake |
| 2011/0302067 A1 | 12/2011 | Washington |
| 2011/0302122 A1 | 12/2011 | Klein et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0313921 A1 | 12/2011 | Dheer et al. |
| 2012/0005070 A1 | 1/2012 | McFall et al. |
| 2012/0011027 A1 | 1/2012 | Okuyama |
| 2012/0011158 A1 | 1/2012 | Avner et al. |
| 2012/0016800 A1 | 1/2012 | Stewart et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036065 A1 | 2/2012 | Orttung et al. |
| 2012/0041879 A1 | 2/2012 | Kim et al. |
| 2012/0046974 A1 | 2/2012 | Eshleman et al. |
| 2012/0047219 A1 | 2/2012 | Feng et al. |
| 2012/0054088 A1 | 3/2012 | Edrington et al. |
| 2012/0054224 A1 | 3/2012 | Eskin |
| 2012/0054592 A1 | 3/2012 | Jaffe et al. |
| 2012/0060105 A1 | 3/2012 | Brown et al. |
| 2012/0066046 A1 | 3/2012 | Satyavolu et al. |
| 2012/0066050 A1 | 3/2012 | Satyavolu et al. |
| 2012/0066106 A1* | 3/2012 | Papadimitriou ....... G06Q 40/00 705/35 |
| 2012/0066119 A1 | 3/2012 | Carion |
| 2012/0072338 A1 | 3/2012 | Sorbe |
| 2012/0072382 A1 | 3/2012 | Pearson et al. |
| 2012/0078764 A1 | 3/2012 | Ross et al. |
| 2012/0078781 A1 | 3/2012 | Ross et al. |
| 2012/0078932 A1 | 3/2012 | Skurtovich, Jr. et al. |
| 2012/0084162 A1 | 4/2012 | Smith et al. |
| 2012/0084210 A1 | 4/2012 | Farahmand |
| 2012/0084866 A1 | 4/2012 | Stolfo |
| 2012/0089438 A1 | 4/2012 | Tavares et al. |
| 2012/0089521 A1 | 4/2012 | Abrevaya et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0116963 A1 | 5/2012 | Klein et al. |
| 2012/0124498 A1 | 5/2012 | Santoro et al. |
| 2012/0130785 A1 | 5/2012 | Postrel |
| 2012/0136699 A1 | 5/2012 | Martin et al. |
| 2012/0136763 A1 | 5/2012 | Megdal et al. |
| 2012/0136774 A1 | 5/2012 | Imrey et al. |
| 2012/0136780 A1 | 5/2012 | El-Awady et al. |
| 2012/0143767 A1 | 6/2012 | Abadir |
| 2012/0143772 A1 | 6/2012 | Abadir |
| 2012/0150736 A1 | 6/2012 | Dickerson et al. |
| 2012/0151045 A1 | 6/2012 | Anakata et al. |
| 2012/0158654 A1 | 6/2012 | Behren et al. |
| 2012/0166264 A1 | 6/2012 | Shum et al. |
| 2012/0173339 A1 | 7/2012 | Flynt et al. |
| 2012/0173396 A1 | 7/2012 | Melby et al. |
| 2012/0173417 A1* | 7/2012 | Lohman et al. ................. 705/40 |
| 2012/0179605 A1 | 7/2012 | Blain et al. |
| 2012/0185515 A1 | 7/2012 | Ferrel et al. |
| 2012/0191602 A1 | 7/2012 | Wright et al. |
| 2012/0197788 A1 | 8/2012 | Sanghvi et al. |
| 2012/0198556 A1 | 8/2012 | Patel et al. |
| 2012/0203680 A1 | 8/2012 | Wehunt et al. |
| 2012/0203693 A1 | 8/2012 | Morgan et al. |
| 2012/0203696 A1 | 8/2012 | Morgan et al. |
| 2012/0208495 A1 | 8/2012 | Lawson et al. |
| 2012/0209766 A1 | 8/2012 | Kitchen et al. |
| 2012/0215682 A1 | 8/2012 | Lent et al. |
| 2012/0215690 A1 | 8/2012 | Grinberg et al. |
| 2012/0215719 A1 | 8/2012 | Verlander |
| 2012/0216125 A1 | 8/2012 | Pierce |
| 2012/0233066 A1 | 9/2012 | Vallabhaneni |
| 2012/0235897 A1 | 9/2012 | Hirota |
| 2012/0239497 A1 | 9/2012 | Nuzzi |
| 2012/0239553 A1 | 9/2012 | Gonen et al. |
| 2012/0239560 A1 | 9/2012 | Pourfallah et al. |
| 2012/0246060 A1 | 9/2012 | Conyack, Jr. et al. |
| 2012/0253852 A1 | 10/2012 | Pourfallah et al. |
| 2012/0259763 A1 | 10/2012 | Pessin |
| 2012/0278767 A1 | 11/2012 | Stibel et al. |
| 2012/0290451 A1 | 11/2012 | Jones et al. |
| 2012/0290660 A1 | 11/2012 | Rao et al. |
| 2012/0295583 A1 | 11/2012 | Kim et al. |
| 2012/0297484 A1 | 11/2012 | Srivastava |
| 2012/0310825 A1 | 12/2012 | Freishtat et al. |
| 2012/0311433 A1 | 12/2012 | Pasupulati et al. |
| 2012/0317005 A1 | 12/2012 | Hutson et al. |
| 2012/0317014 A1 | 12/2012 | Cerise et al. |
| 2012/0323775 A1 | 12/2012 | Weinstein et al. |
| 2012/0324388 A1 | 12/2012 | Rao et al. |
| 2013/0006782 A1 | 1/2013 | Schwarzkopf et al. |
| 2013/0006843 A1 | 1/2013 | Tralvex |
| 2013/0013509 A1 | 1/2013 | Perlman |
| 2013/0013533 A1 | 1/2013 | Agarwal et al. |
| 2013/0018785 A1 | 1/2013 | Dolphin et al. |
| 2013/0018811 A1 | 1/2013 | Britti et al. |
| 2013/0024238 A1 | 1/2013 | Nielson et al. |
| 2013/0030994 A1 | 1/2013 | Calman et al. |
| 2013/0030996 A1 | 1/2013 | MacKouse |
| 2013/0031109 A1 | 1/2013 | Roulson et al. |
| 2013/0031624 A1 | 1/2013 | Britti et al. |
| 2013/0036000 A1 | 2/2013 | Giordano et al. |
| 2013/0036046 A1 | 2/2013 | Rom et al. |
| 2013/0043305 A1 | 2/2013 | Zhou et al. |
| 2013/0054345 A1 | 2/2013 | Ross et al. |
| 2013/0054393 A1 | 2/2013 | Francisco et al. |
| 2013/0054452 A1 | 2/2013 | Au et al. |
| 2013/0060694 A1 | 3/2013 | Oskolkov et al. |
| 2013/0066775 A1 | 3/2013 | Milam |
| 2013/0073445 A1 | 3/2013 | Meszaros |
| 2013/0073457 A1 | 3/2013 | Sander et al. |
| 2013/0080467 A1 | 3/2013 | Carson et al. |
| 2013/0085804 A1 | 4/2013 | Leff et al. |
| 2013/0085936 A1 | 4/2013 | Law et al. |
| 2013/0085939 A1 | 4/2013 | Colak et al. |

(56) References Cited

U.S. PATENT DOCUMENTS

| | | |
|---|---|---|
| 2013/0095810 A1 | 4/2013 | Moreton et al. |
| 2013/0103571 A1 | 4/2013 | Chung et al. |
| 2013/0103580 A1 | 4/2013 | Ventura |
| 2013/0110557 A1 | 5/2013 | Kasower |
| 2013/0110565 A1 | 5/2013 | Means et al. |
| 2013/0110668 A1 | 5/2013 | Hart et al. |
| 2013/0117072 A1 | 5/2013 | Nish |
| 2013/0117087 A1 | 5/2013 | Coppinger |
| 2013/0117177 A1 | 5/2013 | Macmillan et al. |
| 2013/0124392 A1 | 5/2013 | Achanta et al. |
| 2013/0124406 A1 | 5/2013 | Poplawski et al. |
| 2013/0125010 A1 | 5/2013 | Strandell |
| 2013/0130778 A1 | 5/2013 | Anderson et al. |
| 2013/0132151 A1 | 5/2013 | Stibel et al. |
| 2013/0132181 A1 | 5/2013 | Fisher |
| 2013/0132219 A1 | 5/2013 | Liberty |
| 2013/0132235 A1 | 5/2013 | Gandhi |
| 2013/0132245 A1 | 5/2013 | Hsieh et al. |
| 2013/0138494 A1 | 5/2013 | Levine |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173463 A1 | 7/2013 | Stewart et al. |
| 2013/0173465 A1 | 7/2013 | Talimaa et al. |
| 2013/0173468 A1 | 7/2013 | Ross |
| 2013/0179312 A1 | 7/2013 | Al-Hilali |
| 2013/0179332 A1 | 7/2013 | Allen et al. |
| 2013/0179337 A1 | 7/2013 | Ochynski |
| 2013/0179348 A1 | 7/2013 | Crofts et al. |
| 2013/0185205 A1 | 7/2013 | Boss et al. |
| 2013/0185293 A1 | 7/2013 | Boback |
| 2013/0191231 A1 | 7/2013 | Gazdzinski |
| 2013/0191270 A1 | 7/2013 | Carragher |
| 2013/0191272 A1 | 7/2013 | Cochran et al. |
| 2013/0191278 A1 | 7/2013 | O'Leary et al. |
| 2013/0198066 A1 | 8/2013 | Wall et al. |
| 2013/0198514 A1 | 8/2013 | Grinberg et al. |
| 2013/0204745 A1 | 8/2013 | Martin |
| 2013/0204753 A1 | 8/2013 | Wallace |
| 2013/0205135 A1 | 8/2013 | Lutz |
| 2013/0211986 A1 | 8/2013 | Debie et al. |
| 2013/0212016 A1 | 8/2013 | Davis et al. |
| 2013/0226784 A1 | 8/2013 | He et al. |
| 2013/0246254 A1 | 9/2013 | Crooks |
| 2013/0254049 A1 | 9/2013 | Todd |
| 2013/0262226 A1 | 10/2013 | LaChapelle et al. |
| 2013/0262291 A1 | 10/2013 | Ricci |
| 2013/0267171 A1 | 10/2013 | Sarkar et al. |
| 2013/0268378 A1 | 10/2013 | Yovin |
| 2013/0268434 A1 | 10/2013 | Mohsenzadeh |
| 2013/0275294 A1 | 10/2013 | Liu et al. |
| 2013/0279676 A1 | 10/2013 | Baniak et al. |
| 2013/0293363 A1 | 11/2013 | Plymouth |
| 2013/0297485 A1 | 11/2013 | Whitney |
| 2013/0298238 A1 | 11/2013 | Shah et al. |
| 2013/0304596 A1 | 11/2013 | Munif |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1* | 1/2014 | Daley .............................. 705/40 |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0298485 A1 | 10/2014 | Gardner |
| 2014/0317023 A1 | 10/2014 | Kim |
| 2014/0379554 A1 | 12/2014 | Grossman et al. |
| 2015/0178829 A1 | 6/2015 | Weiss |
| 2015/0310543 A1 | 10/2015 | Debie |
| 2015/0324920 A1 | 11/2015 | Wilson et al. |
| 2015/0326580 A1 | 11/2015 | McMillan et al. |

FOREIGN PATENT DOCUMENTS

| | | |
|---|---|---|
| EP | 1 301 887 | 4/2003 |
| EP | 1 850 278 | 10/2007 |
| EP | 2 088 743 | 8/2009 |
| GB | 2 102 606 | 2/1983 |
| JP | 2005-208945 | 8/2005 |
| KR | 2000-0063313 | 11/2000 |
| KR | 2002-0039203 | 5/2002 |
| KR | 10-2007-0081504 | 8/2007 |
| WO | WO 91/16691 | 10/1991 |
| WO | WO 00/55778 | 9/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |

OTHER PUBLICATIONS

Irby, LaToya, "How Will a Late Payment Hurt My Credit Score?", Oct. 24, 2010 archive accessed via Internet Archive Wayback Machine <http://www.archive.org>.*

U.S. Appl. No. 12/705,489, filed Feb. 12, 2010, Bargoli et al.

U.S. Appl. No. 12/705,511, filed Feb. 12, 2010, Bargoli et al.

Actuate, "Delivering Enterprise Information for Corporate Portals", White Paper, 2004, pp. 1-7.

"Aggregate and Analyze Social Media Content: Gain Faster and Broader Insight to Market Sentiment," SAP Partner, Mantis Technology Group, Apr. 2011, pp. 4.

Aktas et al., "Personalizing PageRank Based on Domain Profiles", WEBKDD workshop: Webmining and Web Usage Analysis, Aug. 22, 2004, pp. 83-90.

Aktas et al., "Using Hyperlink Features to Personalize Web Search", WEBKDD workshop: Webmining and Web Usage Analysis, Aug. 2004.

"Arizona Company Has Found Key in Stopping ID Theft," PR Newswire, New York, Aug. 10, 2005 http://proquest.umi.com/pqdweb?did=880104711&sid=1&Fmt=3&clientId=19649&ROT=309&Vname=PQD.

ABC News Now:Money Matters, as broadcasted Nov. 15, 2005 with guest Todd Davis (CEO of Lifelock), pp. 6.

Anonymous, "Credit-Report Disputes Await Electronic Resolution," Credit Card News, Chicago, Jan. 15, 1993, vol. 5, No. 19, p. 5.

(56) References Cited

OTHER PUBLICATIONS

Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/printed Feb. 5, 2014 in 1 page.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar.10 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Tern; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/, printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Elliehausen et al., The Impact of Credit Counseling on Subsequent Borrower Behavior, The Journal of Consumer Affairs, Summer 2007, vol. 41, No. 1, pp. 1-28.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
Equifax; "Welcome to Equifax Mobile," http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobil Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Fitzpatrick, Alex, "Facebook Monitors Your Chats for Criminal Activity [REPORT]," Mashable, Jul. 12, 2012 printed Sep. 27, 2013 http://mashable.com/2012/07/12/facebook-scanning-chats/.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?852869731&sid=1&Fmt=3&clientId=19649&ROT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.

(56) References Cited

OTHER PUBLICATIONS

Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.

Iovation, Device Identification & Device Fingerprinting, http://www.iovation.com/risk-management/device-identification printed Nov. 5, 2012 in 6 pages.

"Judging Credit: Consumers Need Better Finance Tools", News Journal, Daytona Beach, FL, Dec. 28, 2002.

Lan, Joe, "The Top Portfolio Management Software," http://www.aaii.com/computerizedinvesting/article/the-top-portfolio-management-software, Includes Discussion thread, Fourth Quarter 2011, pp. 17.

Lanubile, et al., "Evaluating Empirical Models for the Detection of High-Risk Components: Some Lessons Learned", 20th Annual Software Engineering Workshop, Nov. 29-30, 1995, Greenbelt, Maryland pp. 1-6.

Lee, W.A.; "Experian, on Deal Hunt, Nets Identity Theft Insurer", American Banker: The Financial Services Daily, Jun. 4, 2003, New York, NY, 1 page.

Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.

Letter to Donald A. Robert from Carolyn B. Maloney, dated Oct. 31, 2007, pp. 2.

Letter to Donald A. Robert from Senator Charles E. Schumer, dated Oct. 11, 2007, pp. 2.

Letter to Harry C. Gambill from Carolyn B. Maloney, dated Oct. 31, 2007, pp. 2.

Letter to Harry C. Gambill from Senator Charles E. Schumer, dated Oct. 11, 2007, pp. 2.

Letter to Richard F. Smith from Carolyn B. Maloney, dated Oct. 31, 2007, pp. 2.

Letter to Richard F. Smith from Senator Charles E. Schumer, dated Oct. 11, 2007, pp. 2.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Littwin, Angela, "Beyond Usury: A Study of Credit-Card Use and Preference Among Low-Income Consumers", Texas Law Review, vol. 86, No. 3, pp. 451-506; Feb. 2008.

Lobo, Jude, "MySAP.com Enterprise Portal Cookbook," SAP Technical Delivery, Feb. 2002, vol. 1, pp. 1-13.

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

"Managing Debt?" Federal Trade Commission: Consumer Information, http://www.consurner.ftc.gov/articles/0158-managing-debt, printed Mar. 22, 2013 in 4 pages.

Manilla, http://www.manilla.com/how-it-works/ printed Feb. 5, 2014 in 1 page.

Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.

Micarelli et al., "Personalized Search on the World Wide Web," The Adaptive Web, LNCS 4321, 2007, pp. 195-230.

Microsoft, "Expand the Reach of Your Business," Microsoft Business Solutions, 2004, in 16 pages.

Mint.com, http://www.mint.com/ printed Sep. 18, 2008 in 2 pages.

Mint.com, http://www.mint.com/how-it-works/ printed Feb. 5, 2013 in 2 pages.

MS Money Software by Microsoft http://www.microsoft.com/Money/default.mspx as retrieved on Sep. 17, 2008.

Mvelopes, http://www.mvelopes.com/ printed Feb. 5, 2014 in 2 pages.

My Call Credit http://www.mycallcredit.com/products.asp?product=ALR dated Dec. 10, 2005 on www.archive.org.

My Call Credit http://www.mycallcredit.com/rewrite.asp?display=faq dated Dec. 10, 2005 on www.archive.org.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

MyReceipts, http://www.myreceipts.com/, printed Oct. 16, 2012 in 1 page.

MyReceipts—How it Works, http://www.myreceipis.com/howItWorks.do, printed Oct. 16, 2012 in 1 page.

"Name Availability Records", Westlaw Database Directory, http://directoy.westlaw.com/scope/default.asp?db=NA-ALL&RS=W&VR=2.0 as printed Dec. 17, 2009, pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

"New for Investors: Asset Allocation, Seasoned Returns and More," Prosper, http://blog.prosper.com/2011/10/27/new-for-investors-asset-allocatrion-seasoned-returns-and-more/, pp. 4.

Next Card: About Us, http://web.cba.neu.edu/~awatson/NextCardCase/NextCardAboutUs.htm printed Oct. 23, 2009 in 10 pages.

Ogg, Erica, "Apple Cracks Down on UDID Use" http://gigaom.com/apple/apple-cracks-down-on-udid-use/ printed Nov. 5, 2012 in 5 Pages.

Organizing Maniac's Blog—Online Receipts Provided by MyQuickReceipts.com, http://organizingmaniacs.wordpress.com/2011/01/12/online-receipts-provided-bymyquickreceipts-com/ dated Jan. 12, 2011 printed Oct. 16, 2012 in 3 pages.

Paustian, Chuck, "Every Cardholder a King Customers get the Full Treatment at Issuers' Web Sites," Card Marketing, New York, Mar. 2001, vol. 5, No. 3, pp. 4.

People Finders, http://www.peoplefinders.com/?CMP=Google&utm_source=google&utm_medium=cpc printed Nov. 16, 2010 in 1 page.

People Lookup, "Your Source for Locating Anyone!" www.peoplelookup.com/people-search.html printed Nov. 16, 2010 in 1 page.

People Search, "The Leading Premium People Search Site on the Web," http://www.peoplesearch.com printed Nov. 16, 2010 in 2 pages.

PersonalCapital.com, http://www.personalcapital.com/how-it-works printed Feb. 5, 2014 in 5 pages.

Planwise, http://planwise.com printed Feb. 8, 2013 in 5 pages.

Planet Receipt—Home, http://www.planetreceipt.com/home printed Oct. 16, 2012 in 1 page.

Planet Receipt—Solutions & Features, http://www.planetreceipts.com/solutions-features printed Oct. 16, 2012 in 2 pages.

(56) References Cited

OTHER PUBLICATIONS

Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_gif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Binus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Stauffer et al., "Using HTML 3.2," Second Edition, 1996, Que Publishing, pp. 192-193.

"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, , http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://youneedabudget.com/features printed Feb. 5, 2014 in 3 pages.
Equifax; "Places", http://web.archive.org/web/20111111113930/http://equifax.com/places as archived Nov. 11, 2011 in 1 page.
Equifax; "Places", http://www.equifax.com/places/ as printed Nov. 16, 2015 in 1 page.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Shin, Laura, "See an Error on Your Credit Report? Credit Karma Now Makes It Easy To Dispute", Nov. 12, 2015, http://www.forbes.com/sites/laurashin/2015/11/12/see-an-error-on-your-credit-report-credit-karma-now-makes-it-easy-to-dispute/, pp. 4.
U.S. Appl. No. 14/548,861, filed Nov. 20, 2014, Systems and Interactive User Interfaces for database Access abd Application of Rules to Determine Recommendations for User Actions.
U.S. Appl. No. 14/252,701, filed Apr. 14, 2014, Payment Reporting Systems.
Application as filed in U.S. Appl. No. 09/411,683, dated Oct. 4, 1999.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
LifeLock, http://web.archive.org/web/20110724011010/http://www.lifelock.com/? as archived Jul. 24, 2011 in 1 page.
PrivacyGuard, http://web.archive.org/web/20110728114049/http://www.privacyguard.com/ as archived Jul. 28, 2011 in 1 page.

* cited by examiner

Account Validation

In order for to report your rent payments on your credit report, we must first validate your lease terms.

Please upload a copy of your lease here [____] Browse

Submit

Once your lease terms have been verified in 3-5 business days, you will receive An alert notifying you that we can now report your rent payments.

FIG. 4B

Choose type of bill to make a payment on and basic view of paying options

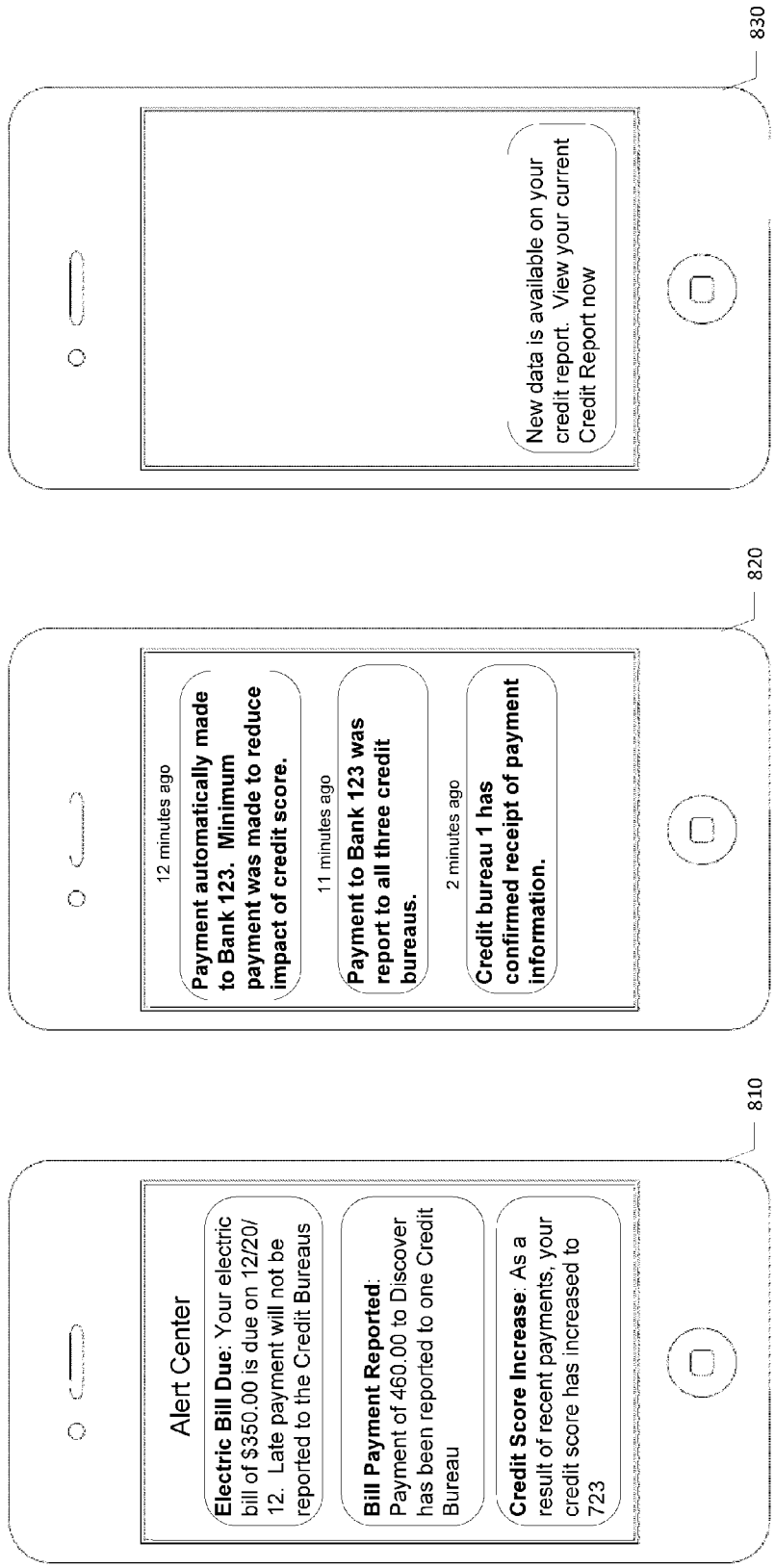

PUBLIC RECORD INFORMATION (Id) Bur Court and Tax Recordings:
-------------------------------------
(01) EFX FORECLOSURE FILED; STATUS UNKNOWN; REPORTED IN 05-96.
(CI: N AMER MTG 2179 BRIARWEST 99 NOU, DK. 61674)

=================================== END DEROGATORY ITEMS ===================================

| Account Name/Number/Type of Account Credit Bureau Date High/ Mthly Account (Id) Bur Code Open Limit Pymt Balance | Last Account Rptd Status | Past Due Amt | Last Delnq | Past Due 30 60 90+ | Hist Date | Hist Acct Stat |
|---|---|---|---|---|---|---|
| BOSTON NATIONAL TRUST /542xxx REVOLVING (01) EFX I 06-85 400 N/A -0- | 04-97 CURRENT | Pay Bill | | 00 00 00 | 04-97 | 111111111 |
| FOURTH NATIONAL BK VSA /400011xxxxxx REVOLVING (01) EFX I 12-92 400 N/A -0- | 04-97 CURRENT | Pay Bill | | 00 00 00 | 04-97 | 111111111 |
| FOURTH NATIONAL BK /2370000xxxxxx REVOLVING (01) EFX I 01-92 400 N/A -0- | 04-97 CURRENT | Pay Bill | | 00 00 00 | 04-97 | 111111111 |
| FREDERICK & NELSON /52xx REVOLVING (01) EFX I 04-89 122 N/A -0- | 04-97 CURRENT | Pay Bill | | 00 00 00 | 04-97 | 111111111 |
| GMAC /53xxxx INSTALLMENT (01) EFX J 07-89 4936 137 -0- | 09-90 CURRENT | Pay Bill | | 00 00 00 | 05-90 | 111111111 |
| NATIONAL MORTG CORP /740000xxxxxx REAL ESTATE (01) EFX I 04-96 94000 962 94000 | 04-97 CURRENT | Pay Bill | | 00 00 00 | 04-97 | 111111111 |
| NORDSTROMS /7770xxxx REVOLVING (01) EFX I 03-91 405 N/A -0- | 01-92 CURRENT | | 01-92 | 00 00 00 | | |

RECENT INQUIRIES INTO YOUR CREDIT FILE
-------------------------------------
(Id) Bur Date Abbreviated Company Name:

FIG. 12

BILL PAYMENT AND REPORTING

CROSS-REFERENCE TO RELATED APPLICATIONS

This application claims priority as a non-provisional application to U.S. Prov. Pat. App. 61/919,618 filed Dec. 20, 2013, and U.S. Prov. Pat. App. 61/905,112 filed Nov. 15, 2013, which are incorporated by reference in their entireties as if set forth herein.

U.S. patent application Ser. No. 13/968,784 filed Aug. 16, 2013 and U.S. Prov. Pat. App. 61/70,666 filed Aug. 27, 2013 are also incorporated by reference in their entirety as if set forth herein.

BACKGROUND

The credit score is an important indicator of a consumer's financial health. A consumer's credit score may impact availability and/or terms (e.g., interest rate) of such things as loan applications, rental applications, and real estate mortgages, as well as impacting the consumer's ability to find employment. Therefore, consumers have a substantial interest in monitoring and improving their credit scores.

SUMMARY

Making timely payments and having those payments reported to national credit bureaus may improve a consumer's credit score. In order to ensure on time payments, consumer's may benefit from being able to view their creditors and make payments in one place.

Some embodiments may comprise a computing system with one or more hardware computer processors and one or more storage devices. The storage devices may be configured to store software instructions configured to cause one or more hardware computer processors to perform a number of operations. The operations may access a consumer's credit report. The computing system may extract information from the credit report on the consumer's tradelines to identify accounts belonging to the consumer. The system may also identify other accounts associated with a consumer that are not included in the consumer's credit report. The consumer may be enrolled into online services for one or more of the identified accounts. The computing system may generate a user interface to display the identified accounts and information associated with the identified accounts. The associated information may include account numbers, balances, payment history, statements, or other relevant information. The information may be extracted from the consumer's credit report as well as from electronic sources associated with one or more of the consumer's accounts. The computing system may determine one or more actions the consumer may wish to take on each of the consumer's accounts. For example, the computing system may allow the consumer to make a payment on accounts with outstanding balances. The user interface may provide action buttons to the consumer allowing the consumer to take the determined actions. When an action button is selected, the computing system may initiate the associated action. In some embodiments, the system enables the consumer to make payments to one or more of the identified accounts through the computing system. When the computing receives instructions to make a payment, it may initiate a process to make the payment. The computing system may also report the payment to one or more of the credit bureaus. In some embodiments, the computing system does not report the payment until confirmation of a successful payment is received by the computing system.

BRIEF DESCRIPTION OF THE DRAWINGS

FIG. 4B is a sample user interface which enables a consumer to validate accounts, as used in an embodiment.

FIG. 8A is a sample mobile user interface displaying alerts sent from a bill payment system, as used in an embodiment.

FIG. 8B is a sample mobile user interface displaying alerts sent from a bill payment system, as used in an embodiment.

FIG. 8C is a sample mobile user interface displaying alerts sent from a bill payment system, as used in an embodiment.

FIG. 9 is a sample user interface which presents a consumer with tradelines identified in the consumer's credit report, other accounts, and several contextual action buttons for certain accounts, as used in an embodiment.

FIG. 10 is a sample user interface which presents a consumer with various accounts, and including various payment options and action buttons for certain accounts, as used in an embodiment.

FIG. 11 is a sample user interface which presents a consumer with tradelines sorted so that more important tradelines are illustrated first and/or more prominently, as used in an embodiment.

FIG. 12 is a sample user interface which presents a consumer with tradelines and options to make bill payments, as used in an embodiment.

DETAILED DESCRIPTION

Although several embodiments, examples and illustrations are disclosed below, the inventions described herein extends beyond the specifically disclosed embodiments, examples and illustrations and includes other uses of the inventions and modifications and equivalents thereof. Embodiments are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, various embodiments can comprise several novel features and no single feature is solely responsible for its desirable attributes or is essential to practicing the inventions herein described.

Traditional credit reports typically present information in a spreadsheet-like view, with columns that present data from the three major credit bureaus and rows that present a consumer's different tradelines (e.g., credit accounts) as well as credit inquiries of the consumer's credit that have been made by different companies (e.g., as part of an application for credit). The traditional credit report is more of a business view of the consumer's credit data, that was never really intended for the average user to see until federal regulations enabled consumers to receive their credit report from each of the three bureaus for free very year. Thus, credit reports became much more common and accessible to consumers. A consumer with access to their credit report may wish to actively manage the information presented on the report to improve their perceived credit worthiness. For example, consumers may wish to improve their credit score, decrease their debt, pay their bills, or take other actions related to the accounts present on a credit report.

Figure 1:
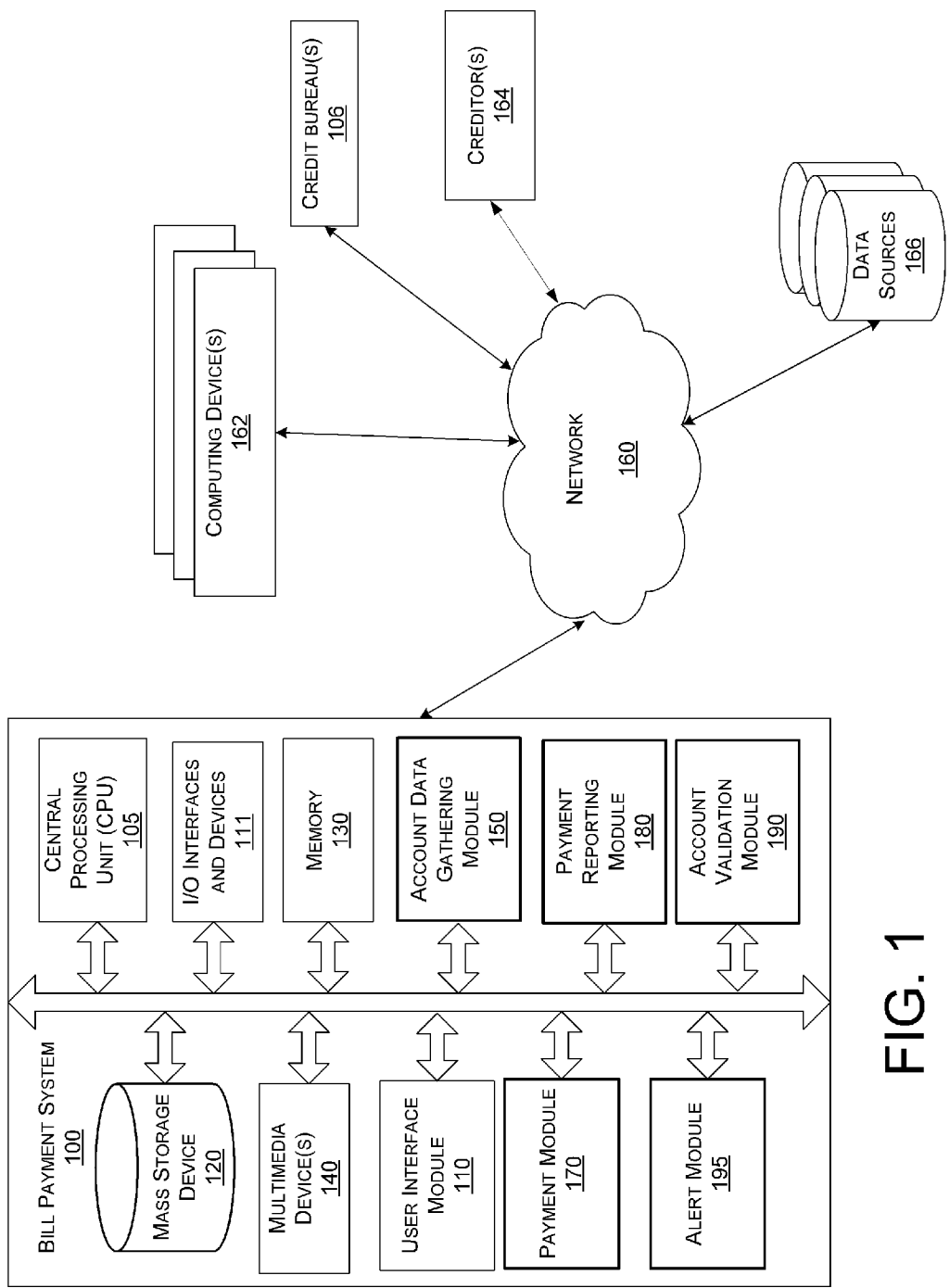
FIG. 1 is a block diagram illustrating some embodiments of a bill payment system.

System Block Diagram:

FIG. 1 is a block diagram illustrating one embodiment of a bill payment system 100 that may be used to implement certain systems and methods discussed herein, such as providing a credit report to a consumer, gathering a consumer's account data, enabling a consumer to take actions on one or more accounts, alerting a consumer to account activity or updated credit reports, processing payments to one or more creditors, and reporting payments made through the system to one or more credit bureaus. Each of these features is discussed further below with reference to various other figures.

In one embodiment, the bill payment system 100 is configured to interface with multiple devices and/or data sources. The bill payment system 100 may be configured to implement certain systems and methods described herein. The functionality provided for in the components and modules of the bill payment system 100 may be combined into fewer components and modules or further separated into additional components and modules.

In general, the word module, as used herein, refers to logic embodied in hardware or firmware, or to a collection of software instructions, possibly having entry and exit points, written in a programming language such as, for example, C, C++, C#. A software modules may be complied and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. Software instructions may be embedded in firmware, such as an EPROM. It will be further appreciated that hardware modules may be comprised of connected logic units, such as programmable gate arrays or processors. The modules described herein are preferably implemented as software modules, but may be represented in hardware or firmware. Generally, the modules described herein refer to logical modules that may be combined with other modules or devices into sub-modules despite their physical organization or storage.

In one embodiment, the bill payment system 100 includes, for example, one or more servers or personal computers that are IBM, Macintosh, or Linux/Unix compatible. In another embodiment, the bill payment system 100 includes one or more laptop computers, smart phones, personal digital assistants, or other computing devices. The bill payment system 100 may include a memory 130, which may include a random access memory ("RAM") for temporary storage of information, a read only memory ("ROM") for permanent storage of information, and/or a mass storage device, such as a hard drive, diskette, optical media storage device, or USB flash drive. Typically, the modules of the monitoring system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The bill payment system 100 may be generally controlled and coordinated by operating system software, such as Windows 95, 98, NT, 2000, XP, Vista, 7, 8, SunOS, Solaris, Blackberry OS, or other compatible operating systems. In Macintosh systems, the operating system may be any available operating system, such as MAC OS X. In other embodiments, the Bill payment system 100 may be controlled by a proprietary operating system. Conventional operating systems control and schedule computer processes for execution, perform memory management, provide file systems, networking, and I/O services, and provide a user interface, such as a graphical user interface ("GUI"), among other functions.

The example bill payment system 100 shown in FIG. 1 includes one or more commonly available input/output (I/O) interfaces and devices 111, such as a keyboard, mouse, touchpad, and printer. In one embodiment, the I/O interfaces and devices 111 include one or more display devices, such as a monitor, that allow the visual presentation of data to a user. More particularly, a display device provides for the presentation of GUIs, application software data, and multimedia presentations, for example. The Bill payment system 100 may also include one or more multimedia devices 140, such as speakers, video cards, graphics accelerators, and microphones, for example. In one embodiment, the I/O interfaces and devices 111 comprise devices that are in communication with modules of the bill payment system 100 via a network, such as the network 160, or any local area network, including secured local area networks, or any combination thereof. In some embodiments, multimedia devices 140 and I/O interfaces and devices 111 may be contained in computing devices 162.

In the embodiment of FIG. 1, the bill payment system 100 also includes modules that may be executed by the CPU 105. In the embodiment of FIG. 1, the bill payment system 100 includes an account data gathering module 150, a user interface module 110, a payment module 170, a payment reporting module 180, an alert module 195, and an account validation module 190. In this embodiment, the account data gathering module 150 is configured to gather data about one or more of a consumer's accounts. This data may come from creditors 164, credit bureaus 106, other data sources 166, and/or the consumer. The credit data may include the consumer's credit report as well as one or more credit scores for the consumer, such as a FICO score, a credit score proprietary to a particular credit bureau, and/or a multi-bureau credit score, such as a VantageScore. In some embodiments, the credit score that is used by the payment system 100 advantageously considers rental payment history (e.g., history of rental payments for a residence of the consumer) in generated credit scores. Thus, in such embodiments the credit score is weighted based on the rental payment history of the consumer. VantageScore is one example of a credit score that currently considers rental payment history in its credit scores.

Credit data may also include data not typically on credit reports such as the consumer's income, rental payments, or other financial information about the consumer. The payment module 170 is configured to process payments from a consumer's account to pay one or more creditors 164. The payment reporting module 180 is configured to report payments made by the payment module 170 to the credit bureau 106, such as to provide payment information that may be added to credit data of the consumer quicker than waiting for reporting of the payment from the creditors that receive the payments. Payments may be reported directly to the credit bureau 106 over network 160, or may be made through an intermediate third party. The account validation module 190 checks the authenticity of a consumer's accounts. The accounts may be validated with data from a credit bureau 106, a creditor 164, other data sources 166, and/or data from computing device 162. The alert module 195 alerts a consumer about activity on one or more accounts associated with the consumer or the consumer's credit report. These may be accounts validated through account validation module 190, with new data provided over network 160 by creditors 164, credit bureaus 106, and/or other data sources 166.

Figure 2:
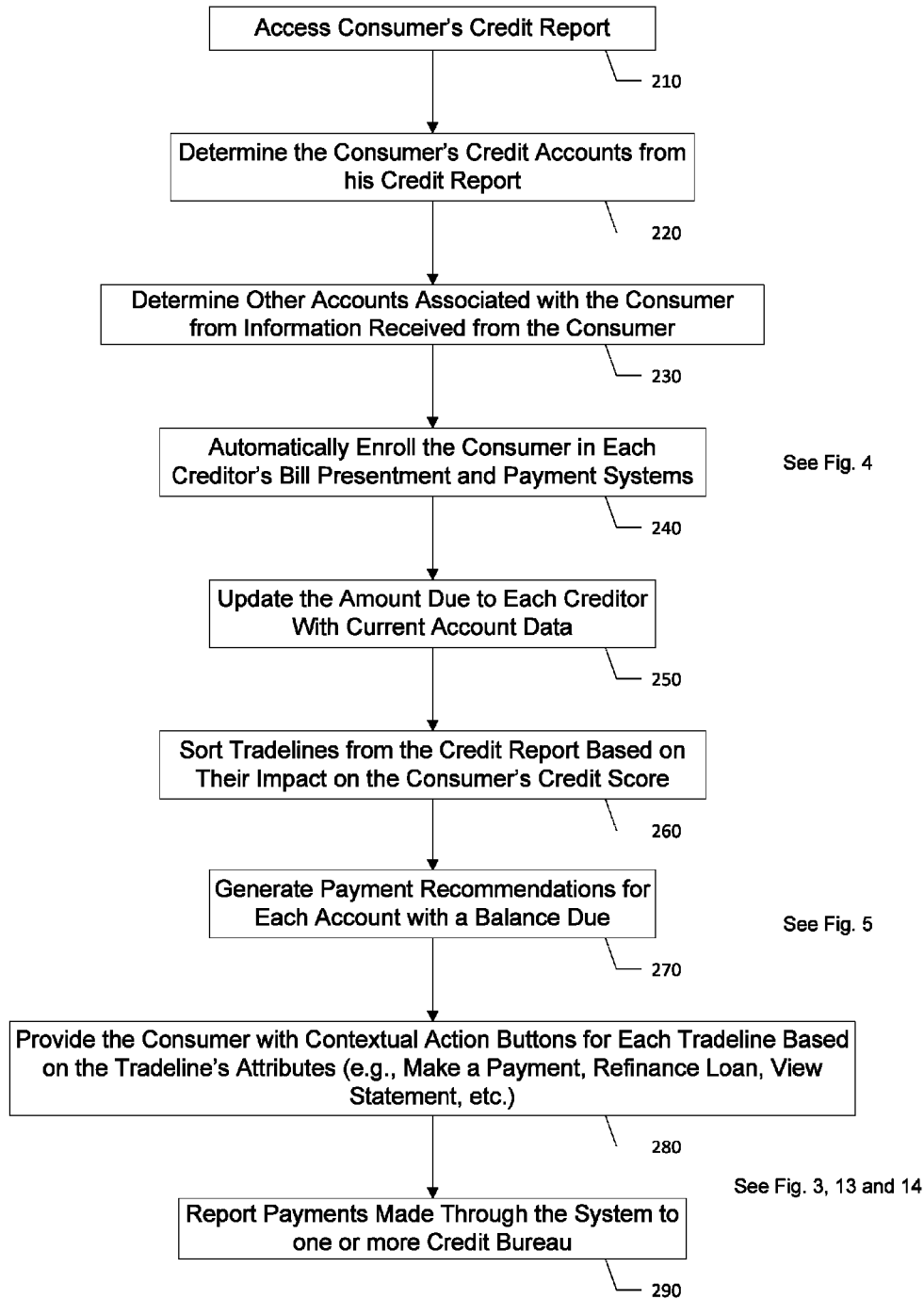
FIG. 2 is a flowchart illustrating various processes that may be performed by the bill payment system, in some embodiments.

High Level Flow Chart:

FIG. 2 is a flowchart illustrating various processes that may be enabled by the bill payment system 100, such as various processes associated with a consumer paying bills through interaction with a credit report. In one embodiment, the process of FIG. 2 is performed by the bill payment system 100, such as by the various modules discussed above. In other embodiments, the process (or portions of the process) may be performed by any other computing device. For example, portions of the process may be performed by a consumer device that interfaces with the bill payment system 100. Depending on the embodiment, the method of FIG. 2 may include fewer or additional blocks and the blocks may be performed in an order that is different than illustrated, Beginning in block 210, the Bill payment system 100 accesses a consumer's credit report. The Bill payment system 100 may access the credit report at the request of the consumer, periodically as part of a credit monitoring service, or at another time of interest to the consumer.

Moving to block 220, the Bill payment system 100 determines a consumer's accounts from tradeline information in the consumer's credit report. Each tradeline may be a single line in a credit report stating information about a particular consumer financial account. Consumers may have few or multiple tradelines on their record, such as credit card accounts, mortgages, automobile loans, other loans, and/or other credit accounts. Together, all tradelines reported on a specific consumer can be used to determine the consumer's overall risk or creditworthiness. Each tradeline on the consumer's credit report may include information about the associated account, which may include account numbers, account balances, payments history, credit limits, interest rates, and/or other information relevant to a particular account. Bill payment system 100 can use one or more of these pieces of information to identify the consumer's accounts.

In Block 230, the bill payment system 100 identifies other accounts associated with a consumer, such as accounts that do not appear on the consumer's credit report. For example, some utility companies may not report payments to the credit bureaus and need to be identified from other sources. This may be done at the consumer's direction or from information provided by the consumer. For example, in some embodiments, the consumer may provide information about an account with a cable company to bill payment system 100. In Block 230, the system may then identify and access the consumer's specific account and associated details. In some embodiments, bill payment system 100 may automate one or more steps in the process. For example, bill payment system 100 may use the consumer's address from the credit report and determine which cable companies provide service to that location. Using the consumer's identifying information or provided account information, the bill payment system may then determine which cable company (if any) the consumer has an account with.

In Block 240, the bill payment system 100 enrolls the consumer in electronic bill payment and presentment services for each of the determined creditors. This may include creditors identified in Block 220 as well as those identified in Block 230. This may be done automatically for each account with available electronic bill payment capabilities, or only for accounts in which the consumer requests enrollment. If a consumer is enrolled in electronic payment and presentment services, the bill payment system 100 may present the consumer with options to view payment history for that account, account statements, current balances, amounts due, payment due dates, or other information provided by the creditor as part of its online bill payment and presentment services. Enrolling a consumer in a creditor's online services is discussed further below in reference to FIG. 4A.

Continuing to Block 250, the bill payment system 100 updates the credit report data with current data indicating updated account information received direct from the creditor and/or recent payments made to various creditors via the bill payment system 100, each of which may not be immediately indicated in the consumer's credit report. For example, a credit report may not be updated immediately when a payment is made or an account's balance changes. However, a consumer may wish to view more up-to-date balances on tradelines, such as to determine a payment to make on the tradelines. Therefore, in some embodiments, the bill payment system 100 updates that account data with the current data, such as data directly from the tradelines or based on payments sent to the tradeline via the bill payment system 100, from each of the tradelines. This may be done for all accounts or only for accounts where the service is requested by the creditor. In some embodiments it is done for all accounts that the bill payment system enrolls the consumer in, such as in block 240. In one embodiment, the account data provided to the consumer includes both a balance directly from the credit report data, as well as a balance that includes updated information obtained by the bill payment system, such as directly from the various accounts and/or completed payment information that has not yet been reflected on the credit report. Thus, the consumer may be able to view both balances, such that a difference between the balance obtained from the credit report and the balance that has been updated with more current information available to the bill payment system may be considered side-by-side.

In Block 260, the bill payment system sorts the consumer's tradelines based on one or more of various criteria, such as based on impact of the various account balances on the consumer's credit score. For example, accounts with the largest impact on the consumer's credit score may be shown first. In other embodiments, accounts may be sorted based on the amount of negative effect the account has on a user's credit score, the credit usage percentage, the impact on a consumer's credit score if a payment is not received soon, payment due dates, and/or any other criteria which influences a consumer's credit score, or other financial goals.

In Block 270, the bill payment system 100 generates a payment recommendation for each tradeline or other account. The recommendation may be based on one or more goals provided by the consumer, the consumer's ability to pay, and/or other factors. For example, goals may include increasing a credit score, paying off debt, purchasing a new car or house, or other financial goals chosen by the consumer. Generating recommendations for each account associated with a consumer is discussed further below in reference to FIG. 5.

In Block 280, the bill payment system 100 provides the consumer with contextual action buttons for each tradeline presented in a user interface to the consumer. The status of accounts associated with each tradeline may prompt a consumer to take certain actions. For example, an account with a past due payment may prompt a consumer to take immediate action to make a payment, or a new late payment on a tradeline may prompt a consumer to dispute the late payment with the creditor or credit bureau. In some embodiments, the bill payment system automatically determines one or more actions associated with a respective tradeline and provides action buttons allowing a consumer to take one or more actions in response to the status of each account. For example, if a bill has a balance due, the system may provide an action button allowing a consumer to make a payment. In some embodiments, the consumer may set up rules that allow the bill payment system to automatically take any (or certain) actions that are determined to be relevant to a particular tradeline. For example, if the bill payment system determines that a payment to a particular tradeline is due within a short period of time, and that a potential negative impact will be seen in the consumer's credit data (e.g., credit score) if the payment is not made, the bill payment system 100 may be configured to automatically make the payment without further interaction from the consumer. Contextual action buttons are discussed further below in reference to the user interface illustrated in FIGS. 6-12.

In block 290, the bill payment system 100 reports payments made through payment module 170 to one or more credit bureaus. To improve his or her credit score, a consumer not only needs to pay off debt and make timely payments on credit accounts (among other items), but also needs those payments reported to the credit bureau. While many creditors report payments to one or more credit bureaus, the creditors often only report the information at set periodic intervals. For example, a creditor may accumulate credit payment (or lack of payments) from many consumers for 30 or 60 days before reporting the payments to a credit bureau. Therefore, a consumer may make a payment, but may experience a significant delay before the payment appears on the consumer's credit report. If the payment does not show up on the consumer's credit report, the consumer's credit score and perceived creditworthiness may not be positively impacted (and may actually be negatively impacted if such a delay gives the appearance that the creditor is not paid in a timely manner). Therefore, it would be advantageous to a consumer if payment could be reported to the credit bureau sooner. In some embodiments, the bill payment system 100 reports payments made via the bill payment system 100 directly to a credit bureau, while in other embodiments, the system may report through a third party or other modules. Reporting payments to credit bureaus is discussed in more detail below in reference to FIGS. 3, 13, 14, and 15.

Example Payment Reporting

Figure 3:
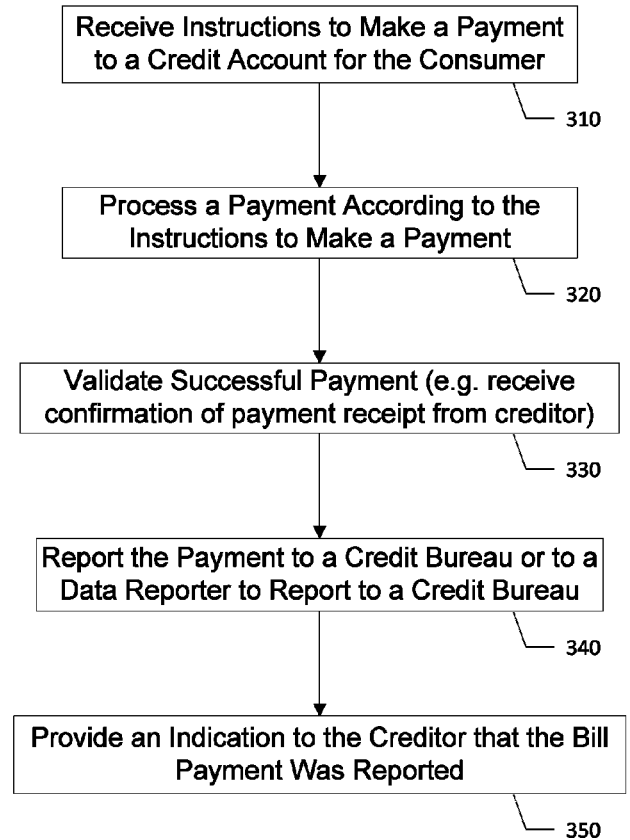
FIG. 3 is a flowchart illustrating one embodiment of a process of making a payment through the bill payment system and reporting those payments to a credit bureau.

FIG. 3 is a flowchart illustrating one embodiment of a process of making a payment through the bill payment system and reporting those payments to a credit bureau, such as in block 290 of FIG. 2. The processes described in reference to FIG. 3 are discussed further below in reference to FIGS. 13-15. Depending on the embodiment, the method of FIG. 2 may include fewer or additional blocks and the blocks may be performed in an order that is different than illustrated.

Beginning at block 310, the bill payment system 100 receives instructions to make a payment to a creditor. Those instructions may be provided by the consumer at the time payment is to be made, may have been provided previously, or may be initiated automatically in view of system and/or user bill payment rules. For example, as discussed in reference to block 280 of FIG. 2, the system may provide the consumer with an action button allowing the consumer to make a payment. In some embodiments, the bill payment system 100 automatically makes payments to the consumer's creditors based on prior authorization. For example, a consumer may authorize bill payment system 100 to manage the consumer's debt, or may set recurring payments of a specified amount for one or more of the consumer's accounts. In one embodiment, the bill payment system 100 automatically determines (e.g., based on system and/or consumer preferences) to which creditors payments should be made, amounts of payments to be made, and/or dates for the payments, such as in order to minimize negative impact on the consumer's credit score. Thus, payments to creditors may change from month to month in order to minimize negative impact (or cause positive impact) on the consumer's credit score. The user may also select different payment options for different accounts.

In block 320, the bill payment system 100 processes a payment as instructed by the consumer. The payment may be processed by the payment module 170 or with other hardware or software. Payments may be made in a variety of ways based on the consumer's ability to pay, his preferences, and/or constraints on the system. For example, in some embodiments, the user has deposited money with the bill payment system 100 and the bill payment system may process payments by sending those funds to the creditors. Payments made with the consumer's deposited funds allow the system to immediately process payments. Similarly, the consumer may have provided the bill payment system 100 with access to one or more payment accounts, such as checking or savings accounts, from which funds may be drawn in order to make payments to various creditors. However, in some embodiments the user may not have money deposited with the system and/or sufficient funds in any linked payment accounts to make a particular payment. This may be because the consumer has not made any deposits, has depleted deposited funds with previous payments, or the system may not allow the consumer to deposit funds. In some embodiments the bill payment system 100 may automatically pay the consumer's bills as instructed and collect payments from the consumer at a later time. For example, if the consumer has a payment due, but has not instructed the bill payment system 100 to make the required monthly payment, the bill payment system 100 may make a payment so it will not be considered late, and then may collect from the consumer at a later date. In effect, the consumer may have a short term loan with the bill payment system 100. Depending on the embodiment, if payments are made for the consumer in this manner, the consumer may be charged interest on the payment amount for the duration of the time it takes for the consumer to provide sufficient funds to one or more linked bank accounts or directly to the bill payment system 100 to cover the payment. Alternatively, the consumer may be charged a flat fee for the bill payment system making such a payment on behalf of the consumer, perhaps contingent on the consumer providing reimbursement of the payment amount within a particular time period, such as one week or one month.

In one embodiment, clicking on a pay bill button associated with a credit account of the consumer initiates automatic payment of that bill by the bill payment system (e.g., based on preferences that have been pre-established by the consumer, such as whether to pay a minimum payment amount or the entire outstanding balance on the particular account) without any further interaction from the consumer. For example, the bill payment system 100 may have access to both the consumer's bank and credit account information. In such circumstances, the bill payment system 100 may automatically remove money from the consumer's bank account to transfer to the creditor when instructed to make a payment.

In other embodiments, clicking on a "pay bill" button associated with a credit account of a consumer doesn't instantly pay the bill. Instead, the bill payment system 100 and/or payment module 170 may direct the user to a bill payment center in response to the consumer clicking a "pay bill" button. The bill payment center may then offer the user the ability to pay the individual bill the consumer selected, or any other bills identified by the credit reporting system 100. In other embodiments, clicking a "pay bill" button may bring the consumer to a third party website. For example, clicking on the "pay bill" button on the consumer's Discover card tradeline may direct the consumer to the Discover card website. From the third party website the consumer can then the bill.

In block 330, the bill payment system 100 validates that a payment initiated via the bill payment system 100 has been successfully received by the intended creditor, such that the payment can be accurately reported to one or more credit bureau. For example, this may be performed by the payment module 170, payment reporting module 180, or other suitable hardware or software. Payments may be validated in several ways. In some embodiments, the bill payment system 100 makes payment directly to a creditor using funds available to the bill payment system 100. In such embodiments, the system may receive feedback from the creditor if the payment was successful (or not). At that point, the process of reporting to the credit bureau may continue in step 340. In some embodiments, the system doesn't make payments directly to the creditor, or doesn't receive feedback of successful payment immediately from the creditor. In those cases, the bill payment system may validate the payment by monitoring the consumer's outstanding balance with the creditor (e.g., such as by accessing account data of the consumer via an API associated with the particular creditor and/or accessing the account data by logging into the consumer's account using the consumer's login credentials by proxy), viewing payment history on the creditor's, monitoring bills listed as due by the creditor, or receiving other communications from the creditor.

In block 340, the bill payment system 100 reports the payment to a credit bureau. In some embodiments, the bill payment system 100 reports the payment directly to the credit bureau. In some other embodiments, the bill payment system 100 may report the payment to a third party credit reporter who then reports payments to the credit bureau.

In block 350 the bill payment system 100 provides an indication to the creditor that the bill payment was reported to one or more credit bureau. The creditor may then avoid reporting that same payment to the credit bureau in order to avoid duplicate reports of the same account activity, and possibly introduce errors in the consumer's credit information. In some embodiments, instead of providing an indication to the creditor that the bill was reported, the bill payment system 100 may indicate to the credit bureau that the payment information is likely to be reported a second time by the creditor. Then the credit bureau may prepare for the duplicate information to keep accurate records of the consumer's information. Example processes of reporting payments to one or more credit bureaus are discussed further below in reference to the block diagrams shown in FIGS. 13-15.

Example Automatic Online Account Enrollment

Figure 4A:
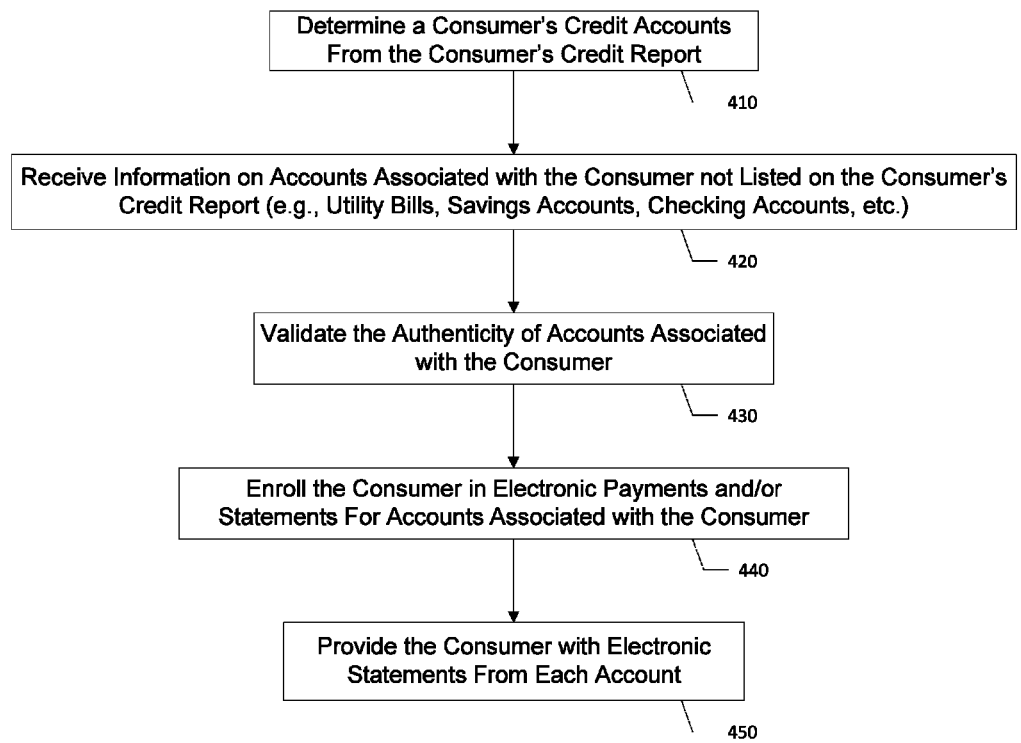
FIG. 4A is a flowchart illustrating one embodiment of a process performed by the bill payment system to enroll a consumer in online bill services with the consumer's creditors.

FIG. 4A is a flowchart illustrating one embodiment of a process performed by the bill payment system 100 to enroll a consumer in online bill services with each (or some) of the consumer's creditors. Many creditors offer one or more online services to customers. Services may include viewing bills, viewing payment history, viewing statements, making payments, or other services related to the consumer's accounts. However, to access these features, a consumer must typically visit each individual creditor's website. Websites which allow a consumer to view account data from multiple creditor's in one place require the consumer to input various information about each account in order to set up access. The method of FIG. 4A provides improved processes of enrolling consumers in bill presentment and/or payment features of various accounts. Depending on the embodiment, the method of FIG. 4A may include fewer or additional blocks and the blocks may be performed in an order that is different than illustrated.

Beginning in block 410, the bill payment system 100 determines a consumer's credit accounts from the consumer's credit report, similar to the process discussed above with reference to block 220. Tradelines on a consumer's credit report list valuable account data which bill payment system 100 may analyze to determine the specific credit accounts associated with the consumer.

In block 420, the bill payment system 100 receives account information on other accounts associated with the consumer not listed on the consumer's credit report, similar to the process discussed above with reference to block 230. These other accounts may include utility bills, savings accounts, checking accounts, rent, and/or other liabilities and assets that are not reported to a credit bureau. The bill payment system 100 may provide other features and more useful services to the consumer if it has access to more information about the consumer's overall financial situation.

Figure 7A:
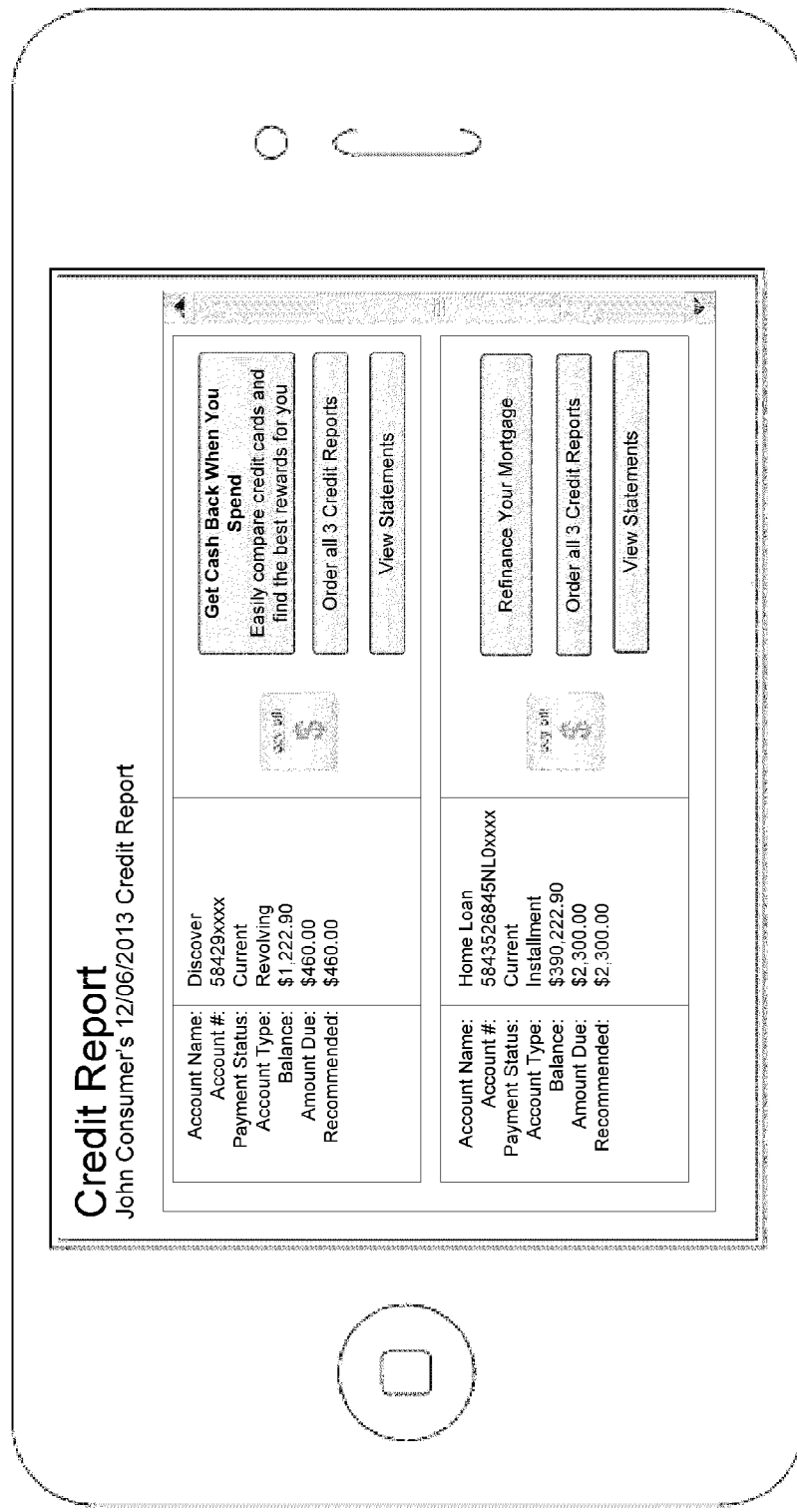
FIG. 7A is a sample mobile user interface which presents a consumer with a credit report and several contextual action buttons for each tradeline, as used in an embodiment.
Figure 7D:
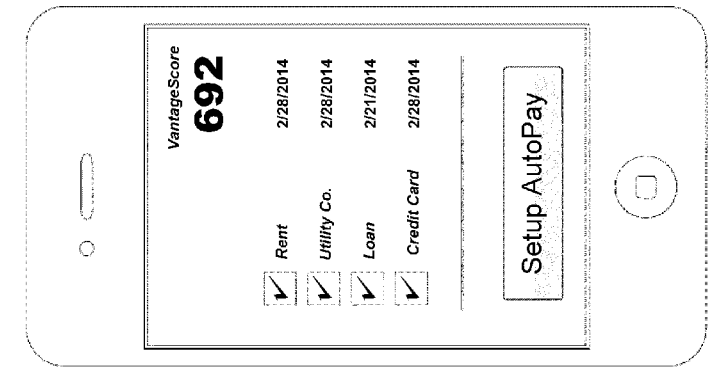
FIG. 7D is a sample mobile user interface which presents a consumer with accounts and allows the consumer to setup automatic payments.
Figure 7C:
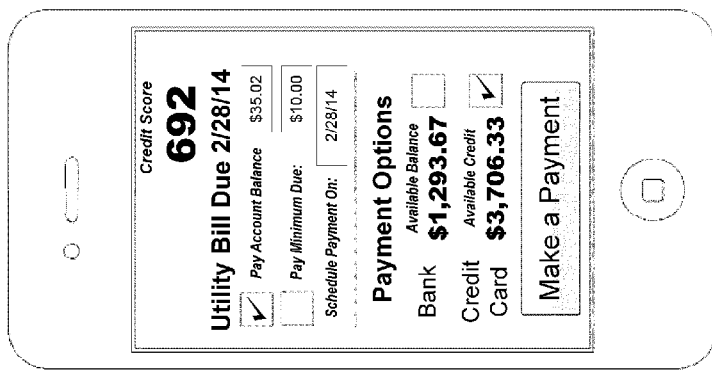
FIG. 7C is a sample mobile user interface which presents a consumer with information about an account with a creditor and provides interactive features.
Figure 7B:
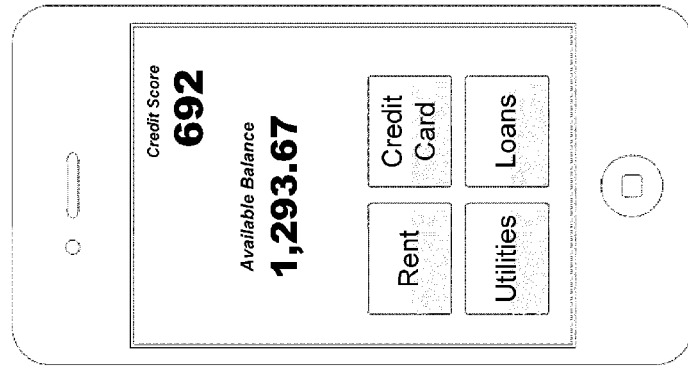
FIG. 7B is a sample mobile user interface which presents a consumer with credit information and interactive buttons.

In block 430, the bill payment system 100 validates the authenticity of accounts associated with the consumer. This may be performed by an account validation module 190, or by other hardware or software components of the bill payment system 100. Without any account validation functionality, consumers may have an incentive to create other accounts to increase their credit score without making actual payments. For example, a consumer's credit score may increase if the consumer generates a history of on time payments to a creditor. However, without proper account validation, a consumer could have phony rent payments to a friend, made through the bill payment system 100, and reported to one or more credit bureaus by the bill payment system in order to increase the consumer's payment history. However, if the consumer is not actually renting property from the friend, the payments should not be reported to the credit bureau as a representation of the consumer's creditworthiness. To prevent consumers from gaming the system in this manner, account validation may be performed for any accounts which will have payments reported to the credit bureau. In some embodiments, some accounts, such as credit card accounts listed on a consumer's credit report, may be assumed to be valid. However, other creditors, such as a consumer's landlord or accounts that are added to the consumer's account via other methods than being on the consumer's credit report (e.g., manually added by the consumer), may need additional validation before payments to those creditors are reported. In some embodiments, the consumer is prompted to provide evidence that an account is authentic. For example, the consumer may provide a copy of his utility bills, phone plan, rental lease, or other information which could demonstrate that payments to a consumer's creditor are authentic. Authentication documents may be provided in hard copy, by scanning documents, by taking a picture of bills with the consumer's camera or phone, or by other means of reliably reproducing documents. In the example of FIG. 4B, the consumer is prompted to upload a copy of a lease agreement to the bill payment system 100. The bill payment system 100 may then authenticate the document (e.g., automated document analysis and/or manual document analysis) to validate the consumer's account. Once the account has been validated, the bill payment system 100 can report rent payments to one or more credit bureaus. The bill payment system 100 may also have automated processes for determining if payments are to a legitimate source. For example, the bill payment system 100 may receive electronic confirmation of an account's authenticity from a trusted source. In the example of FIG. 7B, the consumer is provided with options to add accounts for each of four different types of payments, rent, credit card, utilities, and loans. In one embodiment, each of the types of accounts is associated with a different type of validation. For example, if the consumer wishes to add a credit card account, the account may be validated by testing credentials provided for the credit account using a service such as may be provided by Yodlee or Fiserv, while if the consumer wishes to add a loan account, the consumer may be required to provide a photograph of a loan statement, which may then be processed (either automatically and/or manually) in order to determine if the consumer really holds the account. Thus, in one embodiment the bill payment system 100 is configured to initiate different validation processes (e.g., logging in by proxy, providing photographs of statements, bills, agreements, etc.) for different account types that are added to the consumer's account.

In block 440, the bill payment system 100 enrolls the consumer in electronic payments and/or statements for associated accounts. For accounts listed on the consumer's credit report, this may be done automatically based on the account information listed in the report and the personal information provided by the consumer. In some embodiments other processes are required to enroll the consumer in accounts not listed on the consumer's credit report. For example, to enroll in statements from the consumer's checking account, the bill payment system 100 may require the consumer's account numbers. In some embodiments, the bill payment system 100 may require the consumer to manually enroll in online services and then supply the bill payment system 100 with username and password information.

In block 450, the bill payment system 100 provides the consumer with electronic statements from each account for which the consumer is enrolled in online statements. The statements may be viewed after the consumer selects an action button to view statements for a particular account. The bill payment system 100 may also aggregate all of the consumer's statements to present to the consumer in a user interface.

Example Methods of Determining Recommended Payments

Figure 5:
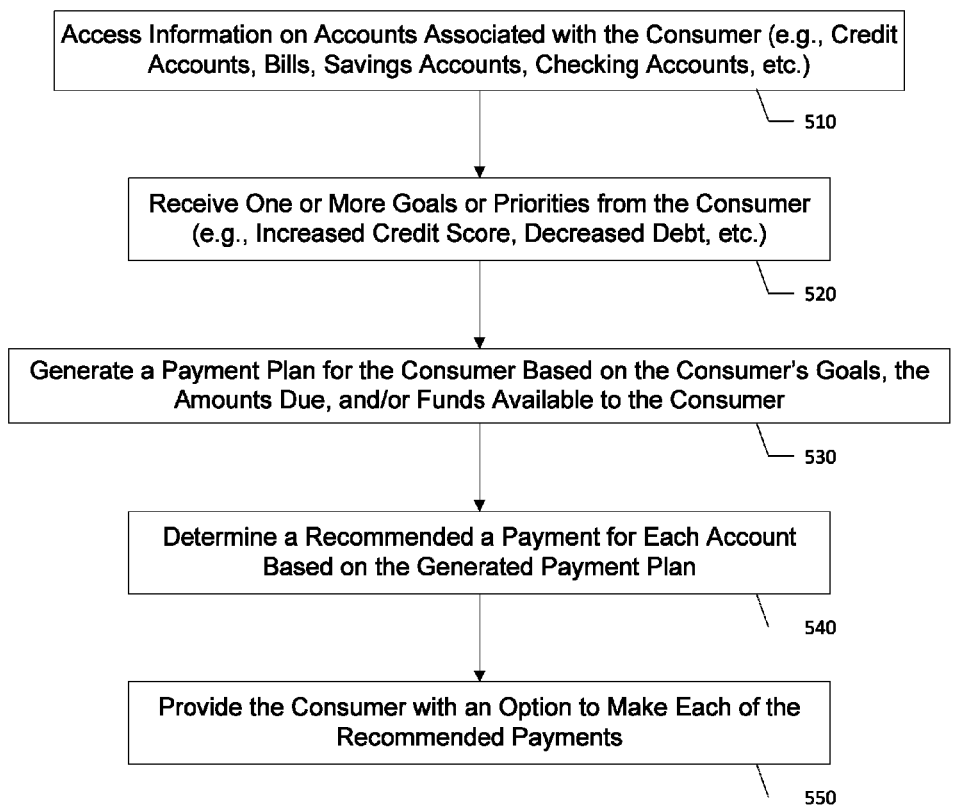
FIG. 5 is a flowchart illustrating one embodiment of processes performed by the bill payment system to generate payment plans and payment recommendations for a consumer.

FIG. 5 is a flowchart illustrating one embodiment of processes performed by the bill payment system 100 to generate payment plans and payment recommendations for a consumer. In some embodiments, the bill payment system 100 uses information from the consumer's accounts to generate payment recommendations for a consumer. For example in systems with the processes discussed in FIG. 4A, the bill payment system 100 may provide recommendation based on the consumer's total liabilities and assets. In other embodiments, the bill payment system 100 may make recommendations based on fewer or additional pieces of information, such as constraints set by the consumer. Depending on the embodiment, the method of FIG. 5 may include fewer or additional blocks and the blocks may be performed in an order that is different than illustrated.

In block 510 the bill payment system 100 accesses information on accounts associated with a consumer. Data about these accounts may be accessed in a manner similar to those discussed above in reference to FIG. 4A.

In block 520, the bill payment system 100 receives one or more goals from the consumer. Typical goals may include increasing the consumer's credit score, paying off the consumer's debt, purchasing a home, or other financial or life goals. In some embodiments the bill payment system 100 receives this information directly from a consumer. For example, the system may ask the consumer for goals when the consumer firsts accesses the bill payment system 100. In other embodiments, the bill payment system 100 may not generate recommendations until the consumer provides at least one goal, or may make recommendations using a default goal unless the consumer provides a specific goal. In some embodiments, the bill payment system monitors the consumer's interactions with the bill payment system 100, and/or other information about the consumer (e.g. types of account open, spending habits, age, sex, race, etc.), to automatically generate goals and priorities for the consumer.

In block 530 the credit report service 100 generates a payment plan for the consumer based on the consumer's goals or priorities, the consumer's available funds, the amount due on the consumer's accounts, the balance remaining on each account, interest rates, and/or other available information about the consumer. The payment plan may include information such as which accounts to pay for first, which accounts to pay the most money toward, minimum balances to keep in certain accounts, etc. For example, if the consumer's goal is to pay down the total debt, the bill payment system may generate a payment plan that makes minimum payments on all accounts and makes the maximum payment possible with current funds toward the account(s) with the highest interest rate. Further examples of payment plans are discussed below in reference to FIG. 9.

In block 540, the bill payment system determines a recommended payment for each account based on the generated payment plan. For example, with a payment plan focused on paying off debt, if the consumer has only two credit accounts, one with 10% interest and one with 5% interest, the bill payment system 100 may recommend the minimum payment on the account with 5% interest and a payment as much as the consumer can afford toward the account with 10% interest.

In block 550, the recommended payments are provided to the consumer. Some examples of providing recommended payments are discussed further below in reference to FIG. 9.

The flowcharts illustrated in FIGS. 2-5 and described above are example processes which may be performed by the bill payment system 100 and/or other suitable computing systems, such as consumer computing devices. In some embodiments, fewer or additional blocks may be present, or the processes may be performed in a different order than shown in the figures.

Sample User Interfaces:

The bill payment system 100 may present one or more user interfaces to the consumer through computing devices 162. In some embodiments, the user interfaces may be generated and/or configured by a user interface module 110, but one or more functions of the user interface module may be performed by one or more other modules, or other suitable hardware or software components.

Figure 6A:
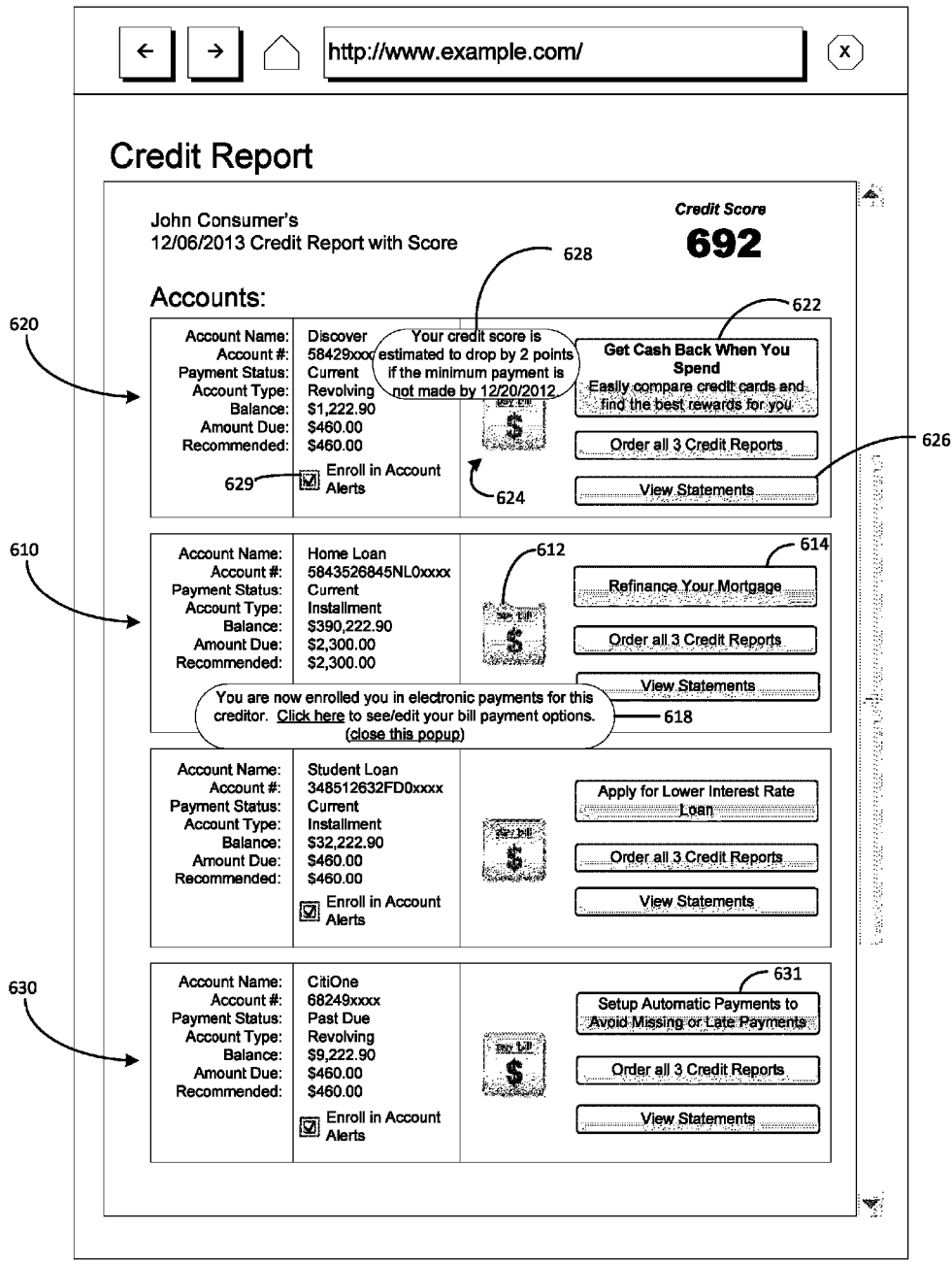
FIG. 6A is a sample user interface which presents a consumer with a credit report including several interactive features, as used in an embodiment.

In the user interface illustrated in FIG. 6A, the bill payment system 100 presents the consumer with a credit report. Depending on the embodiment, the credit report may be based on credit data from a single credit bureau or from data from multiple credit bureaus. The credit report presented in FIG. 6A provides the consumer with more information than a typical credit report and also allows the consumer to take actions based on information contained in the credit report. For example, the consumer is presented with action buttons associated with respective tradelines and updated balances.

As discussed in reference to Block 280 in FIG. 2, the bill payment system 100 may provide the consumer with contextual action buttons for tradelines presented in a user interface to the consumer. The action buttons enable a consumer to take actions related to one or more accounts. For example, an account with a past due payment may prompt a consumer to take immediate action to make a payment, or a new late payment on a tradeline may prompt a consumer to dispute the late payment with the creditor. In some embodiments, the system provides action buttons allowing a consumer take an action in response to the status of each account. For example, if a bill has a balance due, the system may provide an action button allowing a consumer to make a payment. Common action buttons may enable the consumer to make bill payments, view account statements, order credit reports, initiate loan refinancing, apply for new credit cards, compare credit cards, enroll in a creditor's online services, schedule automatic payments for one or more creditors, or take other actions relevant to a tradeline's current statue.

In the example of FIG. 6A, the consumer's home loan account 610 appears on the credit report. The bill payment system 100 generated and provided several actions buttons based on the account data of the home loan. In the example of FIG. 6A, the loan has an outstanding balance, and therefore, the bill payment system 100 has automatically provided an action button 612 offering the user an opportunity to make a payment. In this example, the bill payment system 100 also provided a refinance action button 614 to initiate a mortgage refinancing, such as in response to determining that better terms may be available to the consumer than those in the current Home Loan. The bill payment system 100 may have access to the interest rate charged on the loan, current interest rates, interest rates at the time the loan was made, the consumer's current credit score, the consumer's credit score when the loan was made, and/or other information which may allow the bill payment system 100 to determine if the consumer is likely to receive a lower interest rate by refinancing a loan. Furthermore, in some embodiments the bill payment system 100 may request loan rates from one or more data sources (e.g., such as specific financial institutions that offer loans of the type needed and/or loan aggregators) in order to determine one or more specific loans that the consumer may apply for in order to improve loan terms. In other embodiments, the refinance action button 614 may be offered on all home mortgages.

The Discover account 620 listed in the credit report in FIG. 6A presents the consumer with a card comparison action button 622 that provides a comparison of credit cards available to the consumer, such as to allow the consumer to find a card with a better rewards program. This action button 622 may be presented to the consumer because the bill payment system 100 determined there are credit cards with similar terms, but better rewards than the consumer's current card. In some embodiments, actions buttons may offer advertisements from lenders or other entities based on the consumer's current credit cards and credit history. For example, action buttons may bring the consumer to an advertiser's website to complete an application, or may automatically complete an application on the consumer's behalf.

The CitiOne account 630 listed in the example credit report in FIG. 6A presents the consumer with an action button to setup automatic payments 631. If a consumer selects the automatic payments action button 631, the consumer may be presented with options to setup automatic payments. For example, the system may allow the consumer to select when to make payments or how large a payment to make (e.g., options may be provided to automatically pay the minimum payment amount, the statement balance, the current amount due, a fixed amount, or a set percentage of one of the above, for example). In some embodiments, selecting the automatic payment action button 631 may automatically change the bill payment system's settings to make automatic payments to the consumer's creditor. For example, clicking the automatic payment action button 631 may set the systems settings to automatically make minimum payments to the consumer's CitiOne account 631. In some embodiments, the bill payment system 100 provides an action button to setup automatic payments for each of the consumer's creditors to which the consumer is not automatically making payments (e.g., based on predefined preference of the consumer and/or system default preferences, such as regarding payment amount and payment date). FIG. 7D, as discussed below, illustrates an example user interface for setting up automatic payments on a mobile device.

Bill payment system 100 may determine which action buttons to include for respective tradelines by defining attributes for each of the consumer's accounts. The system may then compare the attributes to a list of attributes which trigger certain action buttons. In some embodiments, bill payment system 100 may track the actions buttons selected by consumers, and the attributes of the associated account. The system can then optimize the action buttons presented to the consumer (and/or to other consumers) based on selection of previously presented action buttons.

Clicking on a payment action button, such as payment action button 624 associated with the Discover account 620, may immediately pay the consumer's bill, bring the consumer to a bill payment center, or transfer the consumer to a third party site from which the consumer can pay his bill (e.g. the creditor's site). For example, in FIG. 6A, the user interface includes "Pay Bill" action buttons associated with each tradeline, which may be selected by the consumer in order to initiate automatic payment of the bill without further input from the user (e.g., a one click automatic payment button), may take the consumer to another user interface where the consumer is able to select a payment account and/or other payment options in order to complete the payment (e.g. ACH, credit card, debit card, PayPal, etc.), and/or may provide the user with a payment center user interface that provides other payment options for the particular tradeline and/or other tradelines. In some embodiments, the bill payment system 100 determines rules for automatic payment of bills of the consumer, such as based on input of such rules by the consumer. For example, a consumer may desire that any bill having a deadline within one day is automatically paid by the bill payment system 100 in order to avoid the tradeline having a past-due indicator in the consumer's credit file and potentially negatively impacting the consumer's credit score. Similarly, a consumer may desire to have the bill payment system 100 automatically pay bills according to account prioritization's (e.g., based on impact on credit score, as discussed above) such that the consumer is not required to provide any input in order to have bills from various creditors automatically paid. In essence, the consumer may be able to rely on the bill payment system 100 making payments of the consumer's bills in the manner that is most advantageous to the consumer's credit score. In this regard, the bill payment system 100 may also have logic to select an appropriate payment account of the consumer, such as based on balance information of multiple accounts and considering upcoming payments associated with the consumer. Examples of bill payment processes are discussed above in reference to block 320 of FIG. 3.

The example user interface in FIG. 6A has "View Statements" action buttons, such as view statement action button 626 associated with the Discover account 620, enabling the consumer to view statements for each account. Clicking such an action button may present the consumer with one or more statements associated with the corresponding account. If the consumer has not enrolled with the creditor to view online statements, the bill payment system 100 may prompt the consumer to enroll in online statements when the consumer attempts to view statements. Alternatively, the bill payment system 100 may automatically enrolled the consumer in online statement viewing with the corresponding creditor, if sufficient information is available to complete the enrollment automatically. The bill payment system may present the consumer with statements as part of the bill payment system, or may direct the consumer to view statements at a creditor's site. In some embodiments the bill payment system 100 may cause the consumer's computing device 162 to download files containing the statements. The bill payment system 100 may also store the payments made through the payment module 170. This may allow the bill payment system 100 to provide a complete view of prior statements and payments to a consumer. For example, bill payment system 100 may aggregate payments and billing history of multiple tradelines into a single user interface, such that the user can view payment and billing information across multiple accounts more easily.

A consumer may also see one or more alerts when viewing the user interface. Alerts may take any form indicating important information to the consumer. For example, the consumer may see pop-up bubbles, icons which the consumer clicks on to see alert text, symbolic icons, color coding, audio such as chimes or speech, or other audio or visual indicators highlighting important events on the consumer's credit report. For example, some alerts may include the availability of new bills or statements, changes to the consumer's credit score, payments processed by the bill payment system, payments reported by the bill payment system, new data available on the consumer's credit report, and/or bills due soon or past due. For example, in FIG. 6A, the consumer is presented with two alerts in the form of pop-up bubbles. The first alert 628 indicates that the consumer has a bill due soon. In this example, the alert 628 also provides the consumer with an estimate of the amount the consumer's score will drop if the bill is not paid on time (or possibly within a known grace period for payment and/or for reporting past due payments to the credit bureaus). The second alert 618, which is associated with the home loan account 610, indicates that the consumer has been enrolled in the creditor's electronic payments and bill payment services as discussed in reference to FIG. 4A above. As discussed elsewhere, enrollment in the bill payment service may be entirely automated by the bill payment system 100 and/or may include various levels of input from the consumer in order to coordinate the bill payment linkage with the creditor.

Figure 6B:
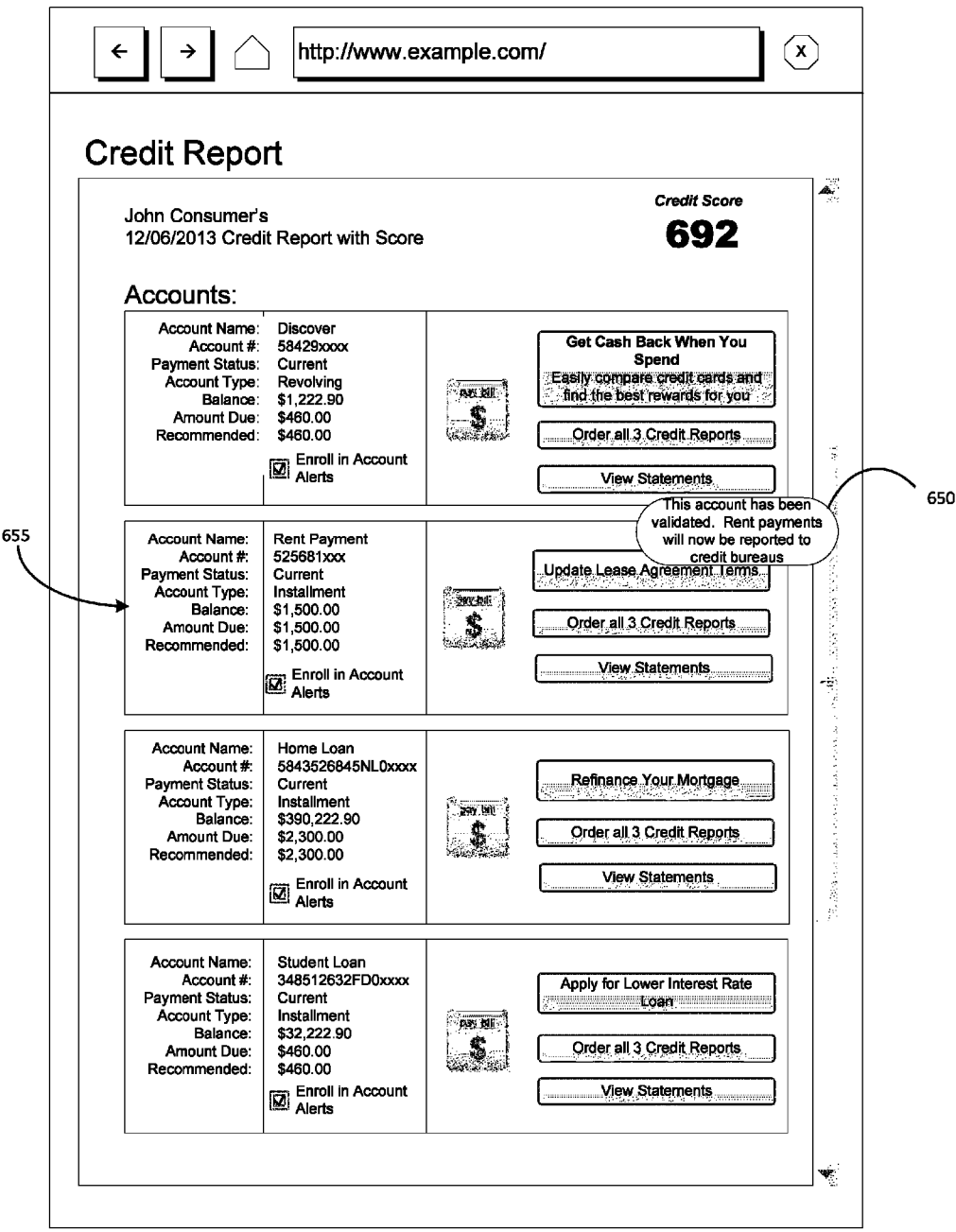
FIG. 6B is a sample user interface which presents a consumer with a credit report including several interactive features, as used in an embodiment.

In some embodiments, the consumer may also receive alerts when one or more of the consumer's accounts are validated as describe in reference to block 430 of FIG. 4A above. FIG. 6B illustrates an example user interface with an alert 650 to the consumer that a new account has been validated. Rent account 655 is also now available as part of the consumer's credit report. In some embodiments, the account may not appear on the consumer's credit report until after a first payment has been reported to one or more credit bureaus.

A consumer may only wish to receive alerts from some accounts. As illustrated in FIG. 6A, the consumer may be able to select an enroll alerts checkbox 629 in order to enroll, turn on, turn off, and/or adjust alerts for specific accounts. In one embodiment, when the checkbox 629 is selected, the consumer is presented with an alert user interface that allows the consumer to adjust preferences for alerts on that particular account. For example, the consumer may be able to adjust which events generate alerts. For example, the consumer may only want to receive alerts when there is a danger of a negative impact on the consumer's credit score.

In some embodiments the consumer may access the bill payment system 100 from a computing device 162 as a website viable in a browser, a mobile website, as mobile app, a widget, and/or other combination of hardware and software which allow the consumer to interact with the bill payment system 100. FIGS. 7A-7G illustrate examples of mobile user interfaces. The mobile interfaces may include the same or similar features as the user interface described in reference to FIG. 6A, or may contain fewer or additional features. For example, FIG. 7A shows many of the same features as FIG. 6A, in a similar format to FIG. 6A, however the interface is presented on a mobile device.

In other embodiments, mobile user interfaces may be more focused on allowing the consumer to perform a fewer number of functions on a single screen. For example, FIG. 7B illustrates a user interface a consumer may see on a mobile device. In FIG. 7B, the consumer is shown a credit score, an available balance at a payment account, and buttons representing categories of bills which the consumer may have. The available balance may be the balance at a particular bank where the consumer has an account, the balance at a deposit account associated with the bill payment system 100, an aggregation of the consumer's available balances at more than one location, or another calculation of the balance a consumer can spend toward bills. In some embodiments, the consumer may be shown fewer or additional pieces of information, such as balances in multiple bank accounts. In some embodiments, the buttons shown on the user interface may change depending on the accounts associated with the consumer.

Clicking on one of the buttons on the sample user interface in FIG. 7B may bring the consumer to another user interface that allows the consumer to make payments to a particular account. For example, in FIG. 7C, the consumer is presented with the information necessary to make a payment on a utility bill. The consumer is presented with checkboxes to determine both what amount to pay, and which account to make the payment from. In other embodiments the user interface may enable the consumer to enter custom payment amounts, or select split the payments between more than one payment accounts. The consumer is presented with options to schedule a payment at a later date, or to select a button to make an immediate payment.

In the example user interface of FIG. 7D the consumer is presented with the option to set up payments on Rent, Utility, Loan, and Credit Card accounts. These accounts may be recognized by the bill payment system 100 in any of the manners discussed above, such as from a consumer's credit data, a consumer's financial accounts, or from input from the consumer. The bill payment system may show only accounts for which the consumer has not already set up automatic payments, or may provide the consumer with a listing of all of the consumer's accounts so the consumer can determine whether or not to automatically pay each account by toggling, for example, a checkbox. In the example of FIG. 7D the consumer may set up payments by selecting a checkbox for each account and then clicking the "Setup AutoPay" button. In some embodiments, the consumer may be able to set rules for automatic payment of one or more of the consumer's accounts before setup of payments is complete, such as which account to pay from, how much to pay, or when to make a payment (e.g., payments may automatically be made in order to reduce negative impact on the consumer's credit score).

Figure 7G:
FIG. 7G is a sample mobile user interface which presents a consumer with account information and provides interactive features
Figure 7F:
FIG. 7F is a sample mobile user interface which presents a consumer with account information and provides interactive features.
Figure 7E:
FIG. 7E is a sample mobile user interface which presents a consumer with account information and provides interactive features.

FIGS. 7E, 7F, and 7G demonstrate other embodiments of bill payment user interfaces which may allow a consumer to setup automatic payments or to make immediate payments. The user interfaces may automatically change based on the type of account that is being presented as well as the capabilities of the specific creditors. For example, in FIG. 7E, the consumer is presented with the ability to make a rent payment. The consumer may be seeing this user interface because he/she selected the "Rent" button on the sample user interface in FIG. 7B. The consumer may also be directed to this user interface after selecting the "Setup AutoPay" button in FIG. 7D. To make a rent payment, the consumer is presented with the amount of rent due, when it is due, and the option to schedule a payment. In some embodiments, the consumer may also be presented with a payment button allowing the consumer to make an immediate payment based on the selected information. FIGS. 7E and 7F demonstrate additional examples allowing a consumer to set up an automatic payment or make a payment. FIG. 7E illustrates a sample user interface for setting up payment to on a loan, and FIG. 7F illustrates a sample user interface for setting up a payment on to a credit card account. In some embodiments, payment options may be adjusted automatically based on available accounts, such as only displaying accounts from which the creditor will accept payments. For example, in FIG. 7C, a consumer is presented with the option to make a payment through a bank account or a credit card account. However, in FIG. 7F the consumer is presented with a single payment option to make a payment from a bank account.

Figure 8E:
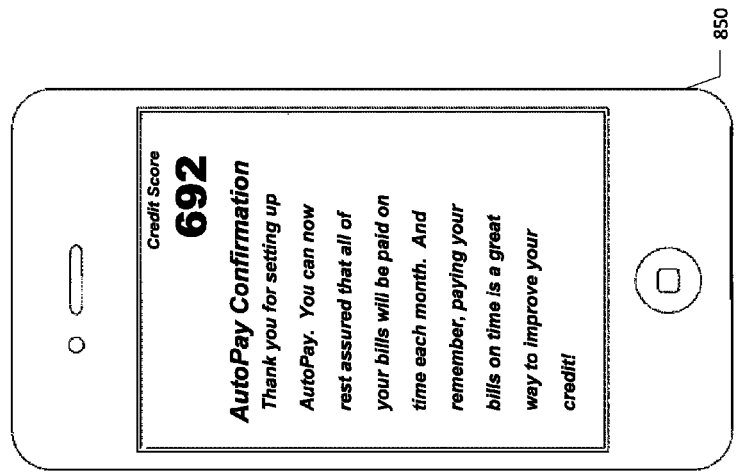
FIG. 8E is a sample mobile user interface displaying alerts sent from a bill payment system, as used in an embodiment.
Figure 8D:
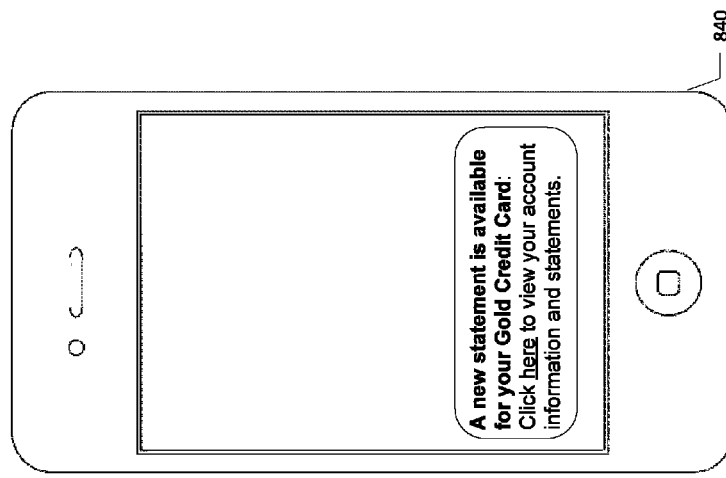
FIG. 8D is a sample mobile user interface displaying alerts sent from a bill payment system, as used in an embodiment.

In addition to being present on a user interface, alerts may be sent to a consumer through one or more additional mediums. For example, bill payment system 100 may send a consumer emails, text messages, and/or call the consumer. FIGS. 8A-E illustrate several mobile user interfaces displaying alerts sent from a bill payment system to a consumer's mobile device. Mobile device 810 in FIG. 8A illustrates an alert center, e.g., a mobile application and/or a notification screen that is part of an operating system of the mobile device, through which a consumer can view recent alerts. For example, the consumer is alerted of an upcoming electric bill, the reporting of a payment to a credit bureau, and an increase in the consumer's credit score. Alerts may provide information to a consumer about the impact taking actions suggested in an alert, and/or not taking such actions, is likely to have on a consumer's credit score. For example, in mobile device 810, the consumer is alerted to an upcoming due date for an electric bill. However, the electric utility company does not report timely payments to the credit bureaus (but only reports missed payments after two months of missed payments when the account is turned over to a collections department/agency). Therefore the alert not only alerts the consumer of the bill due, but also informs the consumer that late payment will not be reported to the credit bureaus, and therefore, will not impact the consumer's credit scores. Mobile devices 820, 830, 840 and 850, in FIGS. 8B-8E respectively, provide additional examples of alerts sent to a consumer's phone. The alerts may be received as a text message, through a mobile app, as an instant message, and/or as an email. Mobile device 820 alerts the consumer of several steps in the bill payment process. The first alert, from twelve minutes ago, indicates when a payment was made through the bill payment system 100. The second alert from 11 minutes ago indicates when the payment was reported to all three credit bureaus. The final alert indicated that credit bureau 1 has confirmed receipt of the payment information. The consumer may receive additional alerts about the transaction when the other credit bureaus confirm receipt of the payment information, as well as when the credit bureaus update the consumer's credit report with the received information as is shown in mobile device 830. In some embodiments, the consumer may be alerted to fewer or additional steps performed in the process of making and reporting payments. Additionally, the consumer may have the option of determining which alerts to receive. FIG. 8D illustrates an alert for the availability of a new statement. In some embodiments, clicking on the alert may bring the consumer directly to the detailed statement. FIG. 8E shows an alert presented to a consumer as confirmation that automatic payments have been set up. The confirmation alert gives the consumer confidence that the automatic payments are correctly set up and reminds the consumer of the benefit of enrolling in automatic payments.

In some embodiments, bill payment system 100 may present the consumer's tradelines in a format other than the traditional spreadsheet list. For example, in FIG. 9 the consumer's credit report represents tradelines as tiles. Each tile may provide the consumer with the same information as is provided by tradelines in a traditional credit report. In some embodiments the tradelines enable the consumer to perform the same functionality as discussed in reference to FIG. 6A. For example, the consumer is provided with an option to make a payment, and to connect accounts listed on the consumer's tradelines with the consumer's current account data.

As discussed above in reference to FIG. 5, payment recommendations may be based on the consumer's goals or priorities, the consumer's available funds, the amount due on the consumer's accounts, the balance remaining on each account, interest rates, impact on the consumer's credit score, and/or other available information about the consumer. For example, in FIG. 9, the Delta Miles card account tile 910 indicates that the consumer's credit usage of that account is at 40%. The bill payment system 100 has alerted the consumer of this, but can go further and actually recommend a payment amount. Here, the bill payment system 100 has recommended a payment of $2,305.73 because that will bring the consumer's credit usage under 30% for the account, which may improve the consumer's credit score. In the example, the bill payment system has also recommended a payment of $460 dollars to the consumer's CitiOne account (on the CitiOne account tile 920). The CitiOne account is currently past due and is negatively impacting the consumer's credit score. Therefore, the bill payment system 100 has recommended making the minimum payment now to bring the account up to date.

Figure 9:
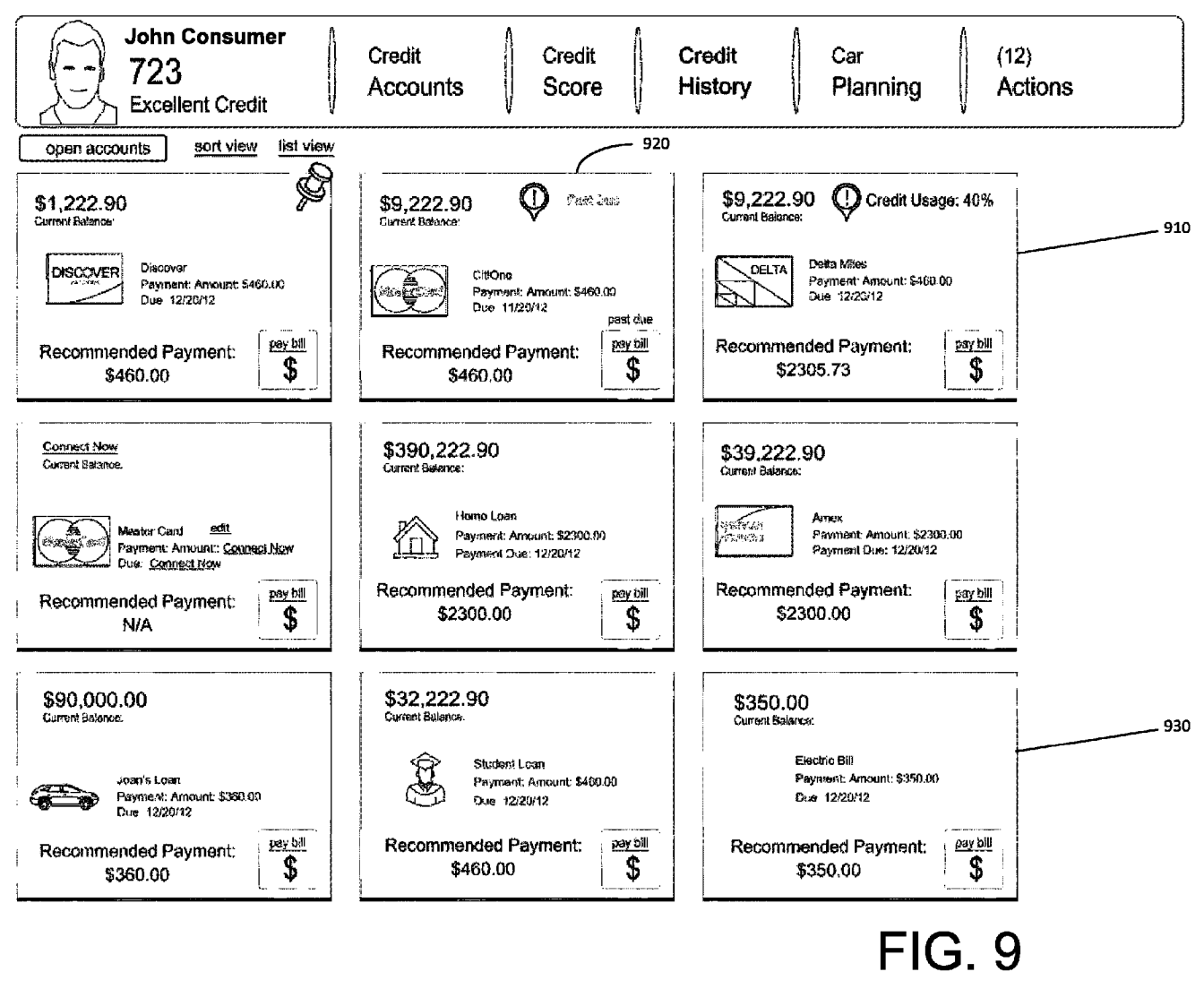

The embodiment in FIG. 9 also presents the consumer with creditors which do not report to credit bureaus 108. For example, the user interface includes an electric bill account tile 930 that includes information regarding an electric bill, which doesn't appear on a standard credit report. However, utility bills may be an important part of a consumer's personal finances. Linking utility bills to the bill payment system 100 allows a consumer to visualize most/all of his liabilities. In addition, if the bill payment system 100 has accurate utility bill information, it may be able to make more accurate payment recommendations, not only for the utility bill, but also for other accounts of the consumer based on the utility bill balance, payment amount, due date, etc. Utility bills may be linked to the bill payment system 100 in the same manner as bank and credit accounts, and in some embodiments the utility bills may be paid directly from the credit report user interface, such as by the consumer selecting a pay now button displayed on the user interface in order to initiate payment from a pre-established payment account of the user. Utility bills, or other bills not typically reported to credit bureaus such as rent, may appear on user interfaces whether formatted as in FIG. 9, FIG. 6A, or another format.

Figure 10:
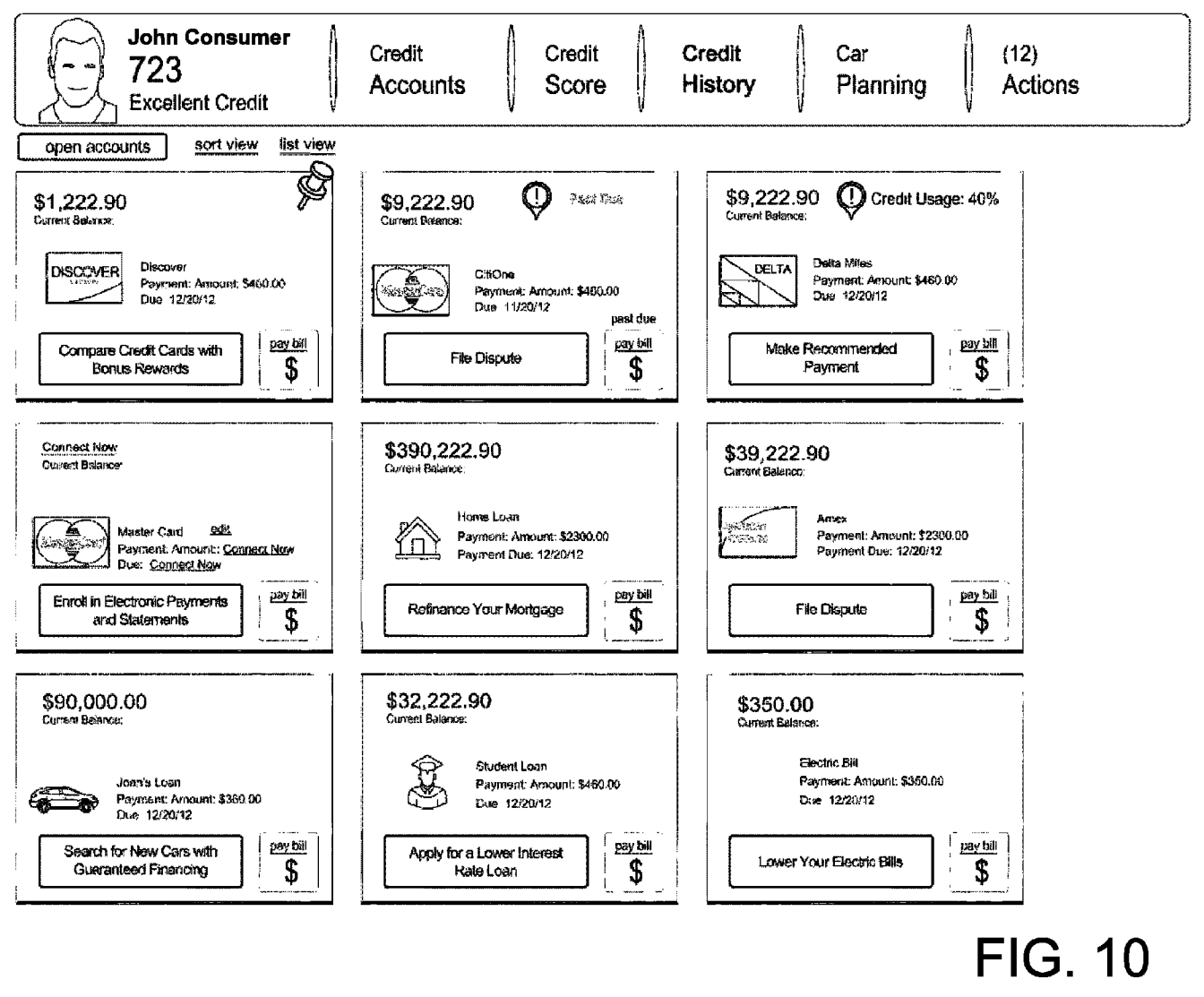

FIG. 10 illustrates a similar user interface to that illustrated in FIG. 9, but containing contextual action buttons for each account in addition to an option to make a payment to the creditors. For example, in addition to the option to make a payment, the consumer is presented with action buttons enabling the consumer to compare credit cards, file disputes, enroll in electronic billing, initiate a mortgage refinancing application, search for cars, apply for new student loans, and lower the consumer's electric bills. In some embodiments, one or more of the actions buttons may be an advertisement from a third party company.

Figure 11:
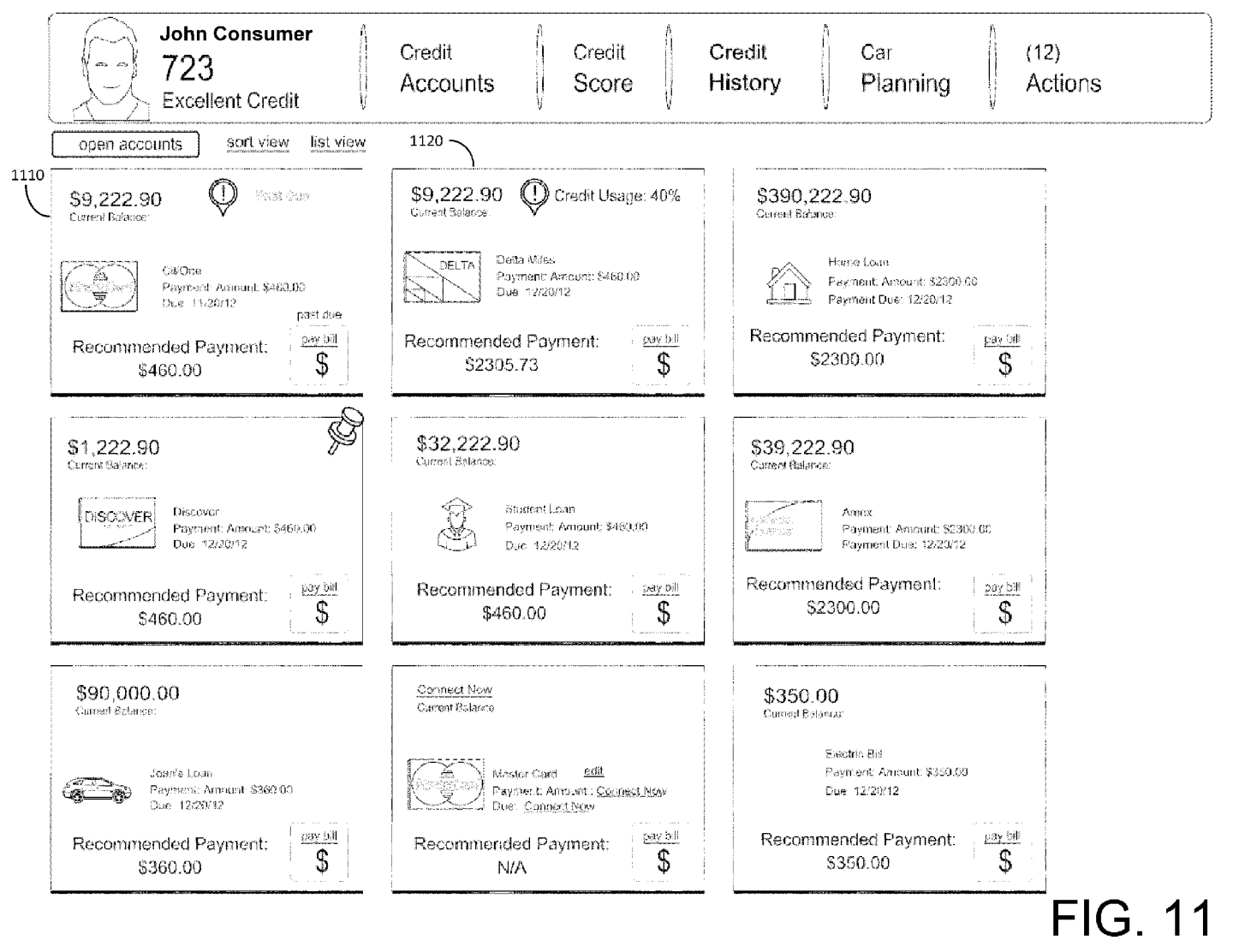

FIG. 11 shows a user interface where the bill payment system 100 automatically sorts the consumer's accounts. The consumer may decide which criteria to use to sort tradelines, or the criteria may be defined by the bill payment system 100. For example the consumer's accounts may be sorted based on the impact on the consumer's credit score. This puts the accounts that have a largest impact on the consumer's credit score in the place the consumer is most likely to see them. For example, the user interface of FIG. 11 includes a CitiOne credit account tile 1110, which indicates that the consumer has a past due payment on the CitiOne account. Because late payments have a significant bad impact on a consumer's credit score, the consumer may be presented with that account first. Next, the user interface includes a Delta Miles account tile 1120, which indicates that credit usage on that credit account is over a recommended limit. Therefore, in the example embodiment, the bill payment system 100 automatically puts the tile 1120 in an easy place for the consumer to recognize and access the payment button. Other accounts, such as the student loan, may be placed further down in the priority. Accounts with no, or unknown effect, may be lower priority, and placed lower in the user interface. For example, the MasterCard with unknown status and the utility bill that is not a credit account are placed in the bottom row of tiles.

Bill payment system 100 may sort the consumer's tradelines to be presented as tiles, in a traditional credit report view, or in another manner when sorted. In some embodiments the consumer's tradelines may be sorted based on the urgency with which they should be addressed, the impact on a consumer's credit score, the negative impact on a consumer's credit score, the balance remaining, the balance due, the recommended payments, and/or other logical orders. The bill payment system 100 may determine the impact of a credit event on a consumer's credit score, or it may receive the impact from a credit bureau 106.

FIG. 12 is another sample user interface which presents a consumer with his tradelines and options to make bill payments. The user interface is integrated into a traditional credit report. In some embodiments there may be other actions buttons besides an option to pay a bill. For example, there may be action buttons which allow a consumer to file disputes.

Example Data Reporting

Data reporting is the reporting of consumer credit information by a business where a payment is required for a product or service that has been received or used by a consumer. Businesses that report data, called data reporters or data furnishers, are responsible for the secure electronic transfer of consumer payment information to a credit reporting agency (CRA), such as Experian. Once the information is received, the CRA includes it in its database and a tradeline is updated and/or created. A tradeline is a particular financial account of a consumer, and may be represented in various manners in a user interface displaying credit information, such as the tiles discussed above. Consumers may have few or multiple tradelines on their record. Together, all tradelines reported on a specific consumer make up his or her credit report and can be used to determine the consumer's overall risk or creditworthiness.

The credit score is an important indicator of a consumer's financial health. Consequently, having a high credit score is important to consumers for many reasons. A consumer's credit score may impact availability and/or terms (e.g., interest rate) of such things as loan applications, rental applications, real estate mortgages, and so on. A poor credit score may even prevent a consumer from finding a good job. Thus, many consumers have a substantial interest in monitoring and finding ways to improve their credit scores. However, a consumer's credit report is based on the information on their credit report, and the information on a consumer's credit report doesn't change until it is updated by a data reporter. Typically, there are two types of data reporters. The first type is the creditors themselves. Some creditors report data about their consumer accounts directly to the credit bureaus. The second type is third party data furnishers (also referred to as third party data reporters). These companies report to the credit bureaus on behalf of one or more companies with consumer credit accounts. In both cases, the creditors receiving payments from consumers typically aggregate payment information from many consumers and only report to the credit bureaus periodically (e.g. every 30 days). Thus, if a consumer makes a payment with the hope of improving his credit score there is often a substantial delay before any improvement actually occurs. For consumers seeking a quick improvement to their credit scores, this delay can be costly.

Figure 13:
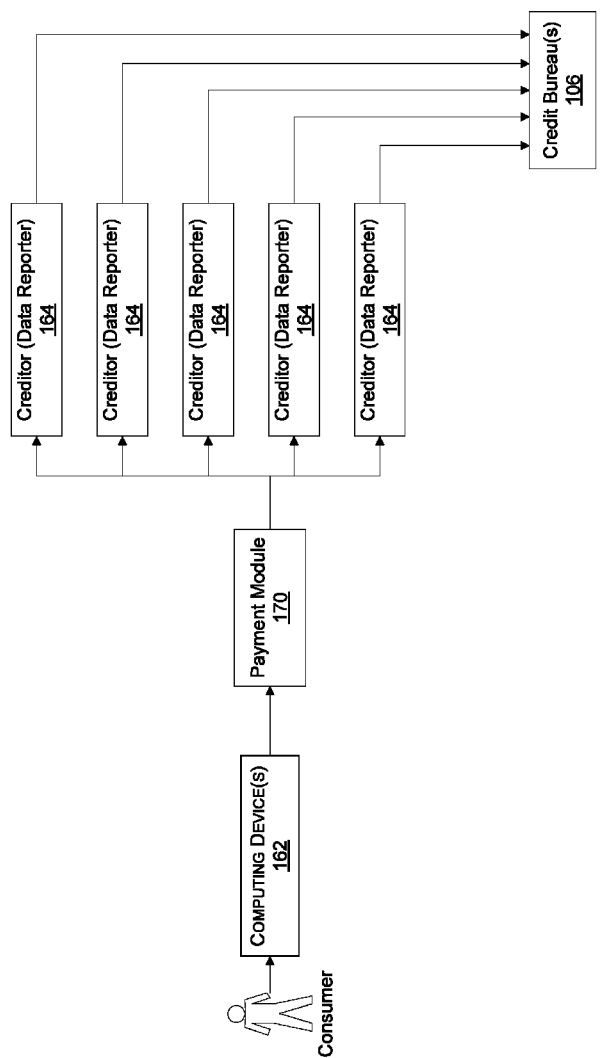
FIG. 13 is a block diagram illustrating one embodiment of creditors reporting payments received from a consumer's to a creditor bureau.

The block diagram in FIG. 13 illustrates a typical data reporting process for payments made toward a consumer's credit account. In this example, a consumer interacts with computing device 162 to make a payment. A payment module 170 makes payments to one or more creditors. After a creditor receives payments, it reports those payments to one or more credit bureaus 106. Each creditor independently reports to the credit bureaus 106 on its own periodic schedule. A consumer may have no way of knowing when a creditor will report payments to a credit bureau, and no way to report payments to the credit bureaus faster.

Figure 14:
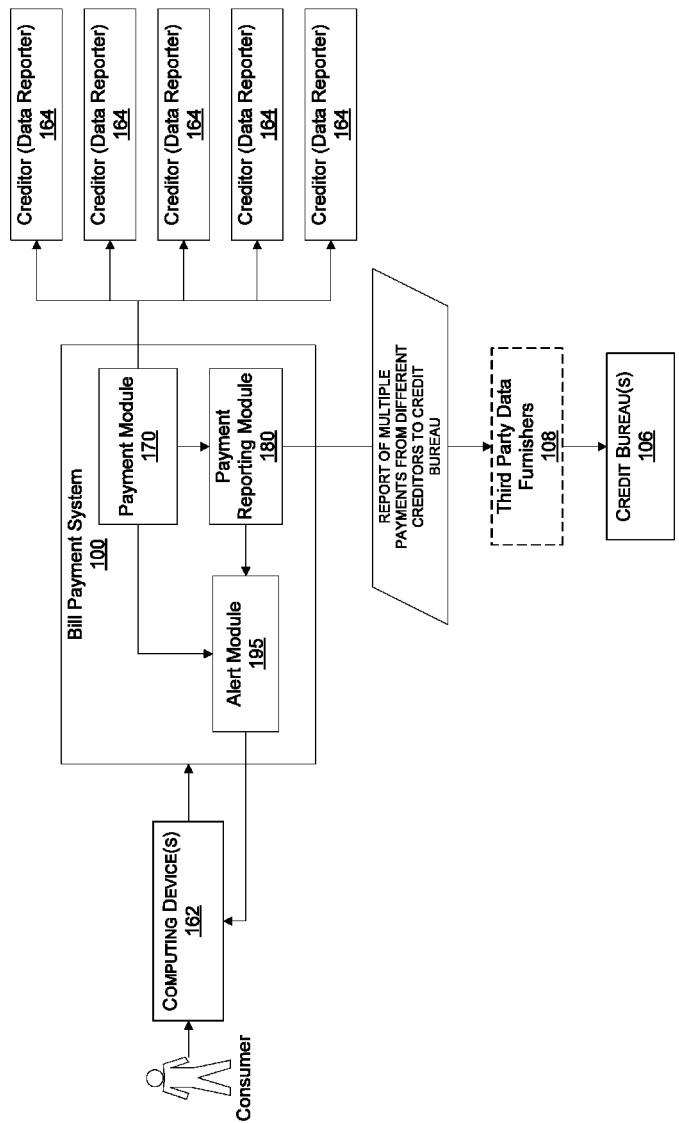
FIG. 14 is a block diagram illustrating one embodiment of a bill payment system reporting, to a credit bureau, payments made to multiple creditors through the bill payment system.

FIG. 14 is a simplified block diagram illustrating data reporting by a bill payment system 100 instead of (or in addition to) by the individual creditors receiving the payments. In this example, the consumer interacts with computing device 162 to make one or more payments, such as to different creditors. For example, computing device 162 may present the user with a user interface such as those illustrated in FIGS. 6-12 through which the consumer can interact with the bill payment system 100. Bill payment system 100 may contain a payment module 170 which makes payments to creditors as described in block 320 of FIG. 3. After the payment module processes a payment to a creditor, a payment reporting module 180 reports the payment to one or more credit bureaus. The payment reporting module 180 may report the payments individually as they occur, or may aggregate multiple payments to one or more creditors to send to the credit bureaus.

In some embodiments payments are reported directly to the credit bureau 106. In other embodiments, payment data is reported to the credit bureau 106 through one or more third party data furnishers 108. The third party data furnishers 108 report the consumer's payment data to one or more credit bureaus 106. Advantageously, if the consumer initiates payments to multiple creditors through the bill payment system, the bill payment system may report all of those payments to one or more credit bureaus 106, either in a batch report for the consumer or an individual payment reports. As noted above, in one embodiment the bill payment system 100 confirms that the payment has been received by the creditor before reporting to the credit bureau. In other embodiments, the bill payment system 100 may report the payment immediately (e.g. even concurrently with payment been sent to a creditor), possibly with an indication that the payment receipt has not been confirmed by the creditor.

Alert module 195 is configured to provide alerts to the consumer regarding events of interest to the consumer or the status of the consumer's accounts. Examples of alerts to consumers are discussed above in reference to FIGS. 6 and 8. The alerts may be presented as part of a user interface for the consumer, or may be sent to one or more of the consumers computing devices 162 such as by email, text message, or other means of communication. In FIG. 14, the alert module 195 is in communication with the payment module 170 and the payment reporting module 180 such that it is able to report when a payment is made to a creditor 164, and when payments are reported to the credit bureau 106.

Figure 15:
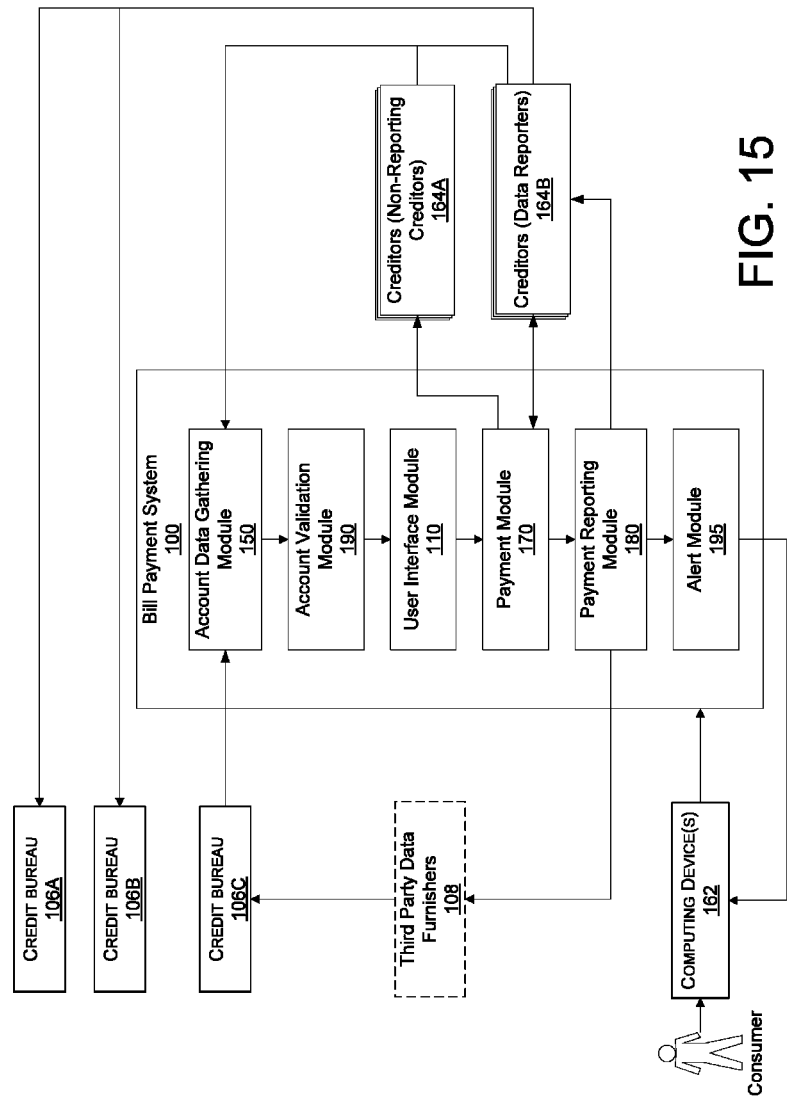
FIG. 15 is a block diagram illustrating one embodiment of the bill payment system reporting, to a credit bureau, payments made to multiple creditors through the bill payment system.

FIG. 15 is a block diagram illustrating one embodiment of the bill payment system reporting, to a credit bureau, payments made to multiple creditors through the bill payment system. In this embodiment, the consumer interacts with computing device 162 which is in communication with bill payment system 100. In some embodiments, one or more elements of bill payment system 100 may be executed by computing device 162. For example, user interface module 110 may be a set of program instructions stored on a computer memory which is part of computing device 162 and causing computing device 162 to generate a user interface to provide to the consumer. In some embodiments, some or all of the modules illustrated in the bill payment system 100 may be partially and/or entirely located and executed on the consumer computing device 162. Bill payment system 100 enables a consumer to make payments to his creditors and report those payments to one or more credit bureaus.

Account data gathering module 150 gathers data on accounts associated with the consumer. The process of gathering account data about a consumer may include parsing information on the consumer's credit report, searching for other accounts associated with the consumer, and/or receiving information from the consumer about other accounts, for example. The account data gathering module 150 may perform the processes in blocks 210, 220, 230, and/or 250 as discussed in reference to FIG. 2. In some embodiments, the account data gathering module 150 identifies accounts associated with a consumer, and also updates data about the accounts (e.g. balance, due dates, etc.) with information in the consumer's credit report and information accessed from the consumer's creditors when the consumer accesses the bill payment system 100. Information may be accessed from the consumer's creditors by scraping the creditors online sites, by parsing information in statements received from the creditors, etc. For example, in one embodiment the consumer may provide a photograph of accounts (tradelines) on the consumer's credit report to the account data gathering module 150 (which in some embodiments may be powered by a third party service, such as those provided by Fiserv), which parses the information in the photograph (e.g., which may require performing optical character recognition initially) in order to detect one or more accounts and related account data. In other embodiments, the account data gathering module 150 has access to an electronic copy of the consumer's credit data and, thus, may extract account data directly from that electronic data (e.g., in xml, cvs, or any other electronic format).

Account validation module 190 validates the accounts identified by the account data gathering module 150 as discussed above in reference to the process performed in block 430 or FIG. 4A. In some embodiments, the processes of account validation module 190 are performed by account gathering module 150.

User interface module 110 generates user interfaces and provides those user interfaces to the consumer through the consumer's computing device 162. The user interface may be any of the exemplary user interfaces discussed in FIGS. 6-12, or may be a different user interface which provides the consumer with the ability to make payments to his creditors.

Payment module 170 makes payments to the consumer's creditors as discussed in reference to block 320 of FIG. 3. In some embodiments, payments may be made to reporting creditors 164A and/or non-reporting creditors 164B (discussed further below). In order to report payments to a credit bureau 106, the payment module 170 may need an indication from the creditors that the payment was received and accepted. For example, if the payment module initiates a payment from the consumer's bank account to a creditor, but the payment is returned for insufficient funds, then the bill payment system 100 does not want to report that payment to a credit bureau. In some embodiments, the payment reporting module 180 receives the indication from the creditor that the payment was valid.

Payment reporting module 180 reports payments to one or more credit bureaus 106. For example, after a payment is confirmed valid, the data may be reported to the credit bureau 106C via the third party data furnisher or directly to the credit bureau 106C (e.g., if the bill payment system is a data reporter). Payment reporting module 180 may send reports to the credit bureau continuously as payments are made, or may compile payments to send in batches.

Creditors 164A and 164B are entities to which the consumer owes money. Some creditors (data reporters) 164B furnish data to credit bureaus 160A, 160B, and 160C, other creditors (non-reporting creditors) 164A do not report payment data to credit bureaus, or in some cases only report negative information to credit bureaus (such as referring the consumer's debt to a collection agency). In some embodiments, both data reporters 164B, and non-reporting creditors 164A may communicate with the bill payment system 100. For example, they may communicate with the account data gathering module 150 to update outstanding balances, or communicate with bill payment module 170 to receive payments from the consumer. However, only the data reporters 164A report transactions directly to the credit bureaus 106. In some embodiments, payments to non-reporting creditors 164B can also be reported to one or more credit bureaus 106 through the bill payment system. For example, once a payment is confirmed with a particular non-reporting creditor 164A, the payment reporting module 180 may communicate the payment to one or more credit bureaus 106 (either directly or via one or more third party data furnishers 108).

As illustrated in FIG. 15, in some embodiments, payment reporting module 180 provides information only to some of the credit bureaus 106. In FIG. 15, payment reporting module 180 furnishes payment data only to credit bureau 106C. Bill payment system 100 generally furnishes data to credit bureaus 106 faster than a reporting creditor 164B would furnish data through their own system. This means that credit bureau 106C would have more up to date information than the other credit bureaus 106A and 106B which only received payment data when it is furnished by the reporting creditors 164B.

The bill payment system 100 and related modules are described as concerning the presentment, payment, and reporting of bills for an individual consumer. However, specific modules may be used by many consumers at the same time. For example, payment reporting module 180 may aggregate payments made by many consumers through the bill payment system 100 to send in a single batch to a credit bureau 106. Having a single reporting module perform functions for multiple consumers may increase the efficiency of the system.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached

What is claimed is:

1. A computing system for managing user credit information to expedite improvement in a user's credit score, the computer system comprising:
a server computing system having:
one or more hardware computer processors;
one or more storage devices configured to store software instructions configured for execution by the one or more hardware computer processors, the software instructions comprising:
a user interface module;
a bill payment module;
a payment reporting module;
an account validation module; and
an alert module; and
a user computing device configured to communicate with the server computing system via the user interface module;
wherein the server computing system executes the software instructions to cause the server computing system to:
access credit data of a user from one or more credit bureaus;
automatically identify a plurality of accounts associated with respective creditors included in the credit data of the user;
generate, via the user interface module, credit report user interface data configured for presentation to a user in a credit report user interface rendered on the user computing device operated by the user, the credit report user interface indicating:
account information for the plurality of accounts based on the accessed credit data;
a credit score for the user based on the accessed credit data;
an account balance for the plurality of accounts based on the accessed credit data;
information regarding an expected numerical adjustment in the credit score if a first payment isn't made on time to a first creditor associated with a first account of the plurality of accounts, the account information being presented to the user via the user interface module based on expected impact of the plurality of accounts on the user's credit score, wherein the information is displayed on the user computing device within one or more screens to include at least:
an indication of the first account;
a first payment due on the first account;
an indication of the expected numerical adjustment in the credit score;
a first payment button associated with the first account, wherein the first payment button is configured to enable the user to initiate the first payment to the first creditor associated with the first account and reporting of the first payment to one or more credit bureaus;
a first payment amount interface configured to receive a first payment amount for payment to the first creditor;
a first payment source selection interface configured to receive information from the user regarding a first payment account of the user from which the first payment to the first creditor is to be drawn;
a second payment button associated with a second account of the plurality of accounts, wherein the second payment button is configured to enable the user to initiate a second payment to a second creditor associated with the second account and reporting of the second payment to one or more credit bureaus, wherein the first creditor and the second creditor are not affiliated;
a second payment amount interface configured to receive a second payment amount for payment to the second creditor; and
a second payment source selection interface configured to receive information from the user regarding a second payment account of the user from which the second payment to the second creditor is to be drawn;
transmit the credit report user interface data to the user computing device, wherein the user computing device is configured to render the credit report user interface on a display of the user computing device;
in response to the user selecting the first payment button of the credit report user interface rendered on the user computing device:
receive via the user interface module a first payment instruction from the user indicating at least the first payment amount and the first payment account;
transmit the first payment instruction from the user interface module to the bill payment module;
initiate, via the bill payment module, transfer of the first payment amount from the first payment account of the user to the first creditor; and
confirm, via the account validation module, receipt of the first payment by the first creditor;
in response to the user selecting the second payment button of the credit report user interface rendered on the user computing device:
receive via the user interface module a second payment instruction from the user indicating at least the second payment amount and the second payment account;
transmit the second payment instruction from the user interface module to the bill payment module;
initiate, via the bill payment module, transfer of the second payment amount from the second payment account of the user to the second creditor;
confirm, via the account validation module, receipt of the second payment by the second creditor; and
transmit payment data indicating confirmation of receipt of the first payment by the first creditor and confirmation of receipt of the second payment by the second creditor from the bill payment module to the payment recording module;
generate via the payment reporting module substantially concurrently with transmitting the first and second payment instructions, aggregated payment data comprising at least the first payment instruction, wherein the first payment instruction is associated with the first creditor and the second payment instruction, wherein the second payment instruction is associated with the second creditor;

transmit via the payment reporting module the aggregated payment data including details of the first payment and details of the second payment to one or more credit bureaus before the first and second creditors report the respective first and second payments to the one or more credit bureaus;

communicate the aggregated payment data from the payment reporting module to the alert module;

generate an alert via the alert module to be displayed on the user computing device;

cause transmission via the alert module and the user interface module of the alert over a wireless communication channel to the user computing device, wherein the alert activates an application on the user computing device to cause details indicating that payment data indicating confirmation of receipt of the first payment by the first creditor and confirmation of receipt of the second payment by the second creditor have been provided to one or more credit bureaus to display, and wherein the alert enables connection to the server computing system; and display, on the user computing device, an actual impact on the user's credit score of completion of the first payment and the second payment.

2. The computing system of claim 1, wherein the server computing system executes the software instructions to further cause the server computing system to provides an indication to the first creditor that the first payment was reported to the one or more credit bureaus.

3. The computing system of claim 1, wherein account information comprises balance, credit limit, and/or credit utilization.

4. The computing system of claim 1, wherein the software instructions are further configured to cause the server computing system to:

determine third account information for a third account of the user with a third creditor, wherein the third creditor does not report payments on user accounts to a credit bureau; and include in the generated credit report user interface the third account information for the third creditor that does not report to a credit bureau.

5. The computing system of claim 4, wherein the software instructions are further configured to cause the server computing system to:

initiate a third payment to the third account which does not report payments on user accounts to a credit bureau; and report the third payment to one or more credit bureaus.

6. The computing system of claim 1, wherein the software instructions are further configured to cause the server computing system to:

access, from the first creditor, a first statement associated with the first account, wherein the first statement shows a balance of an account of the user with the first creditor;

wherein the credit report user interface is further configured to display the first statement.

7. The computing system of claim 1, wherein the software instructions are further configured to cause the server computing system to:

determine one or more accounts in which the user is not enrolled in a bill payment service of the plurality of accounts; and enroll the user in the bill payment service for the determined one or more accounts.

8. The computing system of claim 7, wherein enrolling the user is in response to the user providing authorization or is automatically performed by the server computing system.

9. The computing system of claim 1, wherein the software instructions are further configured to cause the server computing system to:

determine a account type of a third account of the plurality of accounts;

determine one or more actions available to the user with reference to the third account based on the determined account type; and update the credit report user interface to include an action button indicating one or more of the determined actions;

wherein the one or more of the determined actions are selected from viewing account statements, ordering a credit report, refinancing a loan, applying for a new credit card, comparing credit cards, or enrolling in a creditor's online services.

10. The computing system of claim 1, wherein the software instructions are further configured to cause the server computing system to receive funds deposited by the user.

11. The computing system of claim 10, wherein initiating the first payment comprises providing the first payment amount to the first creditor identified in the first payment instruction from the deposited funds.

12. The computing system of claim 1, wherein generating the credit report user interface further comprises:

determining a recommended payment amount for the first account;

wherein the credit report user interface further includes the recommended payment amount associated with the first account.

13. The computing system of claim 12, wherein the recommended payment amount is determined based on at least one of goals or priorities of the user, available funds of the user, the amount due on accounts of the user, the balance remaining on each account, interest rates on each account, or the impact a payment has on the user's credit score.

14. The computing system of claim 1, wherein the application on the user computing device is a mobile application.

15. The computing system of claim 9, wherein the server computing system is further configured to:

determine an account status of the third account, wherein the one or more actions available to the user are further determined based on the account status.

16. The computing system of claim 1, wherein the server computing system executes the software instructions to further cause the server computing system to provide a user interface including:

a new credit card option configured to initiate application by the user for a new credit card such that the first payment account is the new credit card.

17. A method for managing user credit information, the method comprising:

by a computing system having one or more hardware computer processors:

accessing credit data of a user from one or more credit bureaus;

determining a plurality of user accounts including one or more reporting accounts and one or more non-reporting accounts, said determining comprising:

determining the one or more reporting accounts of the user with respective creditors based on the credit data of the user; and determining one or more non-reporting accounts of the user with respective creditors that do not report payments to the one or more credit bureaus;

determining an unenrolled subset of the plurality of user accounts in which the user is not enrolled in a bill payment service with the corresponding creditor;

enrolling the user in bill payment services of each of the determined unenrolled user accounts;

determining whether payment is due on a first reporting account of the plurality of user accounts;

in response to determining that payment is due on the first reporting account:
  determine a first recommended payment amount associated with the first reporting account;
  determine an expected numerical decrease in a credit score of the user if the first recommended payment is not made on time to a first creditor associated with the first reporting account;

determining whether payment is due on a second non-reporting account of the plurality of user accounts;

in response to determining that payment is due on the second non-reporting account:
  determine a second recommended payment amount associated with the second non-reporting account;

determining a priority order for the plurality of user accounts based at least on impact of respective user accounts on the credit score of the user;

generating credit report user interface data configured for rendering on a user computing device indicating:
  in the determined priority order for the plurality of user accounts, account information for each of the one or more reporting accounts of the user based on the accessed credit data and the one or more non-reporting accounts of the user, wherein each account information includes respective balance, credit limit, and/or credit utilization for the corresponding user account;
  the credit score for the user based on the accessed credit data;
  a first payment amount interface configured to receive a first payment amount for payment to the first creditor;
  a first payment source selection interface configured to receive information from the user regarding a first payment account of the user from which the first payment to the first creditor is to be drawn;
  a first payment button associated with the first reporting account, wherein the first payment button is configured to enable the user to initiate a payment to the first creditor associated with the first reporting account and reporting of the first payment to one or more credit bureaus;
  a first action button indicating one or more actions determined based on a type and/or status of the first reporting account, the one or more actions including one or more of viewing account statements, ordering a credit report, refinancing a loan, applying for a new credit card, comparing credit cards, or enrolling in a creditor's online services;
  a second payment button associated with the second non-reporting account of the user, wherein the second payment button is configured to enable the user to initiate a second payment to a second creditor associated with the second non-reporting account and reporting of the second payment to one or more credit bureaus, wherein the first creditor and the second creditor are not affiliated;
  a second payment amount interface configured to receive a second payment amount for a second payment to the second creditor;
  a second payment source selection interface configured to receive information from the user regarding a second payment account of the user from which the second payment to the second creditor is to be drawn;
  a second action button indicating one or more actions determined based on the type and/or status of the second non-reporting account, the one or more actions including one or more of viewing account statements, ordering a credit report, refinancing a loan, applying for a new credit card, comparing credit cards, or enrolling in a creditor's online services;

transmitting the credit report user interface to the user computing device, wherein the user computing device is configured to render the credit report user interface data on a display of the user computing device;

receiving a first payment instruction from the user indicating at least the first payment amount and the first payment account, wherein the first payment instruction is transmitted from the user computing device in response to the user selecting the first payment button; and initiating transfer of the first payment amount from the first payment account of the user to the first creditor;

receiving a second payment instruction from the user indicating at least the second payment amount and the second payment account, wherein the second payment instruction is transmitted from the user computing device in response to the user selecting the second payment button; and initiating transfer of the second payment amount from the second payment account of the user to the second creditor;

generating aggregated payment data comprising at least the first payment instruction and the second payment instruction, wherein the first payment instruction is associated with the first creditor and the second payment instruction is associated with the second creditor;

providing the aggregated payment data including details of the first payment and details of the second payment to one or more credit bureaus before the first and second creditors report the payments to the one or more credit bureaus;

providing an indication to the first creditor that the first payment was reported to one or more credit bureaus;

providing an indication to the second creditor that the second payment was reported to one or more credit bureaus;

generating an alert to be displayed on the user computing;

causing transmission of the alert to the user computing device, wherein the alert activates an application on the user computing device to cause details indicating that details of the first and second payments have been provided to one or more credit bureaus to display, and wherein the alert enables connection to the computing system; and updating the credit report user interface to include an updated credit score for the user calculated in consideration of the first payment and the second payment.

* * * * *